US012812545B1

(12) United States Patent
Rice

(10) Patent No.: US 12,812,545 B1
(45) Date of Patent: Nov. 24, 2026

(54) AD HOC RF NETWORK STRUCTURES AND METHODS

(71) Applicant: Gregory Michael Rice, Florissant, MO (US)

(72) Inventor: Gregory Michael Rice, Florissant, MO (US)

( * ) Notice: Subject to any disclaimer, the term of this patent is extended or adjusted under 35 U.S.C. 154(b) by 0 days.

(21) Appl. No.: 19/358,281

(22) Filed: Oct. 14, 2025

Related U.S. Application Data

(63) Continuation of application No. 19/222,358, filed on May 29, 2025, now Pat. No. 12,477,468.

(51) Int. Cl.
*H04W 52/02* (2009.01)
*H04L 27/36* (2006.01)
*H04L 27/38* (2006.01)
*H04W 24/08* (2009.01)
*H04W 84/18* (2009.01)

(52) U.S. Cl.
CPC ....... *H04W 52/0238* (2013.01); *H04L 27/362* (2013.01); *H04L 27/389* (2013.01); *H04W 24/08* (2013.01); *H04W 84/18* (2013.01)

(58) Field of Classification Search
CPC .............. H04W 24/08; H04W 52/0238; H04L 27/362; H04L 27/389
USPC .......................................................... 375/259
See application file for complete search history.

(56) References Cited

U.S. PATENT DOCUMENTS

| | | | | |
|---|---|---|---|---|
| 12,512,154 | B2 | 12/2025 | Hu et al. | |
| 2017/0228345 | A1 | 8/2017 | Gupta et al. | |
| 2019/0205741 | A1 | 7/2019 | Gupta et al. | |
| 2020/0169277 | A1* | 5/2020 | Tiebout | H03F 3/189 |
| 2020/0220629 | A1* | 7/2020 | Lightstone | H04B 17/14 |
| 2021/0265726 | A1* | 8/2021 | El-Nozahi | H04L 1/16 |
| 2021/0367648 | A1* | 11/2021 | Aue | H04B 7/0617 |

* cited by examiner

*Primary Examiner* — Temica M Beamer

(57) ABSTRACT

Structures and integration of circuits and sub-systems for ad-hoc, wide-bandwidth, radio frequency (RF) networking are disclosed. Networks may have both mobile and stationary Users. Disclosed are structures and methods for User network access via time, space, code and frequency domain sharing. A physical layer of network architecture comprises novel encoders, modulators, demodulators and phase-based beamformers. Embodiments may function as integrated systems providing communication capabilities for future networks such as $6^{th}$ Generation (6G). Enabled operational capabilities may include low-latency, ad-hoc network access. Deployment concepts may include coupling to platform-specific User Equipment, thereby allowing diverse User form-factors and functions. Small, low-power form-factors are made viable by integration of memristor technology into novel structures and circuits.

8 Claims, 27 Drawing Sheets

AD HOC RF NETWORK STRUCTURES AND METHODS

BACKGROUND OF THE INVENTION

Wireless communication has spanned several generations of systems. These included earlier Time Domain Multiplexed (TDM) and Frequency Domain Multiplexed (FDM) systems. These were followed by more complex multi-access schemes, such as Code Domain Multiple Access (CDMA) for 3G networks, and Orthogonal Frequency Domain Multiplexing (OFDM) in 4G and 5G networks. The latter systems require sophisticated coordination through a network of base stations. They have successfully serviced the growing markets for personal communications for several years. However the Internet-of-Things (IoT), sophisticated machine-to-machine (M2M) communications, and expanded personal use will require new wireless networks. Although certain emerging 6G techniques (such as mmw carriers) may facilitate future networks, many basic challenges exist. Operational issues will include low-latency, ad hoc connectivity among multiple Users. This may be fundamentally at odds with traditional paradigms of network coordination through a base station or centralized controller. Also, the evolution of RF systems to higher carrier frequencies and wider bandwidths may impose extreme computational requirements with limited space and power resources.

SUMMARY OF THE INVENTION

The present disclosure provides certain illustrations, examples and descriptions. These are not intended to be exhaustive or limiting of embodiments of the invention. Given the present disclosure, it will be apparent to one skilled in the art that variations or modifications of the embodiments described herein may be possible. It is intended that all such variations and modifications fall within the scope of the present invention.

Emerging 6G technologies (such as mmw carriers and high density antenna arrays) may facilitate future wideband networks, but many basic challenges exist. Issues regarding latency and ad hoc network access pose major operational difficulties. Also, the inherent nature of signals creates challenges such as "Doppler Spreading" for mobile Users, and elevated Peak-to-Average Power Ratio (PAPR) in OFDM type signals.

Accordingly, the present invention may integrate circuits and sub-systems to support ad hoc, low-latency, wideband RF networks. Advantageous methods and embodiments of the invention may allow User network access via simultaneous temporal, spatial and code domain sharing. This includes the use of pulse signals for temporal domain sharing, beamforming for spatial domain sharing, and the embedding of User identification information into pulses for code domain sharing.

Embodiments characterized by integration of novel analog and digital circuits may provide desired operational capabilities for future 6th Generation (6G) networks. This may include low-latency, ad hoc network access. Deployment concepts of the invention includes coupling to platform-specific User equipment, thereby supporting various types of User forms and functions. Some circuits of the invention might be combined onto a single monolithic device or "die" as disclosed. In this way the circuits' physical impact upon a User may be minimized.

Methods and Signal Processing Chains

The present disclosure describes unique embodiments of "physical layer(s)" of RF networks. This derives from unified approaches which may integrate novel encoders, modulators, demodulators and phase-based beamformers. Methods disclosed herein may be appreciated by examination of a baseband signal processing chain of some embodiments. For example, in a User transmission of data using a pulse signal, a disclosed method might comprise;

- encoding a digital pulse signal with both data and a User identifier;
- converting the digital pulse signal into a baseband analog pulse signal by modulating a set of analog subcarriers;
- creating by in-memory computing, a multiplicity of phase-controlled duplicates of the baseband analog pulse signal, whereby spatial beamforming is enabled; and
- up-converting the multiplicity of baseband phase-controlled duplicates to RF frequency for transmission from a multiplicity of RF antennas.

The above method might be performed in a "functionally reversed order" for User reception of a signal. (Reception might also include certain additional processes). For example, a method of the disclosure for User reception and recovery of data from a pulse signal might comprise;

- down-converting a multiplicity of RF signals from elements of an RF antenna array, wherein a multiplicity of baseband analog pulse signals is created;
- forming by in-memory computing, a singular baseband analog pulse signal by phase-controlled beamforming of the multiplicity of baseband analog pulse signals;
- demodulating the subcarriers of the analog pulse signal and rendering a digital pulse signal; and
- decoding data from the digital pulse signal.

The disclosure may also describe certain pulse "types" for purposes of example and illustration. This may include a "High-Gain Pulse" and "Low-Gain Pulse" as described herein. Such pulse examples are not implied to be exhaustive or limiting of embodiments of the invention.

Advantages and Utility

Extended "latency" is a critical concern for future 6G networks. For instance, procedures of resource allocation and beam management may require tens of milliseconds of overhead in 5G systems. Latency may arise from the centralized nature of traditional network control. By contrast, the disclosure is directed toward multi-User network access on an ad hoc basis, potentially reducing latencies from orders of milliseconds to microseconds.

"Ad hoc operation" may be an expectation of future 6G systems not readily supported with traditional networks. This is due to the centralized control structure of conventional approaches. Disclosed herein are ways to discriminate among RF "pulse trains" of multiple Users on the basis of multiple signal characteristics. These may include a pulse-rate-interval (PRI), a pulse direction-of-arrival (DOA), User identification code, and pulse frequency structure. This allows Users to join a network in spontaneous fashion without mutual coordination or centralized scheduling activities. The approach has analogies in the natural and man-made worlds. In the former, bats effectively use acoustic pulse signals in navigation. In the latter, multiple pulse-radar systems may operate independently and simultaneously. Although these are examples of "sensing" systems, they illustrate the viability of signal discrimination (and tracking) using a multi-domain pulse signal identification approach.

"Real-time computing" Embodiments described herein may include unique signal generators, processors and beamformers. These may employ both digital signal processing (DSP) and "discrete-time analog processing". The latter includes the novel use of "memristor" technology to address computational challenges of extremely wide-band RF systems. Memristor technology has been seriously researched in the context of "in-memory" computing for applications such as neural networks. However, disclosed herein is novel application of memristor technology to network communications. This includes use of the technology for electronically steered, phase-based beamforming. This allows rapid and efficient sharing of the spatial domain among multiple Users, while minimizing the cost and complexity of precision beamforming.

"Doppler spreading" is a fundamental problem in high-frequency, mobile, wireless OFDM communications systems. It is rooted in the physics of RF signal transmission. It causes undesired frequency shifts of the "subcarriers" of wide 5G OFDM "symbol" waveforms. The problem is exacerbated by both higher operating frequencies and high relative velocities of Users. As such, it can be of even greater concern for 6G networks. However the disclosure does not require the wide "time domain" symbols of 5G waveforms, but may instead may use narrow "pulses". Thus for the same operating bandwidth and carrier frequencies, a much wider frequency spacing of subcarriers results in proportionally smaller effects due to Doppler spreading.

Large "peak-to-average-power-ratios" (PAPR) is an inherent issue with conventional OFDM systems having very wide symbols. Having a mathematical basis in the Central Limit Theorem, large peaks in the symbol power levels can occur due to the random superposition of many subcarriers. However an advantage of the disclosure's narrow pulse widths (as compared to wide OFDM symbols) is naturally lower PAPR levels. This is due to fewer subcarriers in a short pulse as opposed to a long symbol. This advantage may either simplify power amplifier design, and/or increase propagation range of the pulse signals (by increasing average transmitted power of the pulse signals).

"Squint" is a well-known and undesired side-effect of phase-controlled beamforming. The phenomenon can greatly degrade channel capacity, especially for wide-band signals. Certain beamforming structures and methods disclosed herein may be useful in mitigating the effects of squint.

Terminology and Definitions

The present disclosure of time-domain pulses as a primary communication signal differs significantly from prior generations of wireless networks such as 4G and 5G. The latter networks rely heavily on frequency domain sharing, and use a complex "numerology" to describe User access to the numerous "subcarriers" of long OFDM symbols. By contrast, disclosed herein are OFDM processes as applied to short pulse signals having a more limited number of subcarriers. Thus the present disclosure may defer from conventional numerology descriptions.

In the present disclosure a "User" may be an entity having two components. These are a Platform and some embedded User Electronics (UE). Platforms might include ground vehicles, airborne vehicles, robotics, and appliances for human communication. The UE may be a suite of devices including sensors, electronic circuits and processors designed to support the Platform functionality Embodiments of the present invention may be coupled to the UE to enable various RF network capabilities.

In the present disclosure the term "ad hoc" may refer to User network access without coordination with a centralized controller or base station.

In the present disclosure references to "pulse(s)" and "pulse trains" may typically be in the context of some tangible signal containing information. The signal may be continuous analog, discrete analog or digital depending upon the context of the reference. That is, in the present disclosure a "pulse" (or "pulse signal") might exist in the form of charges or currents, stored in or flowing through analog or digital circuits. By contrast, in other instances specific reference to an "RF pulse" might imply an electromagnetic signal carrying information and traveling in free space.

In the present disclosure, the terms "baseband" signal(s) or "baseband" frequencies may refer to signals before their final conversion to, or after their initial conversion from, RF transmission frequencies.

The present disclosure may use the terms "synchronous" and "synchronization" in different contexts. For example a discussion of "signal synchronization" may have a different implication than "User synchronization" and should be interpreted in the appropriate context.

In the present disclosure a "memristor" may be any volatile or non-volatile circuit element capable of multiplication of an analog voltage input by a pre-defined conductance value, wherein the current flow through the memristor is proportional to the product of the analog voltage and the memristor conductance value. Also, the term "crossbar" as used herein, may sometimes refer to an electrical conductor connecting a multiplicity of memristors or "memristor cells", (as opposed to the usage of "crossbar" implying a structure inclusive of the memristors or memristor cells themselves).

The present disclosure may use the terms "programming" and "writing" in relation to memristor circuit elements. In this context programming or writing may infer exposing the memristor to specific voltage or current waveforms resulting in controlled alteration of the memristor's conductance value. Therefore a memristor which has been "programmed" has been physically adapted for some electrical behavior.

In the disclosure a "processor" might refer to a microprocessor, microcontroller, RISC processor or like devices; wherein the processor may contain or have access to a storage media containing one or more computer program products comprising instructions which, when executed by the processor, perform some function or functions. Said storage media for the computer program products may include volatile and/or non-volatile digital storage elements. Said elements may include static Random Access Memory (RAM), dynamic RAM, Read Only Memory (ROM), Programmable ROM (PROM), Electronic Erasable ROM (EEROM) or other elements. The processor may also have an instruction set defining operations which it may perform, as well as operand characteristics of fixed point and/or floating point and some bit-width.

In the disclosure, a "Reduced Instruction Set Computer" (RISC) may comprise a "simplified" processor characterized by limited internal storage media, a primitive or limited instruction set, a restricted operand width, fixed point integer arithmetic, and reduced logic complexity.

The disclosure refers to Sending and Receiving Modes of a User operation. It is understood that a "Sender" may be a User in a Sending Mode of operation, and a "Receiver" may be a User in a Receiving Mode of operation. A user may be both a Sender and a Receiver.

Ad Hoc Network Access

The disclosure describes spontaneous transmission of time domain pulse trains by multiple Users sharing the same spectral space. This presents the potential issue of interference, or "pulse collisions" at a receiver. This issue is controlled by separating Users in time, space and code domains, as disclosed herein. Also, the maintenance and sharing of a common "Operational Picture" among Users may mitigate the issue. Additionally, the disclosure describes a novel receiver subsystem for acquisition of spontaneous pulse train transmissions in the absence of a-priori knowledge thereof.

Network Levels

Circuits and elements of the invention may be coupled to Users to enable User participation in a wide-bandwidth wireless network (or simply, "network" as may be referenced herein). This may also be termed herein as a "Mobile Network" to emphasize the potential presence of mobile Users. The network might communicate with one or more external "Data Nodes". Said Data Nodes might be "standalone" or parts of other networks or platforms. Data Nodes might acquire and store an "Operational Picture". The Operational Picture may be a database comprising status and location of network Users. A Data Node might also contain environmental and/or geospatial information related to a network's location. One or more Data Nodes might also communicate with a higher level LAN or WAN for exchange of information, which may in turn be communicated to a Mobile Network.

DETAILED DESCRIPTION

Figure 1:
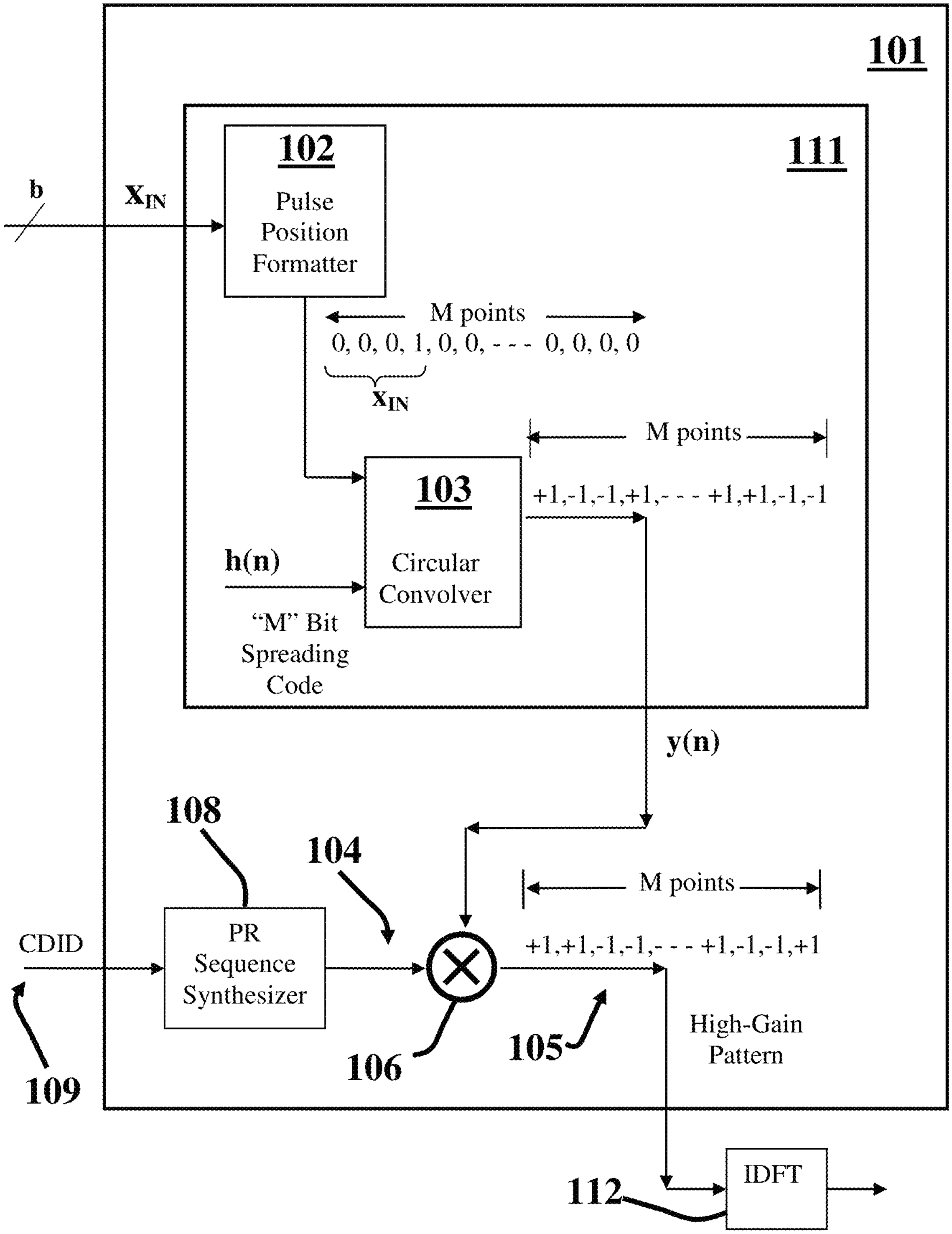
FIG. 1 shows an example of a bipolar data pattern Encoder for a High-Gain Pulse.

The following description of examples, methods and embodiments refers to the accompanying drawings. In the description, the same reference number may be used to identify like elements or components within a drawing. Also, a common reference number might be used in different drawings to identify the same or similar element.

The following description and accompanying drawings may describe certain structures and methods in the context of "real-valued" signals. Given this disclosure, it will be apparent to one skilled in the arts that said structures and methods may be adapted to "complex" signals. It is understood that such adaptations fall within the scope and spirit of the invention.

The disclosure describes numerous methods and embodiments by example below. It is noted that embodiments disclosed herein are presented as non-limiting examples.

1.0 Pulse Characteristics and User Configurations

It is an aspect of the disclosure that pulse trains constructed of heterogeneous pulse signals may be employed for RF communications. In this way different pulse types may emphasize different characteristics such as noise immunity, data capacity or some specific function such as error correction. Further, pulse signals may have embedded identification information. Ensuing descriptions are presented for purposes of illustration and example, and are not meant to be exhaustive or to limit the disclosure to the specific forms of pulses described, nor the structures and methods of their generation.

In contrast to 4G or 5G systems which transmit streams of contiguous "symbols", the present invention may employ "pulse trains" comprised of "pulse signals" separated by definite time intervals. This pulse-rate-interval (PRI) may be constant, or may be some repeatable pattern (similar to "staggered" PRIs as might be employed in a radar system).

Communication by both "Narrow" and "Extended" pulse signals is described herein. The pulse signals (or simply, "pulses") may be based on modulation of different types of orthogonal basis functions. In the present disclosure, an example set of basis functions is the complex exponentials of the Fourier Transform (although other families of basis functions might be possible).

Different User configurations might employ the invention for simplex, half-duplex, or full-duplex operations or a combination of the above.

1.1 Data Patterns

A pulse signal may be generated by the modulation of a finite set of M orthogonal functions by a "data pattern" of M points in length. Multiple network Users may transmit pulse trains simultaneously, sharing a common portion of the RF spectrum.

Two different examples of the Narrow Pulses are disclosed herein. One of these is similar in concept to conventional OFDM symbol structure. This is termed herein as a "Low-Gain Pulse". Like an OFDM symbol, it may be used in a relatively high SNR environment where the number of bits conveyed by the Pulse is related to Shannon's law on channel capacity, with an upper limit approximated by:

$$bps \approx W * \log_2(SNR)$$

where;

bps=>bits per second

W=bandwidth of the pulse

SNR=signal to noise power ratio at the system detector circuits.

The Low-Gain Pulse may exploit various well-known aspects of OFDM. These may include quadrature-amplitute-modulation QAM of its spectral components, as well as the application of a Cyclic Prefix (CP).

The second example of Narrow Pulse is termed herein as a "High-Gain Pulse". This pulse has particular utility in an environment of high noise or interference. Its structure may induce a detectable "spike" at the Receiver, even when the pulse power is below the received noise level. The behavior has analogy in certain radar (and other) pulse systems, where it is sometimes referenced as "pulse compression".

Table I below lists various attributes of the example pulses as disclosed herein.

TABLE I

| PULSE TYPE | PULSE WIDTH | DATA CAPACITY |
|---|---|---|
| High-Gain | Narrow | Low |
| Low-Gain | Narrow | Moderate |
| Extended | Moderate to Wide | High |

The generation of "data patterns" for modulation with the various pulse types is described below.

1.2 High-Gain Pattern Encoder

FIG. 1 depicts an example embodiment of a High-Gain Pattern Encoder 101. The Encoder 101 creates an M-point pattern (bipolar sequence) used in construction of the High-Gain Pulse. (M might typically range from 8 to 512 points, but other values of M are possible).

Referring to FIG. 1, some input $X_{IN}$ is converted into an M-point sequence by a Pulse Position Formatter 102. The resulting pulse position modulated (PPM) sequence has only one non-zero point. The displacement ($X_{IN}$) of said point within the sequence represents the information to be encoded. Thus this sequence can represent $\log_2 M$ bits.

Again referring to FIG. 1, the M-point PPM sequence is sent to a Circular Convolver 103 where it undergoes a circular convolution with a bipolar Spreading Code. The Spreading Code may be some M-point pseudo noise (PN) code chosen for favorable auto-correlation properties. Several such codes (sequences) are known, including Gold Codes, Kasami Codes, and others.

Referring again to the example of FIG. 1, the output of Circular Convolver 103 is then multiplied by an M-point, pseudo-random (PR) User Identification Sequence 104. This produces High-Gain Pattern 105, which is the output of a Pattern Multiplier 106. (In this example both inputs to the Pattern Multiplier 106 are bipolar in nature, forcing its output to be bipolar.)

Referring to FIG. 1, the User Identification (ID) Sequence 104 is produced by a PR Sequence Synthesizer 108, which has a Code Domain ID (CDID) 109 as input. The CDID is unique to a specific User at any given time. The PR Sequence Synthesizer 108 might be a small look-up table of solid-state memory (with access times on the order of 1 to 2 nsec. as may be possible with current CMOS technologies). Alternatively it may be built of digital circuits capable of generating PR sequences. In the former case the CDID 109 may serve as an address to access a specific User ID Sequence 104. In the latter instance the CDID may provide a "seed" to a number generator to create the User ID Sequence 104. The spirit of the disclosure extends to both implementations.

The CDID 109 may be constant for a multiplicity of High-Gain Pulses. Consequently the same User ID Sequence 104 might be applied to all pulses of a given pulse train. This can aid in the separation of signals received from multiple Users as disclosed in other sections below.

The Pulse Position Formatter 102 and Circular Convolver 103 may be combined into a look-up-table memory 111, termed herein as a Circular Convolution Table (CCT). The CCT 111 may have M entries of M bits (i.e. dimensions M×M). The CCT might be either volatile or non-volatile solid-state memory. As seen in FIG. 1 the CCT may have $X_{IN}$ as an input (or "address") and y(n) as a bipolar output.

Advantages of the CCT look-up table implementation are small physical size, simplicity and fast access time. For example, for M=64 the size of the CCT may be 64×64=4096 bits. Each entry (or row) of the CCT corresponds to 1 of 64 possible states of input $X_{IN}$. Each row then represents a potential 64 bit bipolar output sequence. The CCT might also be built of CMOS technology.

The example embodiment of FIG. 1 produces the High-Gain Pattern 105. The High-Gain Pattern is sent to an Inverse DFT (IDFT) 112. The output of IDFT 112 is the High-Gain Pulse signal. It may be equivalent to a set of "M" subcarriers as modulated by the High-Gain Pattern 105. Demodulation of the High-Gain Pulse signal is described in Section 5.

1.3 Pulse Spacing in Time Domain

Each User may transmit RF pulses separated in time. For any given transmitter (Sender) the PRI may greater than the duration of the pulse itself.

RF pulses from different Senders might arrive at a common Receiver simultaneously with varying degrees of overlap. Such "pulse collisions" are undesirable and may be mitigated by various processes and structures as disclosed herein. One such process in the time domain is presented below.

Users might send pulses asynchronously to one another but at different PRIs. For example in FIG. 2, User "A" generates pulses at four microsecond intervals (215 of FIG. 2), User "B" at six microsecond intervals (216 of FIG. 2), and User "C" at nine microsecond intervals (217 of FIG. 2). This approach provides separation of pulses in time, and reduces the probability of collisions.

But pulse collisions may still occur. This might be especially true, if two (or more) User PRIs are factors of a common multiple number. For example, in FIG. 2, User "A" sends Pulses every four microseconds and User "B" every six microseconds. Thus, it would be possible for collisions to occur at every (4×6)=24 microseconds.

However, judicious assignment of pulse intervals to the various Users may minimize collisions, even in an unsynchronized environment. For example different prime numbers might be assigned to each User for pulse spacing. This precludes the existence of any "common factor relationship" between Users.

Also, prime numbers might be reassigned to Users as appropriate, as might be warranted on the basis of their network useage, or required quality-of-service.

Figure 2:
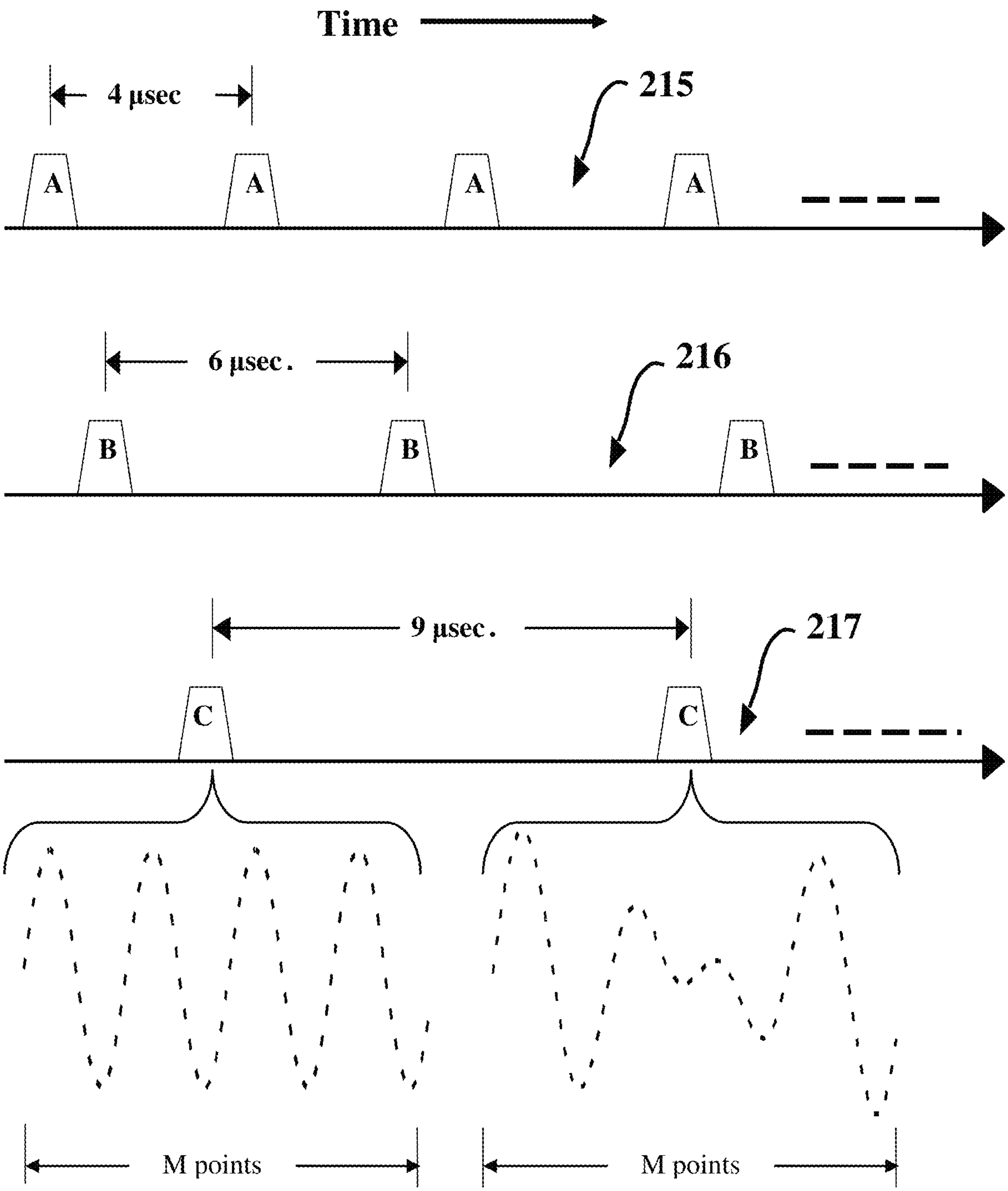
FIG. 2 depicts Pulse Trains (in time domain) of multiple network Users.

Also depicted in FIG. 2 are simplistic waveforms of Low-Gain Pulses illustrative of the complex structure within the pulses. Shown are M-point signals at baseband. Not shown are waveforms for High-Gain Pulses, which might typically be manifested as noise-like signals.

1.4 User Configurations

The disclosure refers to Sending and Receiving Modes of User operation. It may also refer to a "Sender" as a User in the Sending Mode of operation, and a "Receiver" as a User in the Receiving Mode of operation. Users might share a common portion of the RF spectrum employing various structures and methods of the present disclosure.

In the present disclosure, a "Mobile Network" may have one or more mobile Users sharing data, operational status and location information. A network-wide database of such information may be termed herein as an "Operational Picture", and might be shared by network Users and stored locally by Users.

In the present disclosure a "Data Node" may be an external entity connected to the Mobile Network, and might also share and contribute to the Operational Picture. The Data Node might be a stand-alone entity with either a wired or wireless connection to one or more mobile Users. Alternatively, the Data Node might be a "portal" to another network.

In the present disclosure the term "User" may refer to a Platform and various organic electronics of the Platform. The electronics may be referenced herein as the User Equipment (UE). Users might include (but not be limited to) ground vehicles, airborne vehicles, robotic assemblies, and personal communications devices. The User may be operatively and physically connected to a plurality of the circuits of this disclosure, to facilitate User capabilities in an RF pulse network. Such capabilities may include (but not be limited to) communications, navigation, collision avoidance or some other purpose.

Figure 3:
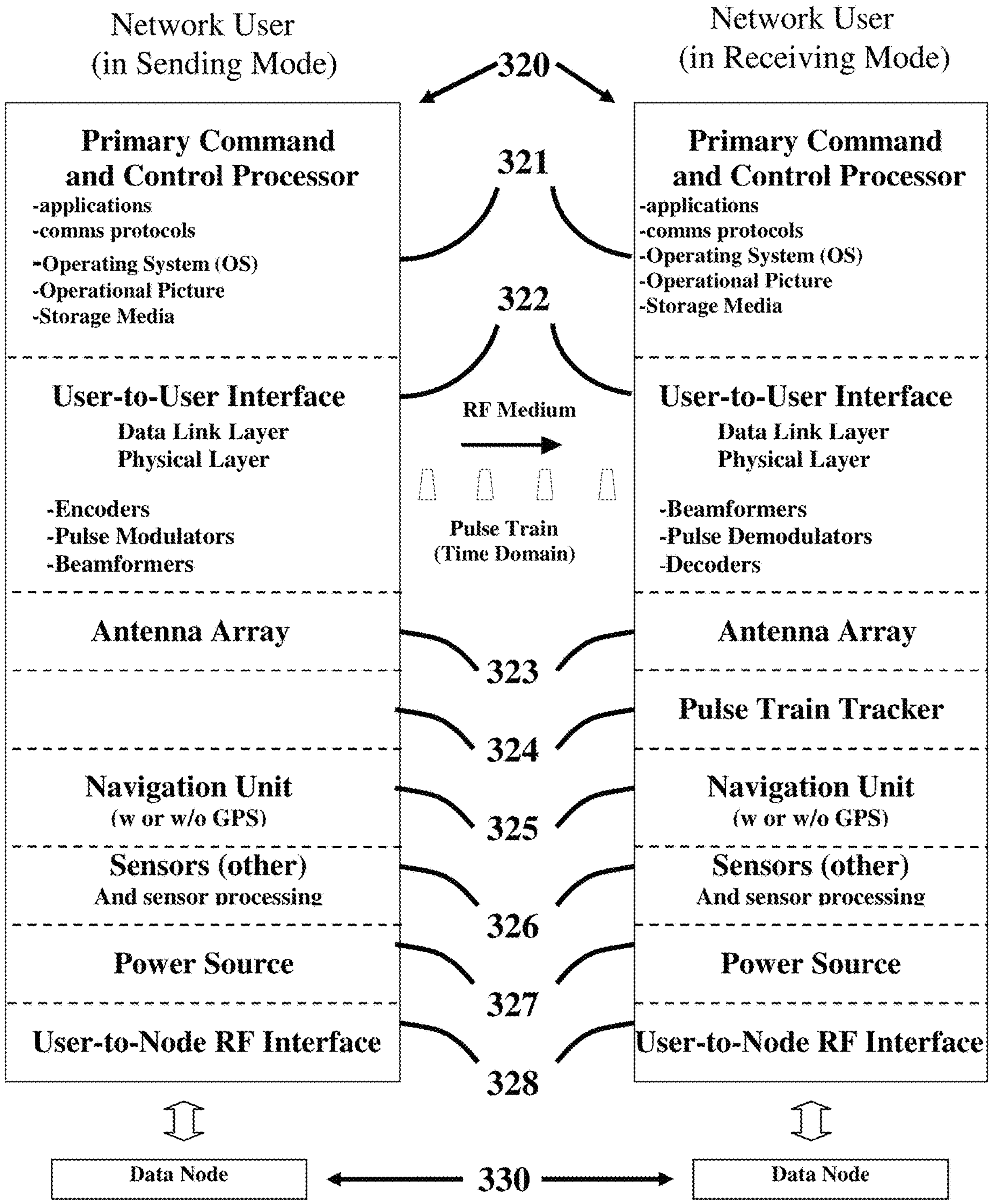
FIG. 3 depicts configurations of network Users coupled with elements of the invention.

FIG. 3 depicts Users coupled to various circuits of the present disclosure. (The Figure may show certain distinctions between Users in Sending and Receiving Modes, so as to clarify features of operation).

Exemplified as 320 in FIG. 3 are Users in Sending and Receiving Modes. There may be a Primary Command and Control Processor (PCCP) 321 which is configured to access storage media including program instructions executable by the PCCP, the program instructions including instructions to communicate with a plurality of analog circuits and digital circuits. The PCCP may include software program products configured to monitor status, log information and maintain databases. The PCCP may also include a database containing the Operational Picture. The PCCP may also contain an operating system (OS). The PCCP might contain both volatile and non-volatile digital memory for storage of databases and software program products. The PCCP might perform operations of the disclosure and those of the UE in a "tightly coupled" scenario. Alternatively, separate processors might be so employed.

Identified as 322 of FIG. 3 are circuits of the disclosure as may provide User-to-User RF pulse network interoperability. These may include (but are not limited to) encoders, modulators and demodulators, "beamformers" and a "Signal Acquisition Subsystem" as disclosed herein. These circuits may relate to what might be termed the "physical and data-link" layers of a communication system. The circuit structures of 322 may be communicatively coupled to the PCCP 321 for the exchange of various status and control information as may be described herein.

Referenced as 323 of FIG. 3 are high-frequency (e.g. mmw) antenna array(s) as may support beamforming operations. The antenna array 323 may be operatively connected to the circuitry of 322 of FIG. 3. For this disclosure, the antenna array 323 may include a plurality of analog "front-end" RF circuitry such as filters and amplifiers connected to elements of the antenna array.

Shown as 324 of FIG. 3 are one or more Pulse Train Trackers of the disclosure. These may separate pulse trains in a high pulse-density environment and also synchronize elements of 322 to a plurality of pulse trains. The Pulse Train Tracker might track pulse parameters comprising Time-of-Arrival (TOA), amplitude, and Angle-of-Arrival (AOA). It might also predict such parameters of the next incident pulse. The Pulse Train Trackers may be communicatively coupled to the PCCP 321 and operatively coupled to 322. The Pulse Train Tracker is a subject of further disclosure in Section 6.0 below.

Shown as 325 of FIG. 3 is a Navigation Unit of the User. This may include a combination of inertial sensors and computational resources. Access to satellite positioning systems may be included to enhance accuracy. The Navigation Unit may allow a User to determine its own position, orientation and velocity. This information may be provided to the Pulse Train Tracker 324 to aid in the measurement and tracking of pulse parameters in a mobile User environment. It might also be provided to the PCCP 321 as part of the Operational Picture. The Navigation Unit might be communicatively coupled to the PCCP.

Identified as 326 of FIG. 3 are various sensors and related compression processes of the User. Sensors may include audio, imaging, video, inertial, and tactile sensors. Compression processes might be performed by algorithmic specific processors and/or accelerators of the UE.

Identified as 327 of FIG. 3 is a power source which may be common to the User and various circuits of the invention.

Shown as 328 of FIG. 3 is a User-to-Node RF interface. Although not a prerequisite to construct the Mobile Network, interface 328 might allow a User to communicate with Data Nodes within a geographical area. This interface might be used to exchange status, User position and velocity, and other information. The interface 328 may also be communicatively coupled to the PCCP 321 within the User architecture. Data Nodes are depicted as 330 of FIG. 3.

1.5 Extended Pulse Structure

As disclosed herein, the Pulses from different Users may be separated in time, space and code domains. At the same time, this does not preclude techniques for frequency domain sharing among Pulses. One such technique is the use of long (extended) length OFDM symbols. This approach maps the orthogonal components of a Narrow Pulse to a subset of the subcarriers available in a wide pulse (i.e., symbol).

In this approach, the width "N" of an Extended Pulse might be defined by;

$$N=(M*K)$$

where;

M=width of Narrow Pulse

K=some integer factor, usually (but not necessarily) a power of "2"

Figure 4:
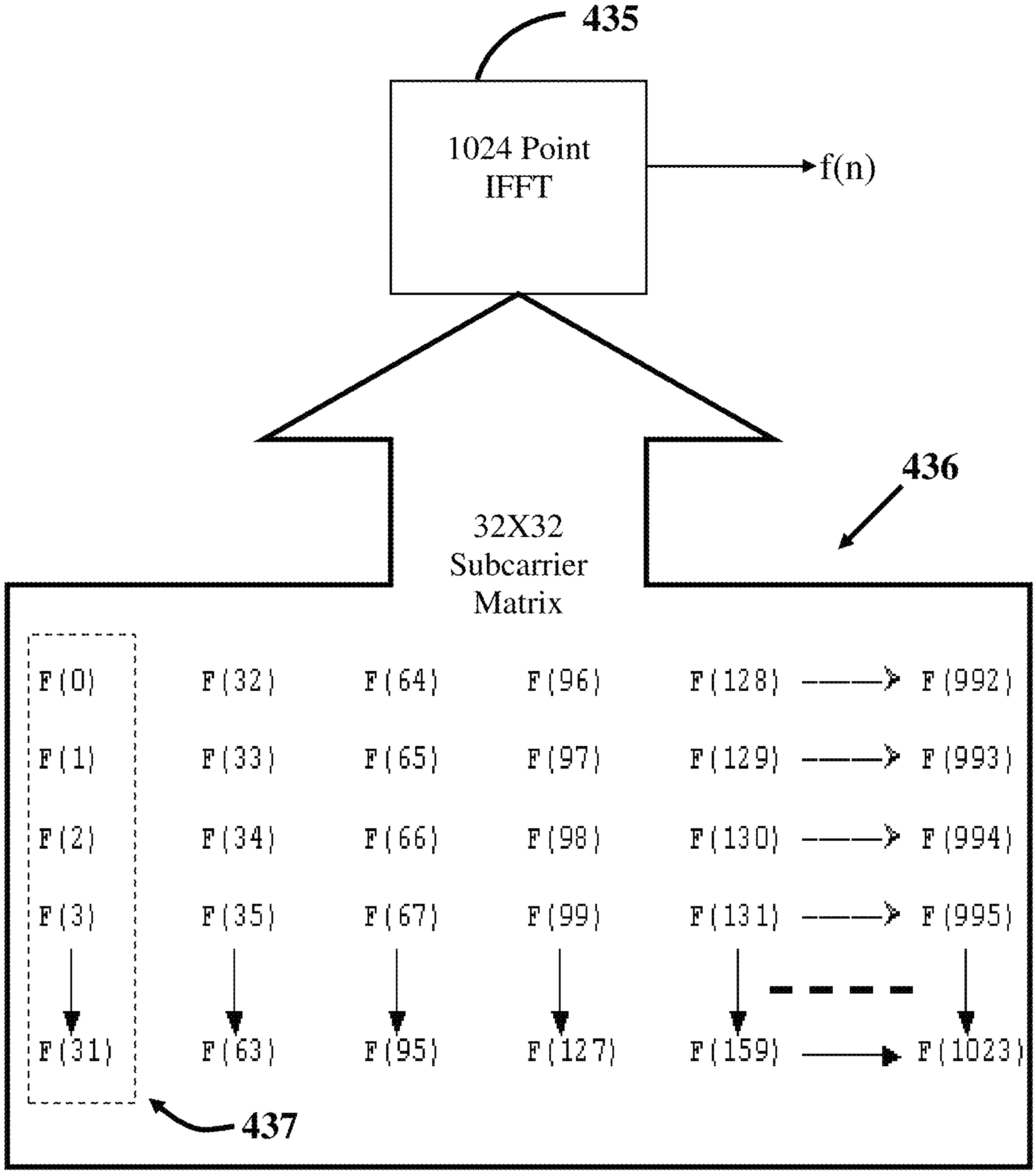
FIG. 4 depicts a contiguous subset of the 1024 subcarriers of an Extended Pulse which may be allocated to a 32 point sequence.

FIG. 4 exemplifies this mapping process with the subcarriers of a 1024 Point Inverse Fast Fourier Transform (IFFT) 435. FIG. 4 depicts M=K, such that N subcarriers are organized into a square Subcarrier Matrix 436. For this example M=32.

As shown in FIG. 4, M components maybe mapped to the subcarriers (frequencies) of a single column 437 of the Subcarrier Matrix. This constitutes a band of M=32 "contiguous frequencies". Other mapping patterns are possible. For instance, an M components might be allocated to rows (as opposed to columns). This produces a "dispersed" frequency pattern, consistent with the illustration of FIG. 4. (It may be noted that these two mapping processes are similar to Localized Frequency Domain Multiple Access (LFDMA) and Distributed Frequency Domain Multiple Access (DFDMA) respectively, as used in 5G wireless networks) After the mapping process the Subcarrier Matrix maybe subjected to IFFT 435 creating a signal for eventual up-conversion for RF transmission. The present disclosure may include the processes described above as related to both FDMA and DFDMA type modulations.

Figure 5:
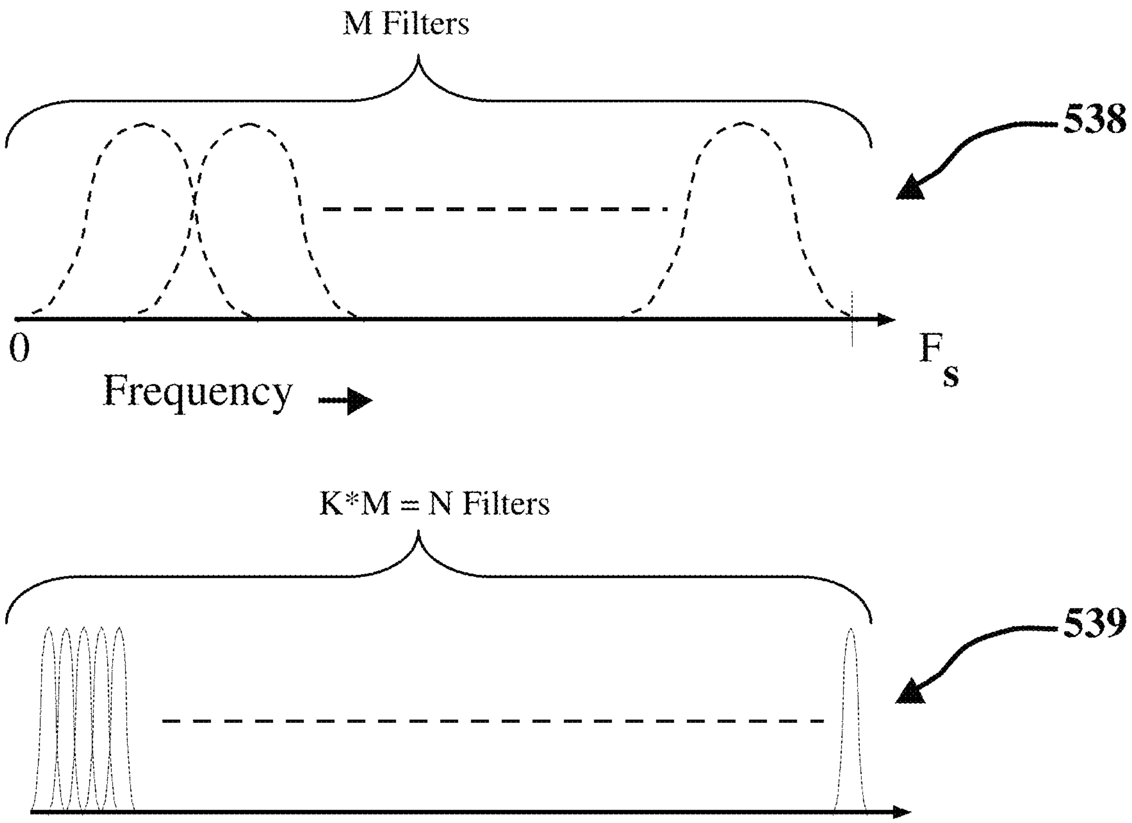
FIG. 5 reflects difference in frequency domain resolution between a Narrow Pulse and an Extended-Pulse.

FIG. 5 provides another perspective of the Extended Pulse. The Figure reflects the frequency domain resolution of an M-point DFT 538 versus an K*M point DFT 539. As seen, a longer time window causes more narrow and more numerous "filter responses". Accordingly, wide time-domain symbols can impose very stringent requirements on filters, modulators, synchronization and other components of systems. By contrast, the Narrow Pulses have the advantage of relaxing such requirements.

It is noted with regard to the above processes, that a Receiver might employ a modified FFT to recover only M of a possible N output coefficients from an Extended Pulse. Such FFTs are sometimes referred to as "sparse FFTs". Under certain conditions this can be far more computationally efficient than a conventional FFT. Accordingly the disclosure is intended to include calculating only a portion of the FFT outputs so as to minimize hardware and/or software complexities.

1.6 Baseband Pulse Generators

Figure 6:
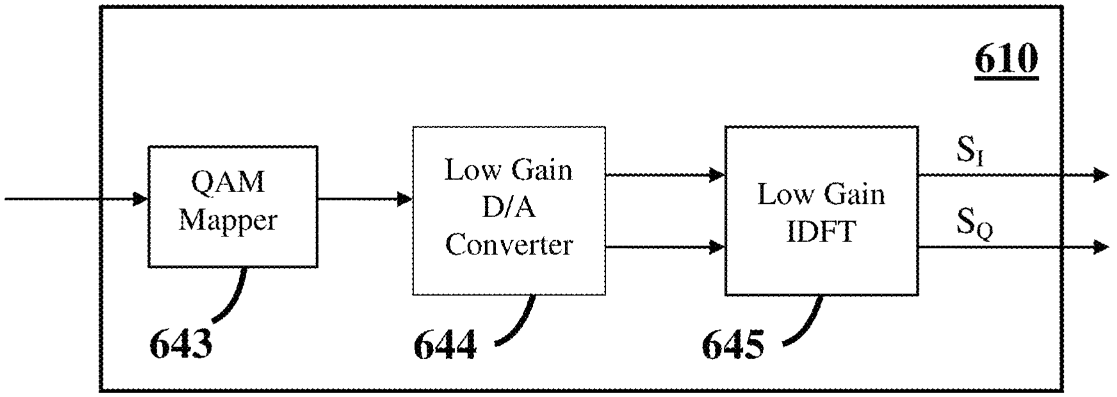
FIG. 6 illustrates an example embodiment of a Low-Gain Pulse Generator wherein subcarriers are modulated by a multi-state data pattern.

Referring to FIG. 6 is an example embodiment of a Low-Gain Pulse Generator 610. The signal path therein reflects a classic OFDM processing chain. There is a QAM Mapper 643, feeding a D/A Converter 644, followed by an Inverse DFT 645. The output of Pulse Generator 610 is a complex baseband signal as shown. The Inverse DFT may be calculated by novel memristor-based circuits as disclosed in Section 5.

The QAM Mapper 643 of FIG. 6 may encode several data bits into a QAM "constellation", as is known and employed in many OFDM systems. In this case a "multi-state" data pattern is encoded and provided to the input of the D/A Converter 644. (It is noted that alternative modulation schemes such as DFT-S-OFDM might also create multi-state data patterns by more complicated encoding schemes. Such encoding schemes are presumed and intended to be within the spirit of the invention.)

In the basic OFDM process, the QAM Mapper essentially defines the number of data bits carried by various subcarriers constituting the Low-Gain Pulse. As part of the disclosure, it is also an objective that the Low-Gain Pulse may contain a User ID. This may be achieved by dedicating one or more subcarriers to User identification information during the QAM mapping procedure.

Figure 7:
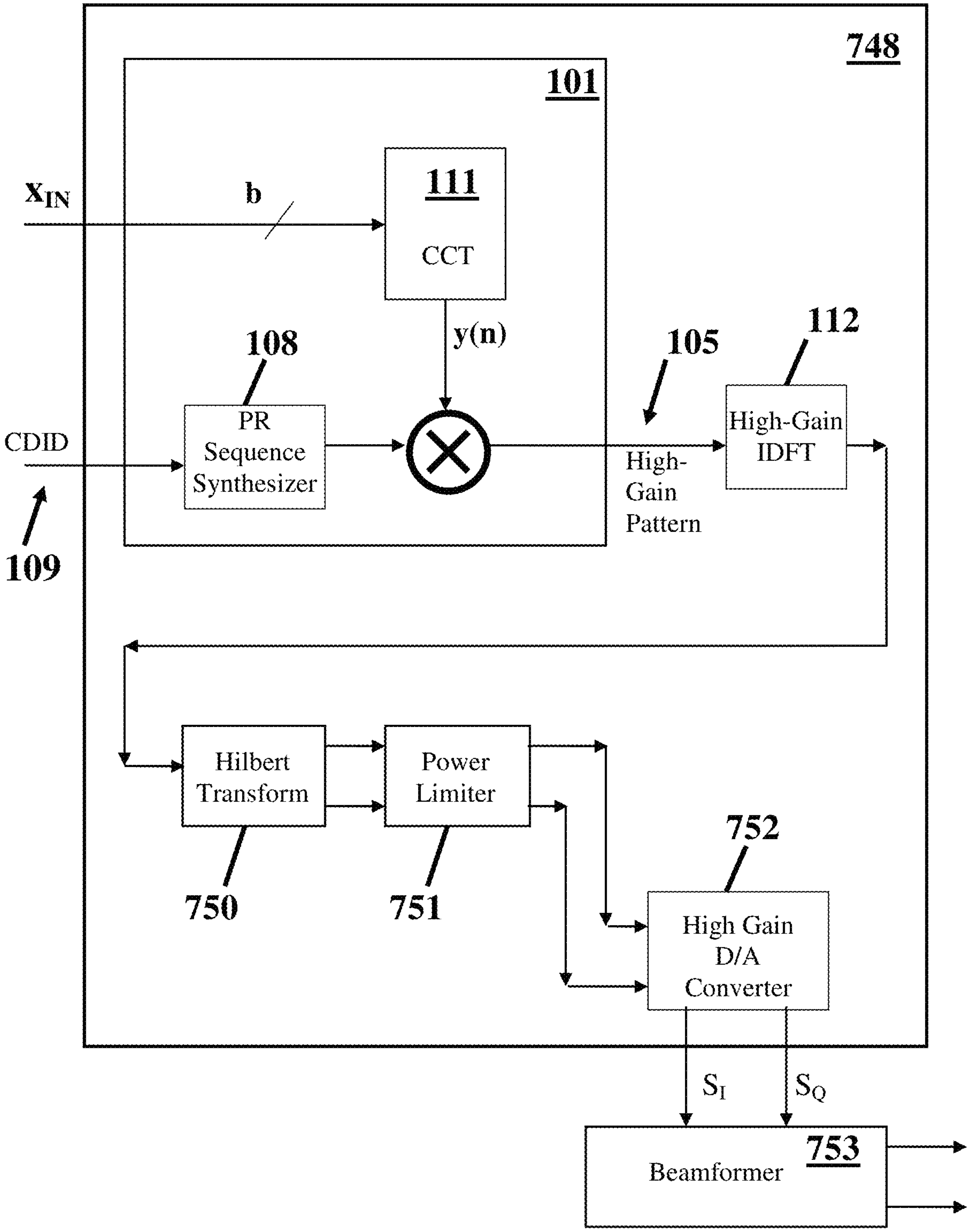
FIG. 7 illustrates an example embodiment of a High-Gain Pulse Generator wherein subcarriers are modulated by a bipolar data pattern of the Invention.

Referring to FIG. 7 is an example embodiment of a High-Gain Pulse Generator 748, which incorporates the High-Gain Pattern Encoder 101 of FIG. 1. The High-Gain Pulse Generator uses the High-Gain Pattern 105 of FIG. 1 for "subcarrier modulation".

As shown in FIG. 7 a High Gain Inverse DFT (IDFT) 112 is applied to the High-Gain Pattern 105. The IDFT output sequence (signal) might no longer be bipolar and has energy spreading in both time and frequency domains. This signal is then applied to a Hilbert Transform 750 creating an In-Phase (I) and Quadrature (Q) representation of the signal. The I/Q (complex) signal is then sent to a Power Limiter 751. The Power Limiter may mitigate Peak-to-Average Power (PAPR) by techniques such as "clipping" or "compression" of peaks in the signal power. (But at the same time, the use of relatively narrow pulses naturally mitigates the occurrence of strong signal peaks in the output of IDFT 112). The resulting signal is then converted to analog form by a two-channel D/A Converter ("High-Gain D/A Converter" 752) of FIG. 7. The resulting complex analog signal ($S_I$ and $S_Q$) may then be sent to a beamforming circuit 753 of the Figure.

The beamforming circuit 753 might be based on either time delay or phase control designs. However, phase-controlled beamformers are preferred in this disclosure, and is further described in Sections 3.0 and 7.0 below.

It is also noted that alternative embodiments of the High-Gain Pulse Generator 748 are possible, such as by omission of the Hilbert Transform 750. In such a case a complex signal might be derived directly from the IDFT 112. Alternative configurations are presumed to be within the intent of the disclosure.

Pulses from multiple Senders may "collide" at a common Receiver resulting in mutual interference. As previously described, this occurrence might be reduced by judicious assignment of PRIs to the various Mobile Network Users.

When using the High-Gain Pulse, the disclosure illustrates "code domain" discrimination for mitigating the effects of pulse collisions. This attenuates potential signal coherence among interfering pulses through the use of pseudo-random (PR) sequences. As seen in FIG. 1, the y(n) output from CCT 111 is multiplied by a PR sequence (User ID Sequence 104) to produce the High-Gain Pattern 105. By employing a unique PR sequence for each User, all other Users may appear as noise to a Receiver. The "Code Domain ID" (CDID) 109 of FIG. 1 and FIG. 7 may be used to select a unique PR sequence for a User. As seen in FIG. 1, the CDID is the input to the PR Sequence Synthesizer 108, which may produce a unique M-point bipolar sequence in a repeatable fashion for a given User.

As disclosed above, User pulses may be separated in both time and code domains. The spatial domain may also be exploited to separate pulse trains. This technique for avoiding "pulse collisions" relies on beamforming.

1.7 Spatial Domain Design

Beamforming may increase network capacity by separating Users in the spatial domain. It may also help to focus emitter power thus improving the range of mmw carriers. Beamforming may be applied to a variety of different pulse waveforms including the examples of Table I.

"Phase-based" beamforming is generally described as having three basic configurations. These are; analog, hybrid and digital. Of these three digital is considered to be the most flexible, and is conventionally achieved by placing a digital phase shifter into the signal path of each element of an antenna array. Digital phase shifting is preferable due to its flexibility and precision.

Digital phase shifting is traditionally deemed not practical for large antenna arrays as might be part of 6G systems. A basic problem is the need for an A/D and D/A circuit in the signal path of every antenna element.

However, novel beamformers of the invention may achieve the benefits of digital phase shifting while drastically reducing A/D and D/A circuitry. These beamformers may be "discrete" in phase but continuous in amplitude. They may place phase shifting into the signal paths of antenna elements using "memristor" circuit technology. This offers the advantages of conventional digital phase shifting, but with far less power consumption and complexity. Unique beamformers are introduced in Section 3, and further disclosed in Section 7.

The beamformers may accept a complex signal input. Such a signal (designated as $S_I$ and $S_Q$) is exemplified in the High-Gain Pulse Generator of FIG. 7.

Beamforming as currently perceived for many RF networks can impose significant latencies in establishing a connection between a Sender and Receiver. (Also, this connection is often handled through some base station). A basic issue is that a User and base station may not have mutual awareness of their locations when it is desired to initiate a connection.

Conventionally, a base station and User might engage in a complicated coordination process to establish an acceptable spatial beam path between them. This process imposes delay time (latency) in creating the connection. Such latency may extend into tens of milliseconds. This is in sharp contrast to desired responsiveness in tens of microseconds, as currently envisioned for various 6G environments. The present invention may alleviate this issue by point-to-point communication between Users (in lieu of connecting through a base station) and by providing a User with awareness of the location of other Users prior to initiating connection.

A Data Node may maintain a database containing the location of Mobile Network Users. The database may be shared with the Mobile Network, providing potential emitters (Senders) with a-priori knowledge of Receivers. This information might expedite Sender communications (and beam formation) without the delay of searching for a Receiver.

2.0 Levels of Network Data Flow

Section 2 describes utility and data flow of networks ranging from high densities of mobile Users, to applications having small numbers of stationary Users.

2.1 Communication Levels

Figure 8:
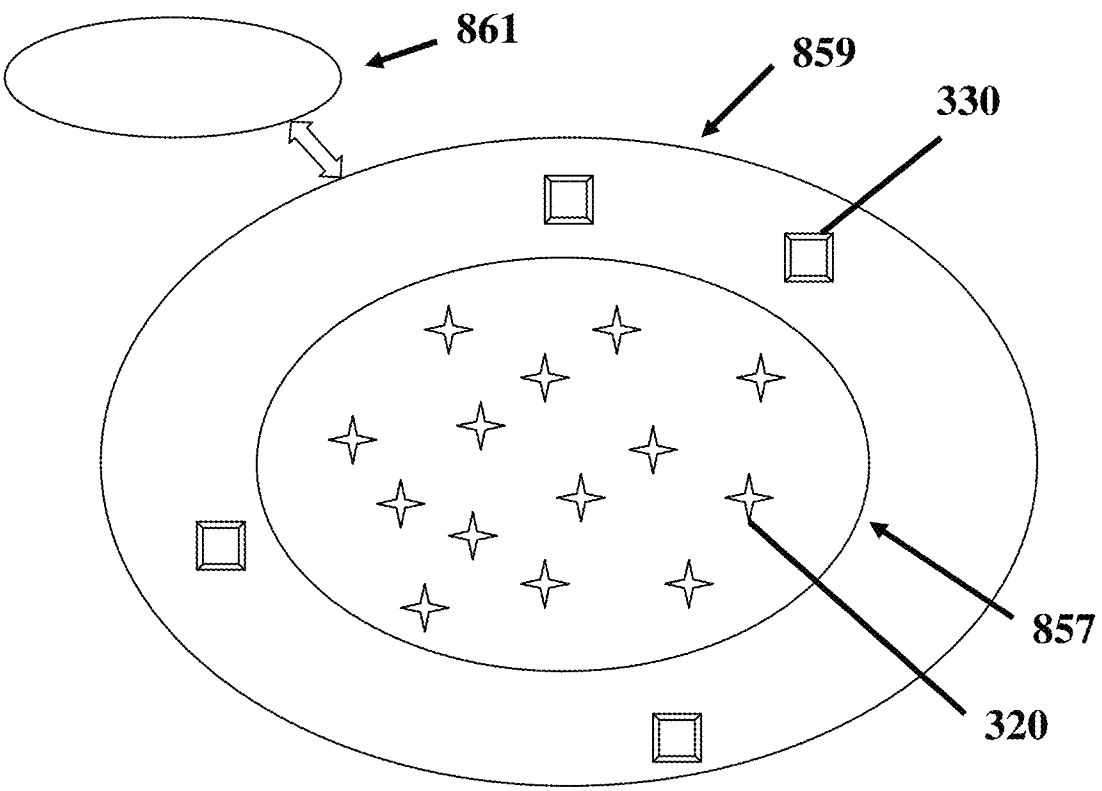
FIG. 8 depicts connectivity across multiple Network levels.

Illustrated in FIG. 8 are three levels of communication. The first level (857 of FIG. 8) is the Mobile Network, which may be populated by a high density of potentially mobile Users 320. A second level (859 of FIG. 8) may contain a lower density of Data Nodes 330. Data Nodes of the second level might connect to a third data level (861 of FIG. 8) which may be some LAN, WAN or the broader Internet.

Multiple communication levels might enhance low-latency direct connectivity among Users. Overhead associated with resource allocation by base-station(s) might be minimized. Rapid beamforming among Users may be facilitated. Within the Mobile Network, User signals may be separated in time, space and code domains.

The Data Nodes might maintain a database of location, velocity, CDID, PRI and status of the Mobile Network Users. The database is termed herein as an "Operational Picture". A single Data Node might provide the Operational Picture to many Users in its geographical vicinity. This may be accomplished via the User-to-Node RF Interface 328 of FIG. 3.

Data Nodes might be physically attached to, or deployed in, various structures. These include (but are not limited to) cell-phone towers, utility polls, buildings (interior and/or exterior). Nodes might also be located above or below ground.

Figure 9:
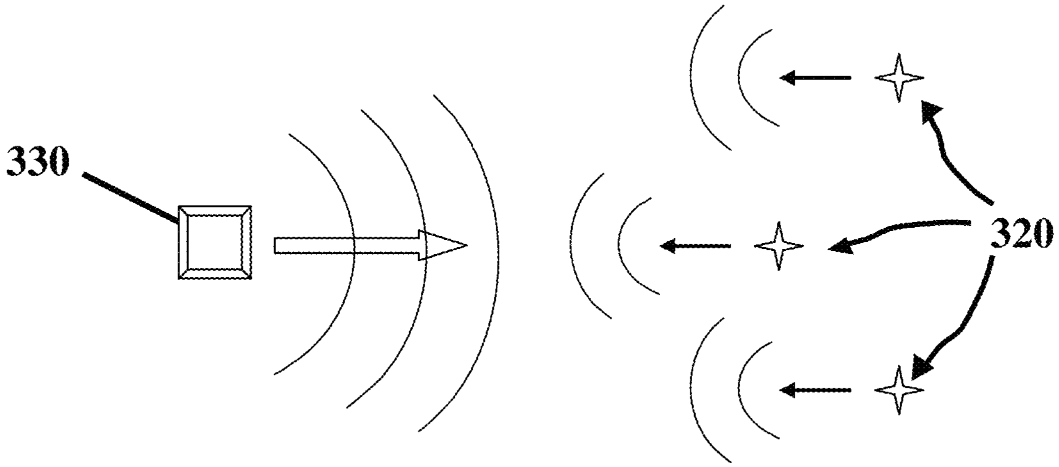
FIG. 9 depicts collection of status information from multiple Mobile Users by a Data Node, and broadcast of the Operational Picture back to the Mobile Users.

A Data Node might broadcast the Operational Picture to the Mobile Network for local storage on User platforms. This is illustrated in FIG. 9 where Users 320 send their status to some Node 330, which then broadcasts the Operational Picture back to the Users. The Operational Picture might also be transferred back to the third data level (861 of FIG. 8).

The third data level may also be a provider of data to the Operational Picture. This may include geospatial data, imagery and video from remote sources. Such information might aid in navigation and obstacle avoidance at the mobile User level. The Primary Command and Control Processor 321 of FIG. 3 might request and use such information on either an ad hoc or pre-programmed basis.

Spatial information might be made available to mobile Users via the Operational Picture. Users may be equipped with a Navigation Unit. This aids the User in Spatial Tracking of its own position, and reporting such data to the Operational Picture. Various configurations of the Navigational Unit may be aided by inputs from the Global Positioning System (GPS), or other sources.

It is noted that Spatial Tracking (User tracking its own position with the Navigational Unit) differs from the Disclosure's "Pulse Train Tracking". The former may have inertial sensors (possibly augmented by GPS) as inputs to a tracking filter, with update rates ranging from tens to hundreds of Hz. In the latter, tracking inputs may be measured parameters of pulse signals with possible update rates on the order of Mhz.

2.2 Prioritized Data Transmission Methods

The diversity of pulses of the present disclosure provide unique forms of efficiency. For example, the High-Gain Pulse may have particular utility in synchronizing communication among Users and in signal acquisition as referenced later in this description. Alternatively, the Low-Gain Pulse may have greater data capacity than the High-Gain Pulse. The Extended Pulse might provide still higher data capacity. The diverse pulses allow optimal matching of pulse types to specific data types.

As a result, "heterogeneous" pulse trains having different pulse types are possible. This may optimize the reliability and efficiency of User transmissions.

2.2.1 Multi-Media Transmission

The diversity of disclosed pulse types has particular utility in the transmission of multi-media data. Such data includes imagery, video, speech and music. It may constitute the primary data type in many future 6G wireless network applications. The volume of multi-media data flow may be challenging even for 6G networks. Accordingly, multi-media will likely be compressed before transmission.

Multi-media compression algorithms often subject their results to "data partitioning". This organizes the compressed data according to its impact on human perception when decompressed. Communication systems may then allocate resources according to the priority of "partitions" (components) of compressed data, thus achieving a degree of "error resilience" in the data transmission. The present invention might exploit this practice as follows.

A Sender in the Mobile Network may employ the High-Gain Pulse (as an example) for transmission of higher priority components of compressed multi-media. This assures maximum protection of such components against noise during their transmission. Also, the High-Gain Pulse may be used for transmission of critical pieces of "metadata" which could have substantial error effects if corrupted. Such metadata might include various types of "header" information describing the dimensions and/or formats of blocks or components of the compressed data. The Low-Gain Pulse (for example) may then be used for transmission of lesser priority components of the compressed multi-media data.

It is notable that in the case of multi-media data, some uncorrected error may be tolerable even for compressed forms of such data. Significant research has been done in the area of "masking" the effect of errors incurred during the transmission of multi-media content. Such techniques are generally based on facilitating human perception of such content despite the occurrence of errors.

2.2.2 Control and Telemetry Data Transmission

Other types of data are of much lower volume than multi-media, but may be time critical and highly sensitive to loss. Communication of such data might be of a machine-to-machine (M2M) nature. This may include collision avoidance or long-distance control among mobile User platforms (e.g. drones, autonomous vehicles or factory equipment).

In such scenarios, the reliability and responsiveness of the communications link can be more critical than its data capacity. Accordingly, employment of the High-Gain Pulse might be preferable in such instances.

2.3 Network Topologies and User Connectivity

As described, Users may connect directly (point-to-point) using pulse trains which are separated in time, space and code domains. This may greatly decrease latencies associated with resource allocation by base-station(s). A variety of Network topologies may be possible.

Figure 10:
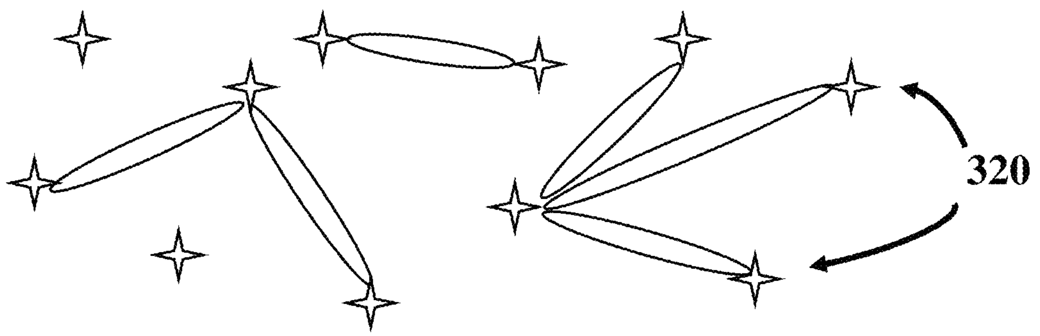
FIG. 10 illustrates a random spatial distribution of Mobile Users, where point-to-point and multi-cast connectivity may be established through the Mobile Network.

As seen in FIG. 10, Users 320 might be randomly distributed in space and in relative motion. As shown, Users might communicate using one-to-one or one-to-many (multi-cast) schemes with RF spatial beams. Connectivity might be spontaneous (ad hoc) among Users or pre-planned. Such scenarios have utility in the realms of driverless vehicles, airborne drones and personal communications.

Figure 11:
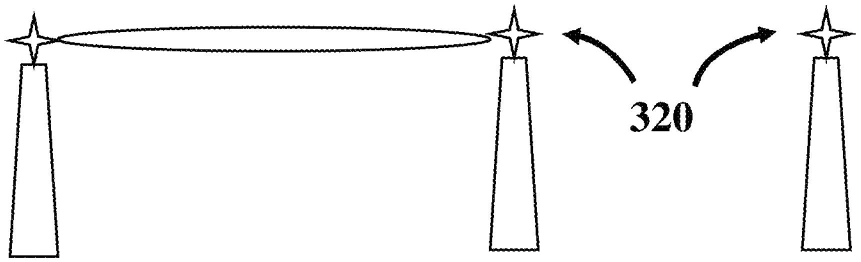
FIG. 11 depicts a scenario of multiple stationary Users.

FIG. 11 shows multiple Users 320 in a stationary setting. In this topology Users may be situated in either the interior or exterior of buildings. They may be fixed on walls, mechanical or electrical equipment, towers or other objects. Utility of such configurations extends to (but is not limited to) communications, factory automation, data centers and other applications. A plurality of simultaneous links might be established on an ad hoc, low-latency basis.

Figure 12:
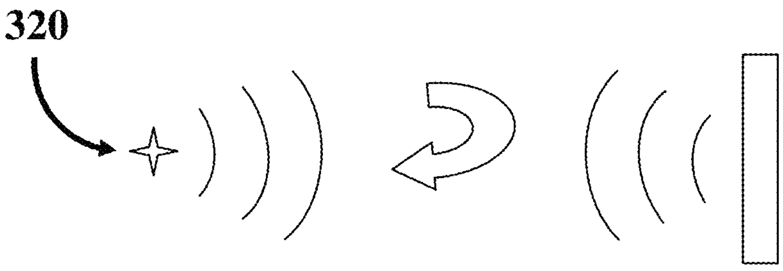
FIG. 12 show a User in an "active RF sensing" scenario.

FIG. 12 depicts an application pertaining to "active RF sensing". In this application the User 320 might emit a beam of millimeter wave energy and detect the "backscatter" of radiation from an object. The utility may range from vehicle collision avoidance to medical diagnostics.

Beamforming is a key to enabling formation of the topologies above in an ad hoc, mobile User network environment. The present disclosure extends to digital beamforming. Also disclosed herein are unique structures and methods using memristors in beamformers, wherein the functionality emulates that of beamforming using conventional digital circuitry and signal conversion (A/D and D/A) devices.

3.0 Beamformer Approaches and Structures

The physics of beamforming involves either adjustable time delays of multiple RF antenna signal paths, or phase control within such paths. Also, phase control is generally classified as either analog, digital or hybrid. Of these three options, digital phase control is preferable for precise spatial beam formation, switching and steering. However digital phase control of a multiplicity of signal paths is often not feasible for small, low-cost form factors. This is due to the need for complex digital circuitry and signal conversion (A/D and D/A) devices.

The disclosure may offer the operational advantages of digital beamforming while reducing circuit cost and complexity. The need for massive A/D and D/A circuitry normally associated with digital beamforming may be significantly alleviated.

Disclosed herein are unique beamforming structures using memristor technologies. This yields embodiments wherein memristor circuitry is used in a multiplicity of antenna signal paths to effect beamforming with large antenna arrays. This Section describes some embodiments which may focus on stationary or slowly moving Users. Further embodiments for more dynamic scenarios are disclosed in Section 7 below. Disclosed therein is unique discrete-in-phase, continuous amplitude beamforming.

Some embodiments of beamformers in the disclosure may include phase shifters, "down converters" and "up converters". The embodiments are given for example, and alternative embodiments are possible. Some embodiments might include more (or less) up-conversion or down-conversion stages. Other embodiments for lower carrier frequencies (e.g., below mmw) may exclude traditional signal conversion (frequency translation) stages by employing "direct digital sampling" or "baseband sampling". The scope of the present invention is assumed to extend to all such alternative embodiments.

3.1 Memristor-Based Beamformers and Processes

A memristor is a simple form of circuit element which exhibits features of both a memory and a resistor. It is sometimes termed a "programmable resistor". It can be dynamically programmed (by electrical signals) to assume and retain a certain conductance value. Further, it can be re-programmed. In the present disclosure memristors may eliminate the need for large arrays of A/Ds and D/As to implement phase shifting within beamforming structures. Memristors may be used to perform the multiplications needed for beamforming by simple scaling of analog values. This results in far more cost-effective and lower-power embodiments than are traditionally recognized for digital beamforming.

"Memristor" herein may be a general term for a variety of technologies which act as "programmable resistors". Under the present disclosure "memristors" may include (but not be limited to); Phase Change Memories (PCMs), Resistive RAMs (RRAMs), Magnetoresistive RAMs (MRAMs), and Correlated electron RAMs (CeRAMS), as well as general material classes such as binary oxides, perovskites, ferrites, chalcogenides and organic materials. In the present disclosure "memristors" may include non-volatile as well as volatile "programmable resistor" circuit technology. The term is also to include circuit elements capable of a "programmable conductance".

Therefore some embodiments disclosed herein might include any suitable memristor technology in various beamformer structures. The structure and approaches disclosed herein may be instrumental in realizing miniaturized circuitry capable of beamforming by phase control processes.

A physical Memristor Memory structure might comprise thousands of individual memristor elements. In this disclosure the memristor elements may be aggregated into "cells". Within each cell may reside one (or more) memristor elements, often accompanied by one (or more) transistors which may control a memristor's programming current, and/or enable its operation as a resistor-like "circuit element".

Potential limitations of memristors may include limited accuracy, resistance drift and cycling endurance. However the accuracy of current memristor technologies may be sufficient for precision beamforming with large antenna arrays. "Resistance drift" may occur in various memristor technologies after long periods of operation. In the present disclosure the effect may be alleviated by periodic calibration and/or "reset" of memristor element values.

"Cycling endurance" is a significant issue for many memristor technologies. The lifetime of memristors may be limited by the number of reprogramming or "write" cycles to which they are exposed. The issue might be naturally mitigated in some situations such as in FIG. 11 where Users might be stationary. In this scenario a beam shape and direction may be relatively stagnant, requiring little adjustment and therefore limited reprogramming of beamformer memristor circuits. Likewise, for mobile Users having slow changes in relative orientation (as might be informed to said Users by the Operational Picture) beamformer adjustments might be minimized.

Also, the disclosure allows for "deactivation" of memristors between pulses in both Sending and Receiving modes. Deactivation may suppress current flow through the memristor elements thereby extending their lifetime.

Also, beamformer reliability may be supported by circuit redundancy. A large Memristor Memory might be composed of thousands or tens of thousands of individual memristor elements. However relatively large antenna arrays may be composed of only a few hundred antenna elements. Consequently only a segment of the Memory might be "activated" for real-time beamforming, while "spare" segments remain inactive and unused. Deficient "active" segments might then be bypassed and replaced by spare segments as needed.

Also, the beamformers might be periodically tested and calibrated to adapt to resistance drift. Testing may also allow response to fault conditions in bypassing failed memristor elements or cells.

3.2 Beamformer Embodiments

The present disclosure now describes novel Beamformer structures. Additional structures of pre-programmed massive Memristor Memories of "beam shaping libraries" are presented in Section 7.0.

The nature of phase-controlled beamforming is such that the amplitude and phase of a multiplicity of antenna signal paths are independently controlled. The signal paths are connected to the elements of an antenna array. For 6G communications, there may be dozens or hundreds of separate antenna elements. Subsections below further disclose beamforming circuits and methods for these purposes.

For purposes of illustration, embodiments depicted herein may depict or imply separate antenna signal paths for beamforming in Sending and Receiving Modes of operation. Alternative embodiments might combine various circuit paths, thereby reducing the cost and complexity of RF circuitry. It is understood that such alternatives fall within the spirit of the disclosure.

3.2.1 Sender Beamformer Circuit

Figure 13:
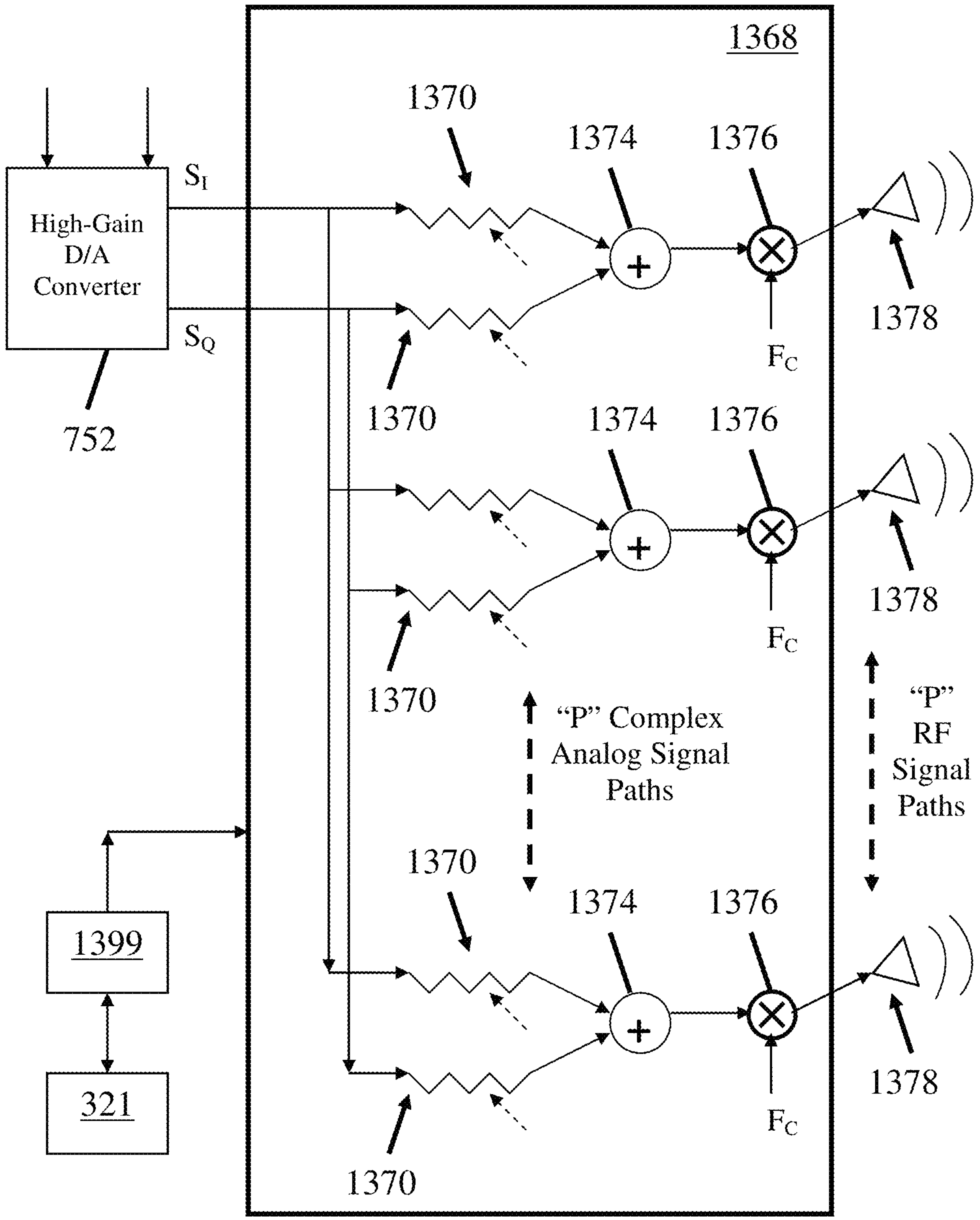
FIG. 13 shows an exemplary Sender Beamformer embodiment using memristor circuitry for beamforming.

Seen in the example of FIG. 13, for some embodiments there may be a Sender Beamformer 1368 comprising memristors for beam formation by a Sender (transmitter). The example is for an antenna array of "P" elements. In the example the input to the Beamformer is the complex analog signal ($S_I$ and $S_Q$) from the High-Gain D/A converter 752. This signal feeds P pairs of memristor "Cells" 1370 as shown. The Cells may be organized for complex multiplies and bipolar signals. The Cells 1370 might include multiple memristor elements, transistors and/or diodes. The ensemble of P parallel pairs of Cells may be termed herein as a Sender "Beam Array".

In FIG. 13 the pair of Cells 1370 is duplicated "P" times. Although drawn as classic resistor elements in the Figure, the Cells are a distinct type of circuit. They may have programmable conductance, non-volatile memory properties, and perform scaling of an analog input signal.

An adder 1374 is shown in FIG. 13. This combines complex signal components into a single signal. The adder output represents the phase-shifted signal at "baseband". This is also duplicated P times as shown.

An Up Converter 1376 of FIG. 13 mixes the baseband signal with the local oscillator (LO) output $F_C$. This function is also duplicated P times, using the same LO signal.

The output of the Up Converter is sent to an RF path 1378 of the Figure, which includes any final filtering, power amplification and the specific antenna element associated with the signal path. This is also duplicated P times.

Also seen in FIG. 13 is a Sender Calibrator 1399. This device may maintain the beamformer memristors within some desired operational bounds. It may detect memristor conditions, and apply voltages (or currents) to adjust the memristors' conductance values. Adjustments might take place on a periodic basis, or as directed by the PCCP 321 shown in FIG. 13. The Sender Calibrator might also apply programming currents to the memristors. This may occur with the PCCP supplying programming information to the Sender Calibrator for instantiation into the Cells 1370. Said programming information may define the shape and direction of one or more spatial "beams" of the antenna array. Current and voltage waveforms applied by the Sender Calibrator 1399 may be specific to the type of memristor technology used in the beamformer construction. The Sender Calibrator 1399 might also disable current flow through the Sender Beam Array except to transmit a pulse. This may serve to maximize memristor lifetime, and conserve User power consumption.

3.2.2 Receiver Beamformer Circuit

Figure 14:
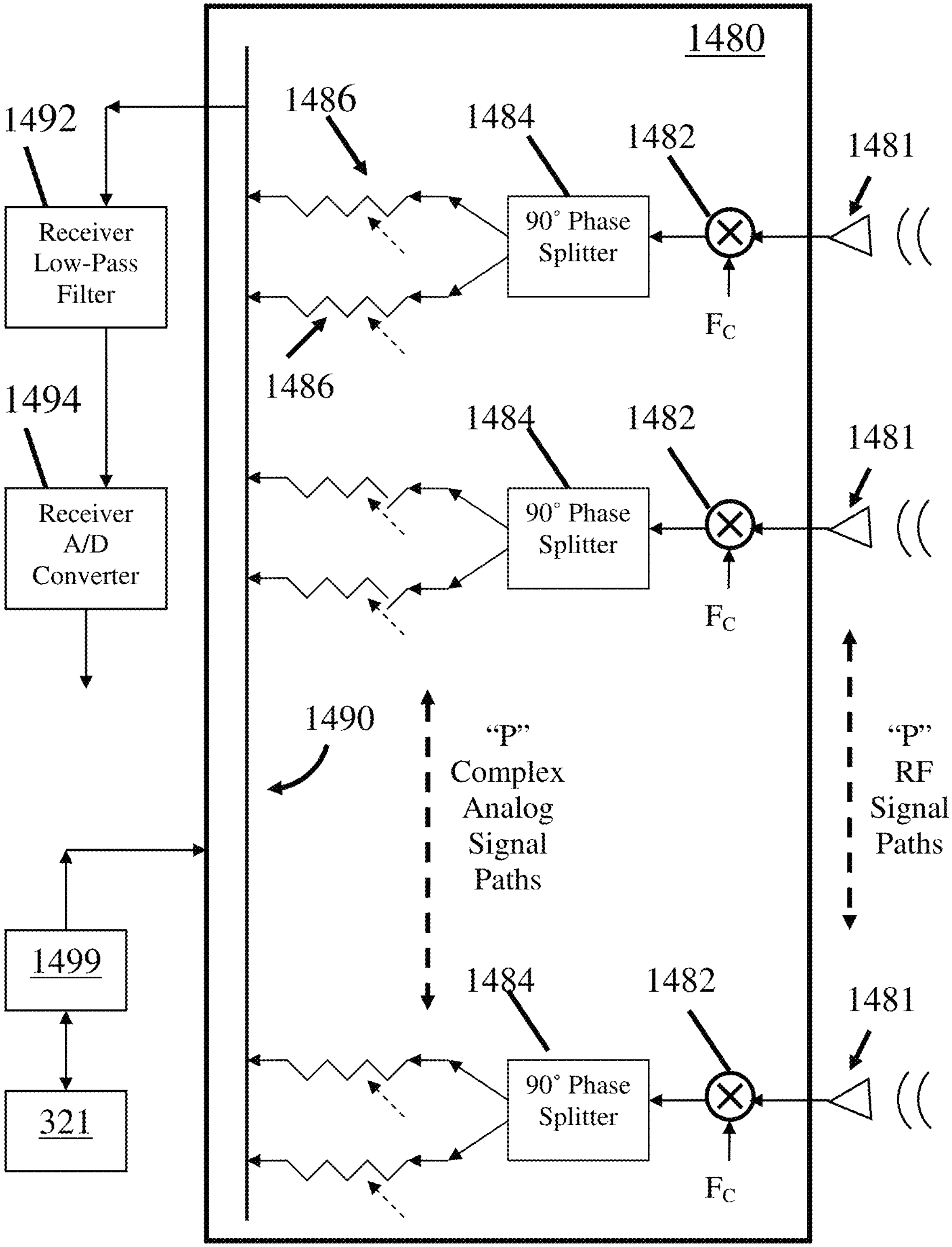
FIG. 14 shows an exemplary Receiver Beamformer embodiment using memristor circuitry for beamforming.

As exemplified in FIG. 14, for some embodiments there may be a Receiver Beamformer 1480 comprising memristors for beam formation by a Receiver. The illustration is for an antenna array of "P" elements. The inputs to Beamformer 1480 are the RF paths 1481, where each path may include an antenna element, filters and low noise amplifier (LNA). The RF path 1481 is duplicated P times as shown.

In FIG. 14 there is a Down Converter 1482 in each signal path. This down-converts the signal from RF path 1481 to "baseband". This may be duplicated P times with all Down Converters using the same signal from the local oscillator, $F_C$.

The baseband signal from 1482 goes to a 90° phase splitter 1484, which produces a complex analog signal at baseband. This is duplicated P times.

The complex outputs from the phase splitters 1484 feed memristor Cells which perform multiplications for beamforming (via scaling). Pairs of Memristor Cell 1486 are depicted for this purpose, and are duplicated "P" times as shown in FIG. 14. The Cells 1486 may include multiple memristor elements, transistors and/or diodes. The ensemble of P parallel pairs of Cells may be termed herein as a Receiver "Beam Array".

The outputs of the memristor Cells are summed at a crossbar 1490 to form a single analog signal. This signal is then sent to a Receiver Low-Pass Filter 1492 of FIG. 14. The output of 1492 may then be converted to a digital signal at baseband by a Receiver A/D Converter 1494 shown in FIG. 14.

Also seen in FIG. 14 is a Receiver Calibrator 1499. This device may maintain the beamformer memristors within some desired operational bounds. It may detect memristor conditions, and apply voltages (or currents) to adjust the memristors' conductance values. Adjustments might take place on a periodic basis, or as directed by the PCCP 321 shown in FIG. 14. The Receiver Calibrator might also apply programming currents to the memristors. This may occur with the PCCP supplying programming information to the Receiver Calibrator for instantiation into the Cells 1486. Said programming information may define the shape and direction of one or more spatial "beams" of the antenna array. Current and voltage waveforms applied by the Receiver Calibrator 1499 may be specific to the type of memristor technology used in the beamformer construction. The Receiver Calibrator 1499 might also disable current flow through the Receiver Beam Array except to receive a pulse. This action may be contingent upon signals provided by the Pulse Train Tracker, as described further in Section 6.0. This may serve to maximize memristor lifetime, and conserve User power consumption.

It is emphasized here that the depictions of Beamformers 1368 and 1480 do not imply restriction of their use to linear arrays of antenna elements. On the contrary, the Beamformers of FIGS. 13 and 14 (and variations thereof) may be employed to support antenna arrays of arbitrary physical organization (e.g., one-dimensional, two-dimensional, et. al.). Therefore other embodiments having such antenna array organizations are deemed to be within the spirit of the present disclosure.

4.0 Signal Acquisition Subsystem (SAS)

Mobile Network Users may initiate connections without routing through a base station or engaging in various "global" coordination procedures. This may be aided by the Operational Picture which informs Users of their mutual status, location, ID and other information. Connectivity might also be initiated by subsystems and methods as described below. This may facilitate low-latency ad hoc communications by avoiding time consuming processes such as "resource allocation" and "beam management" as may occur in 5G and/or other network architectures.

An integral part of conventional beam management is "spatial searching". By avoiding this procedure tens of milliseconds of latency might be eliminated in acquiring a signal. To acquire a signal without conventional processes the disclosure now describes an RF direction finding (DF) subsystem and methods. This may involve two distinct "states" with regard to establishing User connectivity, as disclosed below.

A "Signal Acquisition State" may be provided, whereby a Sender may transmit special pulses toward a Receiver in order to initiate a connection. At the same time, a Receiver may acquire such pulses over a wide spatial angle. This latter capability is enabled by a "Signal Acquisition Subsystem" or "SAS". The SAS may operate independently of, and in parallel with, a User's phase-controlled beamformer.

The SAS may support high-accuracy DF by "Amplitude Comparison" techniques, which are distinctly different from beamforming. Amplitude Comparison relies on comparing the incident power received in overlapping, identical antenna patterns. It is an inherently "monopulse" technique capable of extremely rapid response, given sufficient SNR. Amplitude Comparison may support low-latency signal acquisition and avoid long "spatial searching" procedures.

"Phase Comparison" is another monopulse detection approach and may be an alternate configuration of the SAS. However Amplitude Comparison can be easier to implement than Phase Comparison and is described below in the context of a subsystem of the present disclosure.

4.1 Pulse Parameter Measurement

Figure 15:
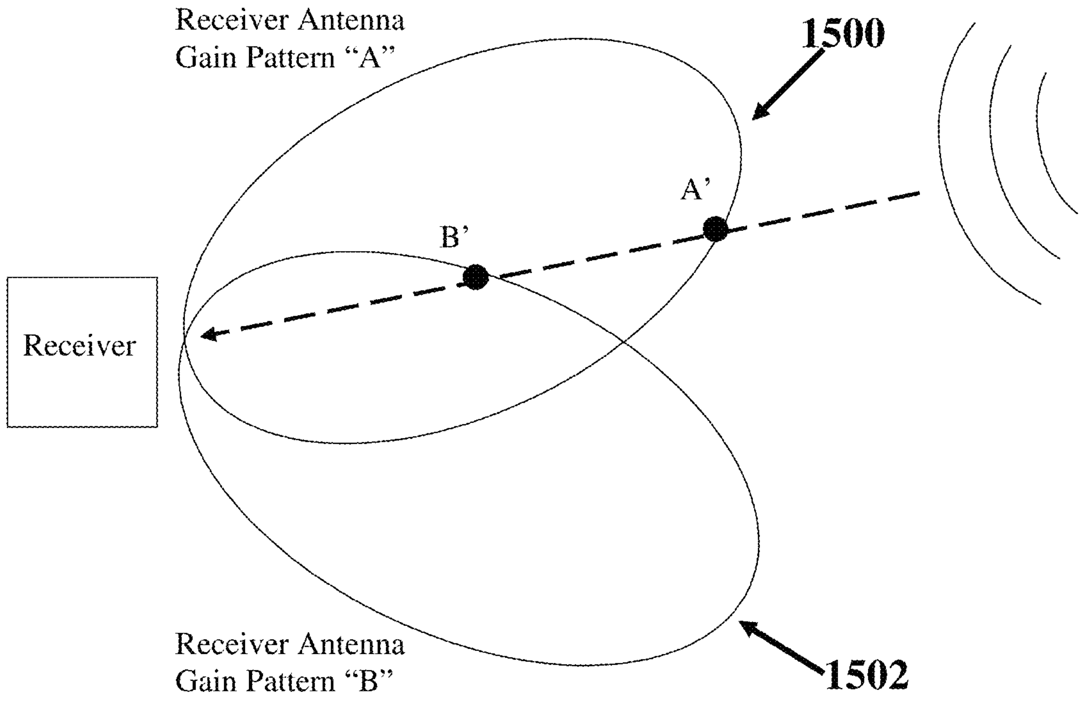
FIG. 15 depicts overlapping antenna patterns for an amplitude comparison RF pulse direction finding (DF) subsystem.

FIG. 15 is an example of antenna patterns to support Amplitude Comparison DF. Depicted are the partially overlapping antenna "gain patterns" 1500 and 1502, (Receiver gain patterns A and B respectively). Angle-of-Arrival (AOA) of a signal is determined by the ratio of detected power in these two patterns.

Figure 16:
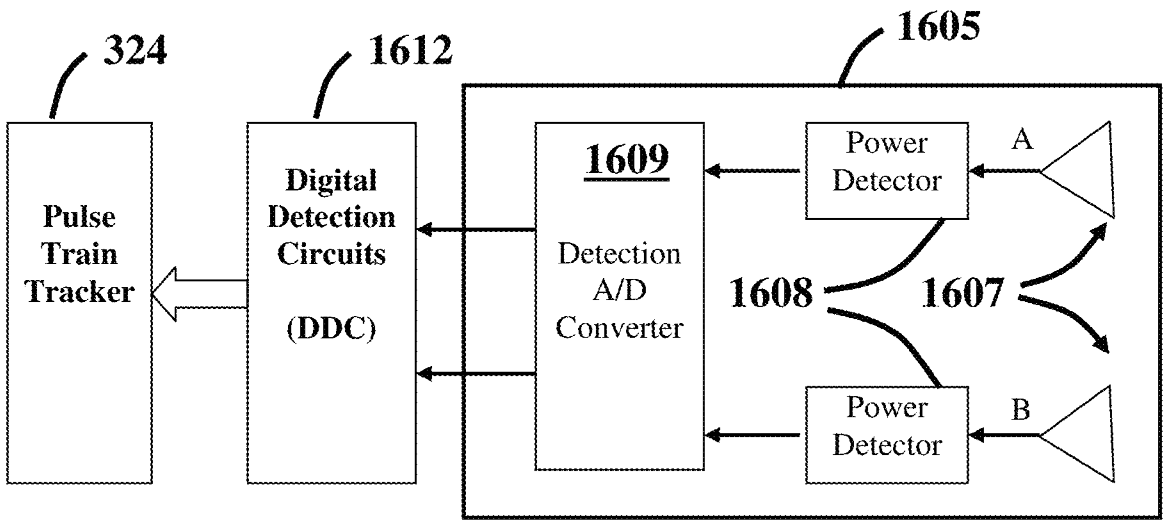
FIG. 16 is an example embodiment of a Signal Acquisition Subsystem (SAS).

Depicted in FIG. 16 is an example embodiment of the SAS 1605. There are two identical channels as shown. The RF front-end 1607 of each channel includes a wide-beam antenna and associated amplifier and RF filtering circuitry. The front-end signals are then sent to Power Detectors 1608, which are capable of detecting the power levels of incident signals (where "power" might be defined as short-term signal energy).

Various forms of power detectors have been well analyzed and deployed for RF pulse detection. An example is a Crystal Video Detector. The attributes of such a detector can include wide frequency bandwidth and nearly instantaneous pulse detection. Some embodiments of the SAS of FIG. 16 may include Crystal Video Detectors in the circuitry of the Power Detectors 1608. Some alternative embodiments might employ other forms of wide-bandwidth pulse detectors.

The Power Detectors' outputs are sent to a two-channel "Detection A/D Converter" 1609 to digitize pulse power levels. The subsequent digitized power levels are then sent to Digital Detection Circuits (DDC) 1612 of FIG. 16, where the pulse AOA and TOA parameters may be measured as further disclosed in this Section.

DDC 1612 sends the measured pulse parameters to Pulse Train Tracker 324 in FIG. 16. During the Signal Acquisition State the Pulse Train Tracker may "screen out" pulse trains which have previously been acquired and are already being tracked. This is a natural advantage of the use of pulses (as opposed to continuous signals) in the signal acquisition procedure.

Figure 17:
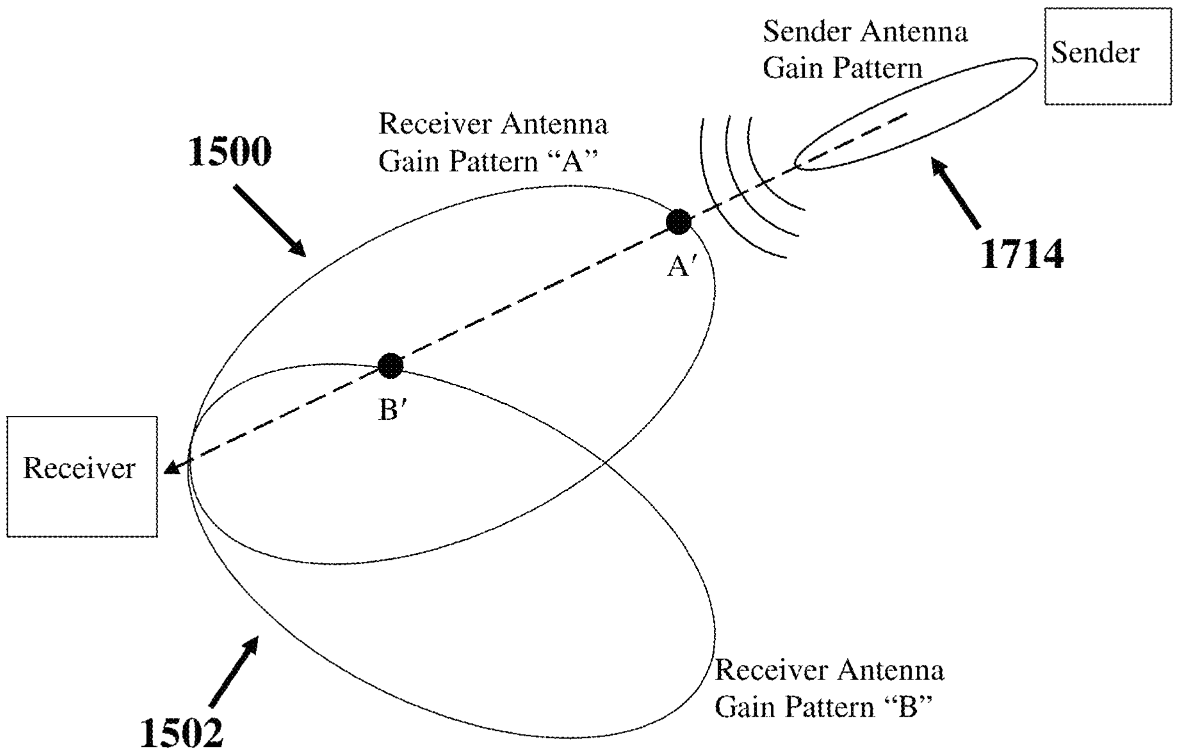
FIG. 17 illustrates antenna gain patterns in a Signal Acquisition State.

FIG. 17 exemplifies antenna patterns for both Sender and Receiver in the Signal Acquisition State. The Sender uses a beamformer to direct the narrow beam pattern 1714 at the Receiver. The Receiver's SAS employs broad, overlapping antenna patterns 1500 and 1502 to intercept the Sender beam. These patterns provide relatively wide angle spatial coverage. As seen in FIG. 17, the directed beam from the Sender "intersects" the Receiver's broad antenna patterns at points A' and B'.

The AOA of the signal may then be measured by comparing the relative signal power levels inferred at points A' and B'. Different techniques exist for making this comparison, which may depend on specific pattern shapes. A technique which may be used when the patterns are "sine" shaped, is given as follows;

$$AOA \approx \tan^{-1}(B_P/A_P)$$

where $B_P$ and $A_P$ are the detected power from antenna patterns 1502 and 1500, respectively.

Amplitude Comparison is essentially a "monopulse" measurement process. Given a suitable SNR the approach may yield AOA accuracy of two degrees or less. This may be achieved on a single pulse basis, with even further accuracy possible by averaging AOA measurements over several pulses, as might be carried out in the DDC 1612.

The accuracy of the AOA is related to SNR, with a proportionality sometimes expressed as follows;

$$\text{Angular Resolution proportional to: } (\theta_{ANT}/\text{SNR})$$

where;

$\theta_{ANT}$=antenna beamwidth

SNR=signal-to-noise ratio at Receiver's detection mechanism

The DDC 1612 of FIG. 16 may perform high-speed digital calculation of a single pulse AOA. The number of bits in said calculation may be relatively constrained (e.g., detection of AOA over a 90° quadrant with 6 bit accuracy might be expected to yield≈90°/64≈1.4° angular resolution). However AOA accuracy may be improved by averaging parameter measurements over several pulses.

With a limited number of bits in AOA calculations for a single pulse, the DDC may use look-up table memories for this function. Advantages of this approach (compared to execution of a program on a digital processor) are simplicity and high speed. For the above technique where AOA≈$\tan^{-1}(B_E/A_E)$, look-up tables can be especially advantageous for division and trigonometric operations involving low resolution operands. For instance division operations might be implemented using logarithmic tables and simple addition or subtraction logic circuits. The inverse tangent operation may also be performed with sufficient accuracy (e.g. 4 to 8 bits) using a simple look-up table memory. The look-up tables might be fabricated with CMOS circuitry.

The AOA and TOA measurement accuracy is related to the SNR of the output of the Power Detectors 1608 of FIG. 16. This SNR might be optimized by detection of spread spectrum pulses as described below in Subsection 4.2.

4.2 Spread Spectrum Acquisition Pulse

The SAS 1605 may receive a specialized pulse during the Signal Acquisition State, termed herein as an "Acquisition Pulse" (AP). The AP may take various forms, as the operation of most Amplitude Comparison systems can be "pulse agnostic". However a desired AP characteristic is wide-band frequency structure (e.g., spread spectrum). A-prior knowledge of the AP structure may be exploited to enhance SNR at the outputs of the Power Detectors 1608. For instance a "matched filter" is known to be a highly efficient signal detection mechanism. Cross-correlation is also a well known and effective technique for detecting a known signal structure within a finite spatial or temporal window, and is described further below in Subsection 5.7.

Cross-correlation may convolve a known pulse template with an input signal, the basic computation for which is a "dot product". This is a computation for which a memristor circuit can be well suited. Therefore embodiments for cross-correlators are described in Subsection 5.7 below. Some embodiments may include memristor circuits for detection of the AP and may be carried out in the Power Detectors 1608.

It is noted that cross-correlation may compensate for the relative loss of antenna gain incurred by the SAS Amplitude Comparison technique. That is, the phenomenon of "processing gain" in detection of the Acquisition Pulse may offset the loss of "antenna gain" in using broad pattern antennas.

In some embodiments dedicated antennas may create the broad antenna patterns 1500 and 1502. In some other embodiments portions (or all) of the Antenna Array 323 of FIG. 3 might be used to form the broad antenna patterns 1500 and 1502.

In the above embodiments it is desirable that the signal paths from the antennas are matched in amplitude and time to the closest extent possible. This helps to optimize the accuracy of the DF procedure. To further enhance accuracy pulse parameters might be averaged in both space (AOA) and time (TOA) dimensions. Expeditiously, this may be carried out digitally in the DDC 1612.

Some embodiments disclosed above might achieve precision direction finding in one spatial dimension (e.g., azimuth or elevation). In some other embodiments, the AOA may be resolved in two dimensions by instantiating the SAS structure of FIG. 16 for each of two overlapping antenna patterns oriented at right angles to each other. In this case the DDC 1612 may perform additional calculations to derive a two dimensional AOA. These may include conversion from spherical to Cartesian coordinate systems, as well as averaging multiple AOAs in two dimensions by "centroiding" or some similar computations. In still other embodiments even more antenna apertures might be added to achieve pulse detection over a greater spherical angle.

4.3 Signal Tracking State

Figure 18:
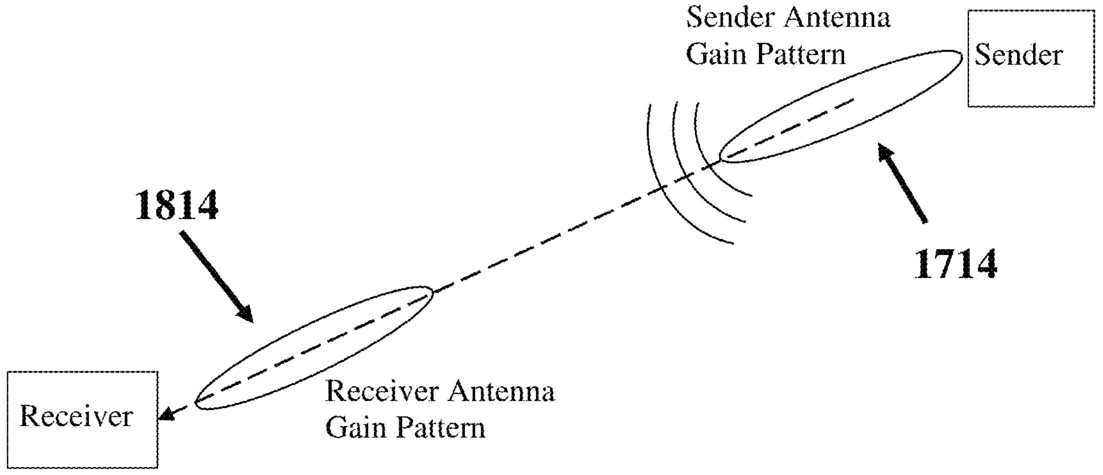
FIG. 18 shows antenna gain patterns after transition to a Signal Tracking State.

After detection of one or more APs and refinement of AOA and TOA accuracies, the Receiver may transition to a "Signal Tracking State". In this State the Receiver switches its antenna pattern to a "narrow beam" as depicted by pattern 1814 of FIG. 18. At this time the Sender and Receiver might exchange (for example) High-Gain Pulses in a "handshake" operation. In doing so Users may employ unique Code IDs as discussed above, to aid in rejection of extraneous pulses. Also upon entering this State, the Receiver might initiate Pulse Train Tracking. After executing any initial "handshake" exchange, the Sender might transmit to the Receiver using various pulse types. Also upon entering this State, the Receiver and/or Sender may inform a Data Node of its status, which may then be incorporated into the Operational Picture.

In the Signal Tracking State, "beam stabilization" procedures might be performed to maintain optimal spatial connectivity. This may involve the Pulse Train Tracker 324 performing translation of AOA spatial coordinates in response to physical orientation data from the Navigation Unit 325 and/or inertial sensors of the User. (Such orientation information may also be provided to the PCCP and Beamformers to adjust the steering and shaping of antenna beam patterns).

5.0 Demodulation Structures and Methods

Disclosed in this section is a novel "Analog Vector Arithmetic Circuit" (AVAC). The AVAC may be specialized for high-speed modulation and demodulation, especially via computation of the DFT and IDFT.

Some embodiments of the AVAC disclosed below may incorporate memristor technology. Said embodiments are types of analog circuits adapted to support high speed computation of DFTs and other algorithms. They may include electrically conductive "crossbars" interconnecting a multiplicity of memristor cells in a two-dimensional grid. (Such an assembly may be referenced in this description as a "Cell Matrix").

A memristor Cell Matrix may address the needs of both computational speed and simplified circuitry. The structure of such a matrix is naturally suited for massively parallel sum-of-products computation, as in a DFT. At the same time it may greatly reduce size and power consumption relative to digital circuits.

5.1 DFT Computation

By using short pulses the present invention might employ small DFTs or IDFTs for signal modulation and demodulation. This can be a distinct advantage relative to 4G and 5G systems which may have long symbol lengths requiring FFT sizes of 1000s of points. Such FFTs can require significant cost, power and complexity to implement.

By contrast, small (short) DFTs can be simpler. Some embodiments of the AVAC might compute specialized DFTs for modulation, demodulation, pulse synchronization and/or signal acquisition. These may include "stepping" or "sliding" DFTs.

The AVAC may also use small DFTs in the construction of large FFTs. It is known from FFT theory that small DFTs can be used as large "butterflies" in the computation of large transforms. This can be a highly efficient design for computing large transforms for the modulation and demodulation of Extended Pulses.

Very wide signal modulation bandwidths might require "parallel" implementation of the DFT. A novel embodiment of the AVAC may apply memristor technology to efficient, parallel computation of DFTs. The AVAC may also be used for other vector-related computations such as convolution.

5.2 AVAC Structures

The AVAC may use DFTs in the modulation and demodulation of pulses (e.g. the High-Gain and Low-Gain Pulses). Although the FFT is a mathematically efficient calculation of the DFT, its implementation is relatively complex. Table II contrasts approaches for a 64 point sequence.

The second column of Table II reflects the relative complexity of algorithms which may implement the DFT of a "real-valued" sequence. The third column indicates the corresponding number of multiplies for a 64-point sequence.

TABLE II

| Algorithm | Computational Complexity (Real Multiplies) | Arithmetic Operations (Real Multiplies) M = 64 |
|---|---|---|
| FFT | $2*(M/2)*\log_2(M)$ | 384 |
| Direct DFT | $(M^2)$ | 4096 |
| Hybrid DFT | $(M^2)/4$ | 1024 |

The FFT is clearly the faster algorithm, but its implementation is complicated by the nature of its data flow. A "Direct DFT" algorithm is intrinsically simpler, being based on straightforward "sum-of-products" operations. But the Direct DFT is also more computationally intensive. Parallel digital implementations of either algorithm can be extremely complex and power consuming.

A "Hybrid DFT" as disclosed herein (row three of Table II) is a compromise in complexity between FFT and Direct DFT algorithms. The classical FFT seeks to eliminate all mathematical redundancies in DFT calculations. Whereas the Direct DFT is a "brute force" approach performing all explicit calculations of the transform. By contrast, the Hybrid DFT may reduce calculations and complexity by nearly a factor of four, as seen in Table II. The Hybrid DFT is less complex than the FFT, and mathematically more efficient then the Direct DFT. Mathematical processes supporting the Hybrid DFT are disclosed further in Subsections 5.2.1 and 5.2.2 below.

Figure 19:
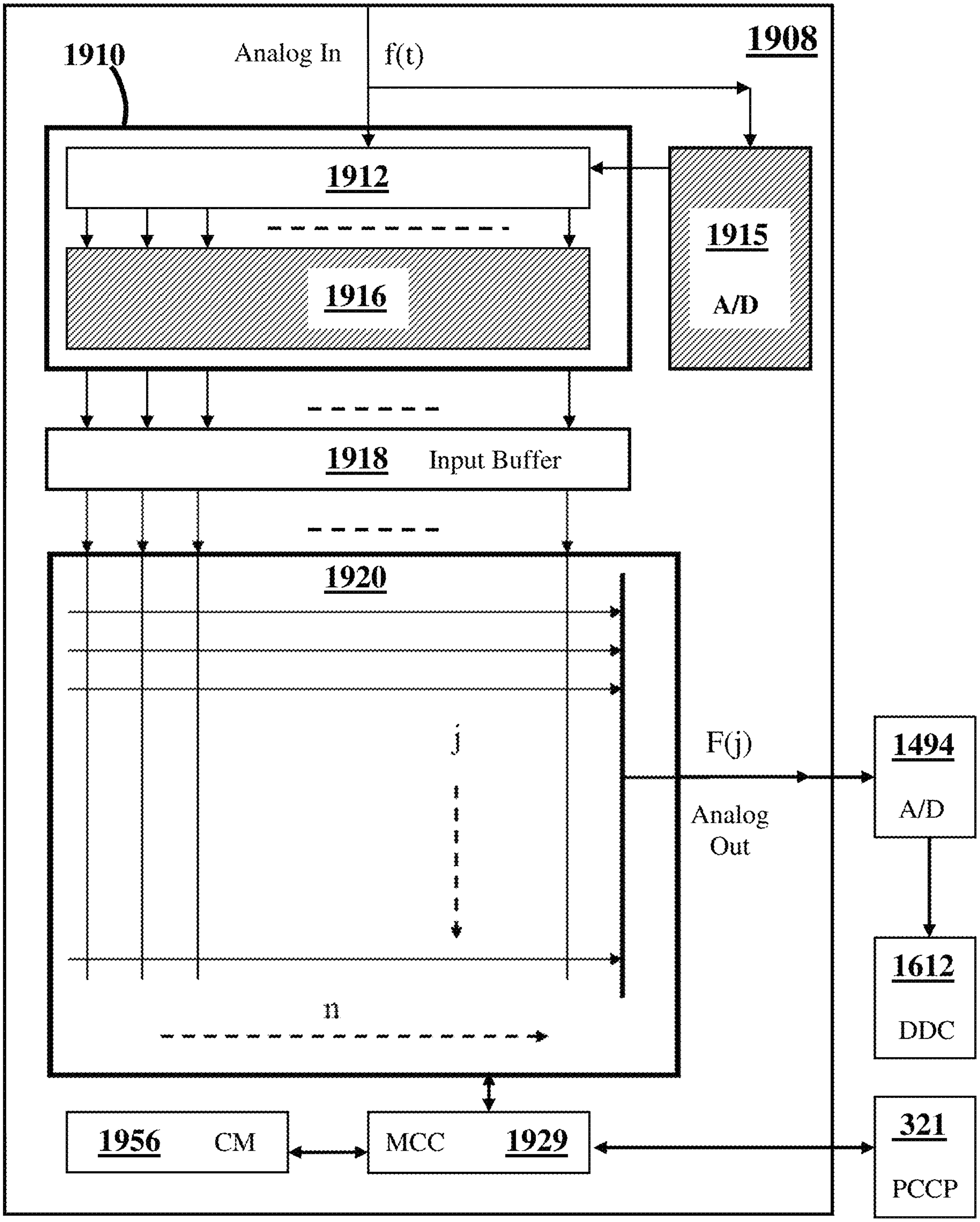
FIG. 19 depicts an example embodiment and various interfaces of an Analog Vector Arithmetic Circuit (AVAC).

FIG. 19 depicts an example of a novel AVAC 1908 capable of implementing the Direct DFT and Hybrid DFT. In FIG. 19 a Vector Acquisition Unit (VAU) 1910 may acquire and hold a vector for the DFT computation. The vector may represent a sampled version of an analog input signal f(t) for a time interval overlapping a pulse occurrence.

The VAU 1910 may sequentially load "M" equally spaced samples of the input signal f(t) into a Linear Storage Array (LSA) 1912. In one some embodiments the LSA might hold M (e.g. 64) analog samples of the input f(t). In such an embodiment the LSA might include sample and hold (S/H) devices, track and hold (T/H) devices, switched capacitors, floating gate transistors, high-speed charge-coupled-devices (CCDs), "multi-tap" analog delay line(s), or other analog circuits.

In some other embodiments the LSA 1912 may hold M digital samples of the input signal f(t). In this case, an AVAC Input A/D Converter 1915 may provide a serial stream of digital samples to the VAU. When M digital samples representative of a pulse have been acquired by the VAU, the resulting vector may be held ("frozen") for DFT computation. The digital samples of the M-point input vector may be converted to analog form by a D/A Converter Bank 1916 of FIG. 19. The D/A Converter Bank may comprise "M" parallel D/A converter devices. In some embodiments the D/A converter devices may be based on memristors. Said devices might be organized as R-2R resistor ladders, or as specialized multiplier circuits as described in Section 8.0 below.

The VAU might also contain two (or more) LSAs so that one M-point vector is held for the duration of a DFT operation, while another M-point vector is acquired in real-time.

For some embodiments of the AVAC 1908 using Input A/D Converter 1915 (which may be dual channel for a complex input signal), the input signal f(t) may be digitized at the Nyquist rate of the baseband frequencies. However the D/A Converter Bank 1916 may have more relaxed throughput requirements. This is advantageous in reducing design cost and complexity, while still accommodating high bandwidth signals. This is illustrated by an example for a pulse train having a PRI of four microseconds, and a pulse bandwidth of 500 Mhz. In the example, the Nyquist sampling period of the input signal f(t) is one nanosecond while the PRI is 4,000 nanoseconds.

The above example therefore leads to a disparity of more than three orders of magnitude between the A/D conversion rate and the D/A conversion rate. With this disparity, the AVAC may still perform a DFT much faster than the PRI. For instance even at a D/A conversion rate of 10 MSPs (two orders of magnitude slower than the A/D rate for this example) the DFT might be performed in less than 200 nanoseconds. This would allow twenty DFTs to be performed in a single PRI, aiding in the ability to distinguish among a plurality of simultaneous pulse trains.

In the above example, it may be presumed that one LSA acquires an M-point vector at real-time sampling rates (e.g. one nsec per sample) while another LSA holds an M-point vector for the duration of the DFT arithmetic operation (e.g., <200 nsecs).

It is also noted that for an LSA 1912 based on storage of analog signal samples, the Input A/D Converter 1915 and D/A Converter Bank 1916 circuit elements are unnecessary. Conversely, for an LSA based on storage of digital signal samples, the same Converter elements are necessary and the LSA may include digital circuits to store the signal samples.

FIG. 19 also depicts a Cell Matrix Input Buffer 1918 between the VAU 1910 and a memristor Cell Matrix 1920. The Input Buffer 1918 may support limited arithmetic operations on analog values. This might include multiplication of individual values by (−1), (+1), or (0). Simple addition or subtraction of analog operands may also be supported. The Input Buffer 1918 may also contain circuitry to condition the VAU analog outputs to be compatible with the inputs of memristor circuits.

Also shown in FIG. 19 is a Matrix Calibrator and Controller (MCC) 1929. The MCC may control, calibrate and monitor operation of the AVAC, as further described in Subsection 5.5.1 below.

A memristor matrix may comprise rows and columns of memristor cells which may be programmed with "weights" by which analog inputs are multiplied. For this example, the Cell Matrix 1920 of FIG. 19 may include a matrix of minimum dimensions 32×64 cells (with at least two memristors per cell to accommodate complex multiplies). Each Matrix row may be programmed with a sampled sine and/or cosine waveform, which are the basis functions of the DFT (or IDFT).

Figure 20:
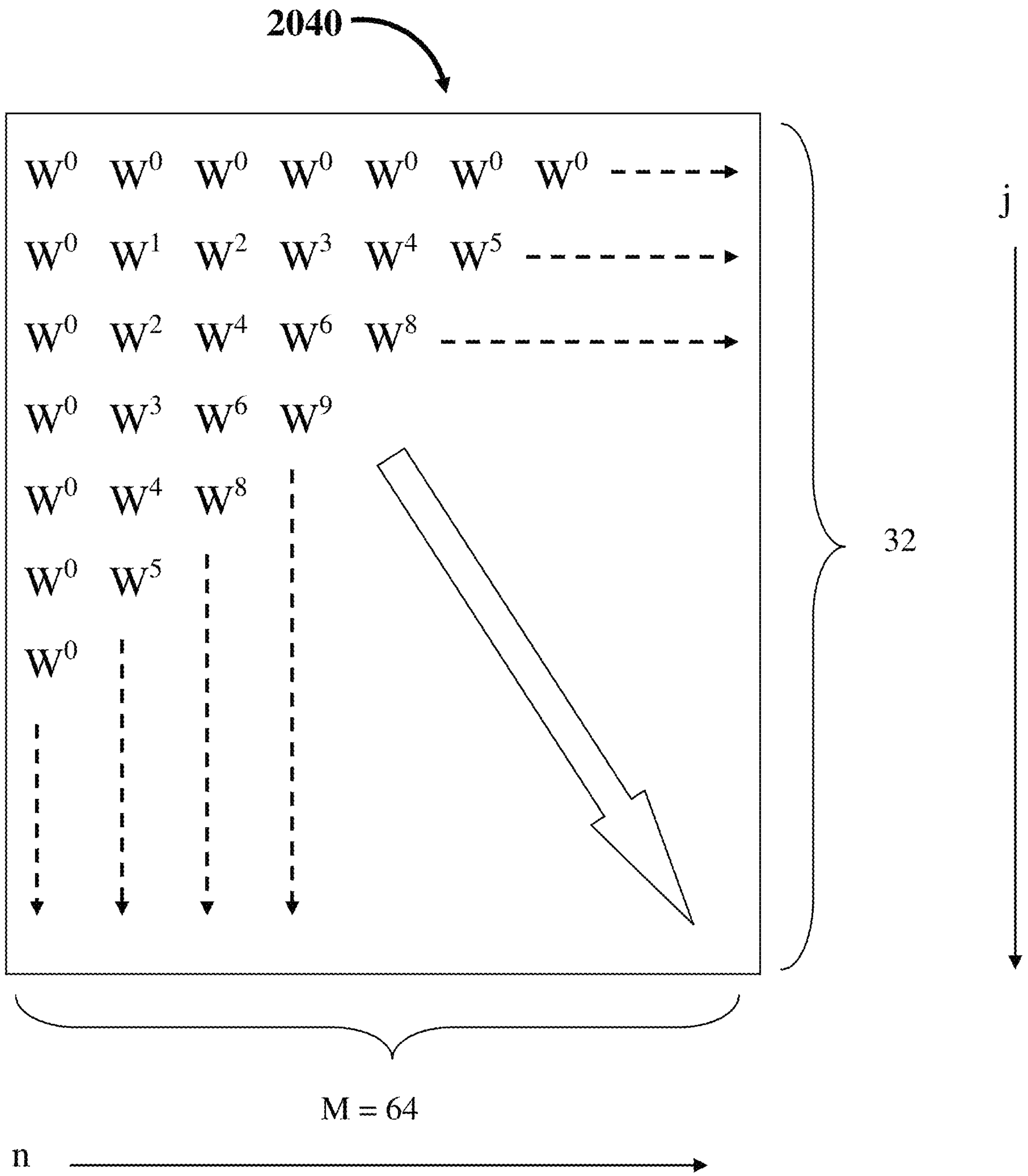
FIG. 20 shows organization of DFT basis function values for M=64, as may be programmed into a memristor Cell Matrix.

FIG. 20 depicts a table of weights 2040 which may be programmed into the memristors of Cell Matrix 1920 in FIG. 19. Each value of numeric matrix 2040 may represent a pre-programmed complex multiplier.

In FIG. 20 weighting values are indicated by the complex exponential (W"). This is used in calculation of the DFT outputs F(j) as follows;

$$F(j)=\sum_{n=0}^{M-1} f(n)W^{jn}=\sum_{n=0}^{M-1} f(n)W^{x}$$

where;

f(n) is the input sequence to the DFT (64 points for this example)

$W=e^{-(2\pi i)/M}$

M=transform length (64 for this example)

x=jn j is an index on the DFT outputs n is an index on the DFT inputs.

As is known, $W^x$ repeats as the product jn exceeds integral values of M. This is due to trigonometric symmetry whereby the argument of the orthogonal basis functions passes through multiples of 2π radians (360°) when the product (jn) is an integral value of M.

In some embodiments of the AVAC, the Hybrid DFT may be implemented to reduce the size of the Cell Matrix by up to 75%. This is based on certain DFT computational symmetries (redundancies) as described in Subsections 5.2.1 and 5.2.2 directly below.

5.2.1 DFT Computation Symmetry Method 1

Some embodiments of the AVAC may exploit "left-right" DFT computational symmetry over the index "n" as described below.

Given the definition of the complex exponential ($W^x$) above, the following statements are true;

$W^{jn}=+(W^{j(n+M/2)})$ for even values of "$j$" (where $j$ and $n$ are integers)

and $W^{jn}=-(W^{j(n+M/2)})$ for odd values of "$j$" (where $j$ and $n$ are integers)

This reflects a type of "left/right" symmetry where the values of a basis function from 0 to (M/2)−1 is either a positive or negative replica of the values from M/2 to (M−1).

Accordingly, the size of the Cell Matrix may be reduced by 50% by generating the sum and difference of the left and right halves of the sequence f(n) before input to the Matrix. In this way the Cell Matrix 1920 need only operate upon an input sequence of length M/2, instead of length M. That is, the sum of the input sequence halves is used to calculate even F(j), and the difference of sequence halves is used to calculate odd F(j).

The sum and difference operations on the input sequence might be performed within the Cell Matrix Input Buffer 1918 of FIG. 19. The operations may be performed in parallel on pairs of input samples separated by M/2 points.

5.2.2 DFT Computation Symmetry Method 2

Some embodiments of the AVAC may also exploit a DFT computational symmetry over the index "j" as described below.

This method "reflects" (or "folds") computations of F(j) around a center-point defined as F(M/4). This symmetry is seen by examining the relationship of the basis functions for F(j) and F(M/2−j). Respectively, these functions are:

$W^{jn}$ and $W^{(M/2-j)n}$ (where j and n are integers).

Consistent with signal sampling and aliasing theory, the second basis function above is equal to the complex conjugate of $W^{(M/2+j)n}$.

Furthermore, for $W=e^{-(2\pi i)/M}$ as defined above, the following is true;

$$W^{(M/2+j)n}=(e^{-(\pi i)n})(W^{jn})$$

$=+W^{jn}$ for even $n$ and $=-W^{jn}$ for odd $n$

By this symmetry the size of Cell Matrix 1920 may be reduced by an additional 50%. This is achieved by separating the DFT coefficient computation (i.e. summation of products) according to "odd n" or "even n", resulting in two "partial" DFT coefficients. The sum and difference of these two partial coefficients then yields F(j) and F(M/2−j). This may be accomplished by allocating the odd and even computations to physically separate areas of the Cell Matrix. The sum and difference of the computed results might then be derived in the Digital Detection Circuits (DDC) 1612. (As seen in FIG. 19 the DFT results may be sent from the Cell Matrix to the A/D Converter 1494 and then to DDC 1612 in digital form).

5.3 AVAC DFT Modes

The Cell Matrix 1920 of FIG. 19 is naturally suited for the sum of products calculations of the DFT. It might perform all calculations of the 64-point DFT simultaneously. This is termed herein as a Full Parallel DFT Mode. Alternatively, the Cell Matrix may compute the DFT outputs (coefficients) individually. This is termed herein as a Sequential DFT Mode. Both Modes are part of the present disclosure.

In the Sequential DFT Mode a vector in the VAU 1910 may be held constant for multiple processing steps. For example if M=64 the output of the VAU might be held constant for 64 "steps". A step may be triggered by a "clock" or "strobe" to the Cell Matrix, resulting in generation of a single DFT output coefficient of the form F(j). Alternatively, the Full Parallel DFT Mode might be executed in a single clock or strobe.

For illustration, the DFT Modes may be applied to the demodulation of the example pulse types as summarized in Table III.

TABLE III

| Pulse Type(s) | AVAC DFT Mode | DFT Execution Time | Number of DFTs Executed | AVAC Output Forms |
|---|---|---|---|---|
| Low-Gain/ High-Gain | Sequential DFT | M Clocks | 1 | Serial DFT Output Coefficients |
| High-Gain | Full Parallel DFT | 1 Clock | 1 | Single Dot Product |

As seen in row 1 of Table III, in the Sequential DFT Mode the AVAC might generate M (where M=64 for this example) analog DFT outputs (or some subset thereof) serially. The analog outputs may then be subjected to A/D conversion, after which digital circuitry in DDC 1612 may complete the demodulation processes. This might include for example, detection of the phase and magnitude of individual subcarriers within a Low-Gain Pulse signal. Other processes may be employed for the High-Gain Pulse as described in Subsection 5.4 below.

Row 2 of Table III reflects a Parallel DFT Mode, wherein multiple DFT outputs might be simultaneously combined internally to the AVAC. For example the outputs might be scaled and combined in the formation of a "dot product" in analog form.

5.4 Demodulation Methods for High-Gain Pulse

Demodulation of the example High-Gain Pulse differs from the detection of individual subcarriers as performed with the Low-Gain Pulse. Instead, High-Gain Pulse demodulation involves recovery of data from a High-Gain Pattern which has been spread across many subcarriers. The data to be recovered is $X_{IN}$ as referenced in Section 1 and illustrated in FIG. 1. The demodulation method may essentially reverse the operations described in Section 1 and depicted by FIG. 1.

Referring to FIG. 19, the demodulation begins with an M-point input vector stored in the VAU 1910 of the AVAC 1908. The vector is a sampled version of a received High-Gain Pulse. A DFT may then be performed upon the vector as described above in this Section. The AVAC may operate in the Sequential DFT Mode in this case.

Referring to FIG. 19, the DFT output coefficients (in analog form) may then be sent serially from the AVAC to the A/D Converter 1494. The A/D Converter then sends digitized DFT coefficients to the Digital Detection Circuits (DDC) 1612 as shown.

Then, with an M-point digitized DFT output sequence having been sent to the DDC, the operations of the High-Gain Pattern Encoder 101 may be reversed. This is a two step "decoding procedure" within the DDC. The procedure is contingent upon the Receiver having knowledge of the Code Domain ID (109 of FIG. 1) of the Sender. It also presumes that the Sender and Receiver have a common knowledge of the PR Sequences and Spreading Codes used by Encoder 101. (This condition might be met if all Network Users employ the same Sequences and Codes on a static basis, or if the Users access such information from the Operational Picture in a more dynamic scenario).

The first step in the decoding procedure (taking place in the DDC 1612) multiplies the M-point DFT output vector by a replica of the M-point User ID Sequence 104 of the Sender's PR Sequence Synthesizer 108. This is a "point-by-point" multiply which produces another M-point vector. The second step of the procedure is to perform a circular convolution upon this vector product, using the "M Bit Spreading Code" employed by the Sender's Pattern Encoder 101.

The decoding procedures above involve simple multiplications by +1 or −1, (i.e. ±1). This is due to the bipolar nature of the PR Sequences and Spreading Codes used during encoding. Also, these bipolar multiplies may operate upon fixed point data of limited resolution (e.g., 4 to 10 bits from the A/D Converter.) Therefore the circuit complexity within the DDC to perform these procedures may be greatly simplified.

Accordingly, the vector multiplication above may require only M addition operations to implement. Circular convolution might require significantly more operations, being proportional to $M^2$ additions. But the additions are highly amenable to parallel implementation. One approach is to compute all additions in parallel for a single step or "rotation" of the circular convolution, with the step having the strongest output indicating the original encoded data (shown as $X_{IN}$ in FIG. 1).

Figure 21:
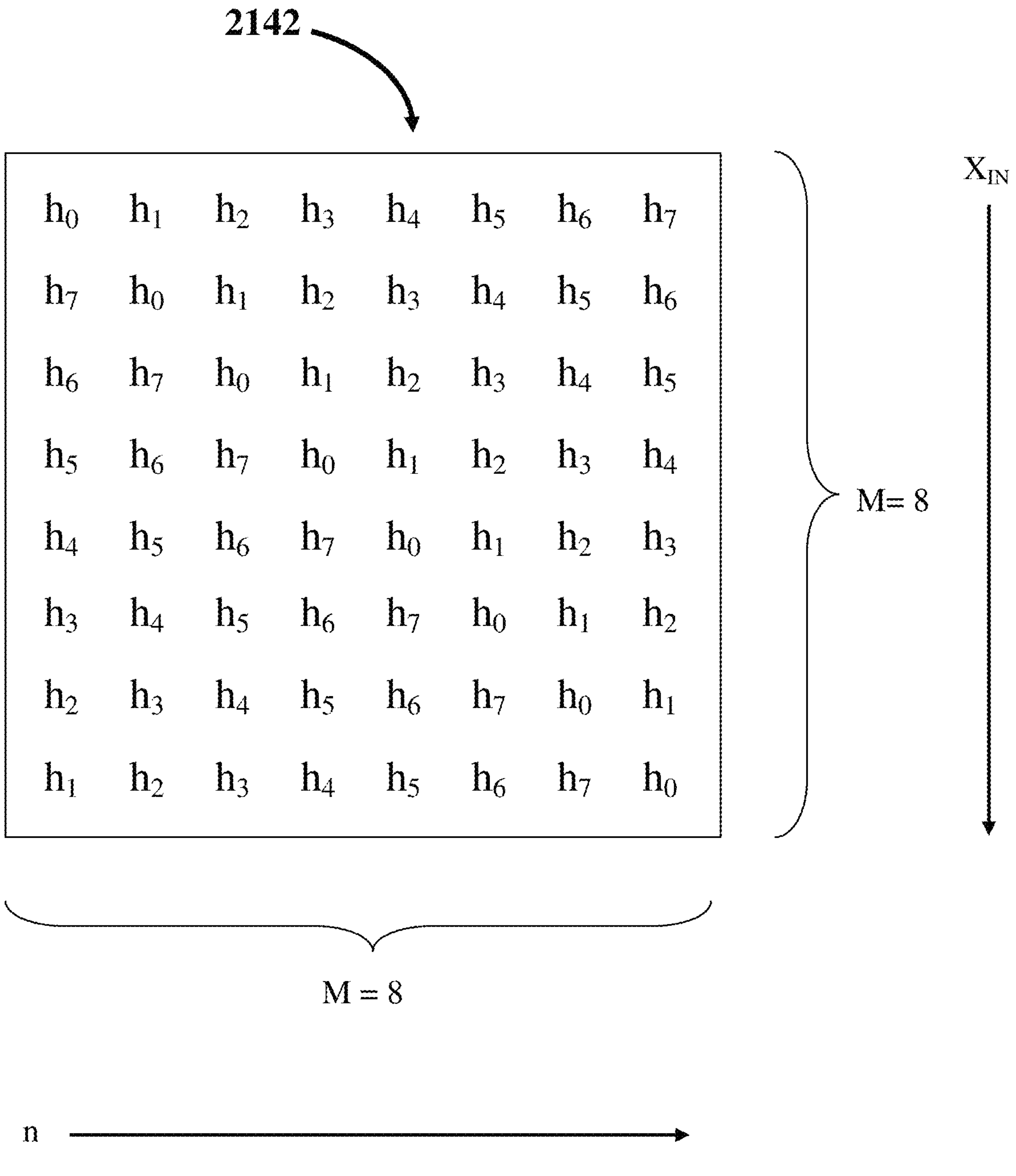
FIG. 21 shows a Spreading Code as may be used in circular convolution for data detection in demodulation of High-Gain Pulse.

A Circulant Matrix 2142 of FIG. 21 provides context for the circular convolution of the detection procedure. The example of FIG. 21 is illustrative for M=8 and the Spreading Code h(n) over which "n" is an index. The Code is rotated one place for each convolution step as shown by the M rows of the Figure. The decoded data $X_{IN}$ may be detected by the row having the strongest convolution output. A strong detection output may be expected even in the presence of interfering RF power levels greater than that of the High-Gain Pulse signal itself.

A strong detection output accrues from processing gain inherent in the demodulation methods. As a result, the pulse-of-interest may be separated from interfering pulses of other Users (i.e. other Senders). That is, effects of "pulse collisions" at the Receiver may be mitigated. This is an advantageous result of the use of code domain techniques in creating the High-Gain Pattern for pulse modulation.

The methods above may relate to digital implementation of the vector multiply and circular convolution within the DDC 1612. Alternatively, the Cell Matrix 1920 itself may be adapted to perform portions of said calculations in analog fashion.

5.5 AVAC Signal Flow and Interfaces

As described above, the VAU 1910 of FIG. 19 may be sequentially loaded with "M" values of an analog input sequence f(n). After acquiring an M-point sequence the VAU may maintain a parallel output directed to Cell Matrix 1920. The Matrix might then compute a single DFT output coefficient F(j) in 1 to 2 nsec. (as may be consistent with open data on some memristor speeds). An entire DFT might then be computed in, $$\approx(1\ \text{nanosec/step})*(32\ \text{steps})=32\ \text{nanosec}.$$

Activation of a single row of Cell Matrix 1920 triggers the computation of a corresponding DFT coefficient. Each row contains the weighting factors necessary for a unique F(j) output. The Cell Matrix may compute one or more DFT output coefficients while its input from the VAU is held stable. Output coefficients may be computed at random under this condition. (Sequential computation of all outputs would correspond to the "Sequential DFT Mode" of operation referenced in Subsection 5.3 above).

FIG. 19 also depicts the Primary Command and Control Processor (PCCP) 321 exercising overall control of the AVAC. This may be accomplished through the "Matrix Calibrator and Controller" (MCC) 1929 of FIG. 19. The MCC may be implemented by specialized digital hardware. It may execute real-time control over the AVAC 1908 in response to commands from the PCCP 321.

Drawbacks of memristor technologies may include "cycling endurance", which relates to how often the memristor are "programmed". An advantage of the DFT implementation is that the memristor weightings (basis functions) do not generally need reprogramming. (Except when it may be desirable to modify them for some additional process such as "channel equalization".) Otherwise they are static if the DFT algorithms do not change.

Also, the AVAC might be used (activated) on only a limited duty-cycle, as when a new RF pulse is received. This may further extend memristor lifetime, which might otherwise degrade with continuous use. Additionally, in the Sequential DFT Mode only one row of the Cell Matrix might be activated at any given time (as there may be a one-to-one correspondence between rows of Cell Matrix 1920 and DFT outputs.) This may also extend the lifetime of the Cell Matrix by limiting operational current flow to individual rows.

5.5.1 Matrix Calibrator and Controller (MCC)

Nonetheless some memristor types may exhibit a shift in operating characteristics over time. The MCC 1929 of FIG. 19 may monitor the Cell Matrix memristors to determine if this shift has exceeded some "target" range of values. If so, "tuning" or re-programming of memristors may be required. Such processes are aided by a Calibration Memory of the AVAC.

In FIG. 19 the Calibration Memory 1956 is shown as interfaced to the MCC. The Calibration Memory (CM) may be digital or analog in nature, and include volatile and/or non-volatile storage technologies. The CM contains target operating values of the memristors of the Cell Matrix 1920. This provides the MCC with calibration references for test, tuning or re-programming of memristors as needed.

In some embodiments the CM might be implemented with analog storage devices such as floating gate transistors. These may provide compact, long-term storage of analog values. Another potential advantage of floating gate memory is compatibility with CMOS manufacturing processes. Although floating gate storage may have relatively slow access times, test and calibration of the memristors might take place when the Cell Matrix is inactive. This may occur between pulses or when the Cell Matrix is simply not in use.

The Cell Matrix 1920 of FIG. 19 may contain extensive unused rows and columns of memristor cells. These might be activated by MCC 1929 so as to replace defective or degraded portions of the Matrix. This may be a "self-repair" mechanism of the AVAC.

Also, some embodiments of the example of FIG. 19 may contain multiple Cell Matrices for fault tolerance by redundancy. That is, if one Matrix becomes defective then the MCC may activate another Matrix in its place.

The MCC 1929 may also selectively activate all, or portions of the Cell Matrix. Selective activation may include disabling current flow in the matrix during some time interval between pulses. It might also include controlled activation of rows of the Cell Matrix during the Sequential DFT Mode of the AVAC operation, as described in Subsections 5.3 and 5.5 above. Selected activation serves to minimize average current flow through the Cell Matrix, thereby alleviating basic issues of memristor performance drift and lifetime constraints.

The MCC 1929 of FIG. 19 may be composed of both digital and analog circuitry. Monitoring and testing the memristors inherently involves evaluating analog signals. Also, analog signals are often required in both the writing and tuning of memristors. Such signals may have differing requirements for various memristor technologies. Therefore the MCC may be a "hybrid" device composed of both digital and analog circuitry, with the latter adapted to the specific requirements of the target memristor technology.

As seen in FIG. 19 the MCC 1929 has an interface to the PCCP 321. This interface allows transfer of:

- commands from the PCCP to the MCC;
- data from the PCCP to the MCC, to write to either the Cell Matrix or the CM; and
- status from the MCC to the PCCP, including Cell Matrix integrity and performance.

Through the MCC the PCCP may exercise control over the AVAC according to some static program, expert rules, or even Artificial Intelligence programming.

5.5.2 Additional AVAC Interfaces

Figure 22:
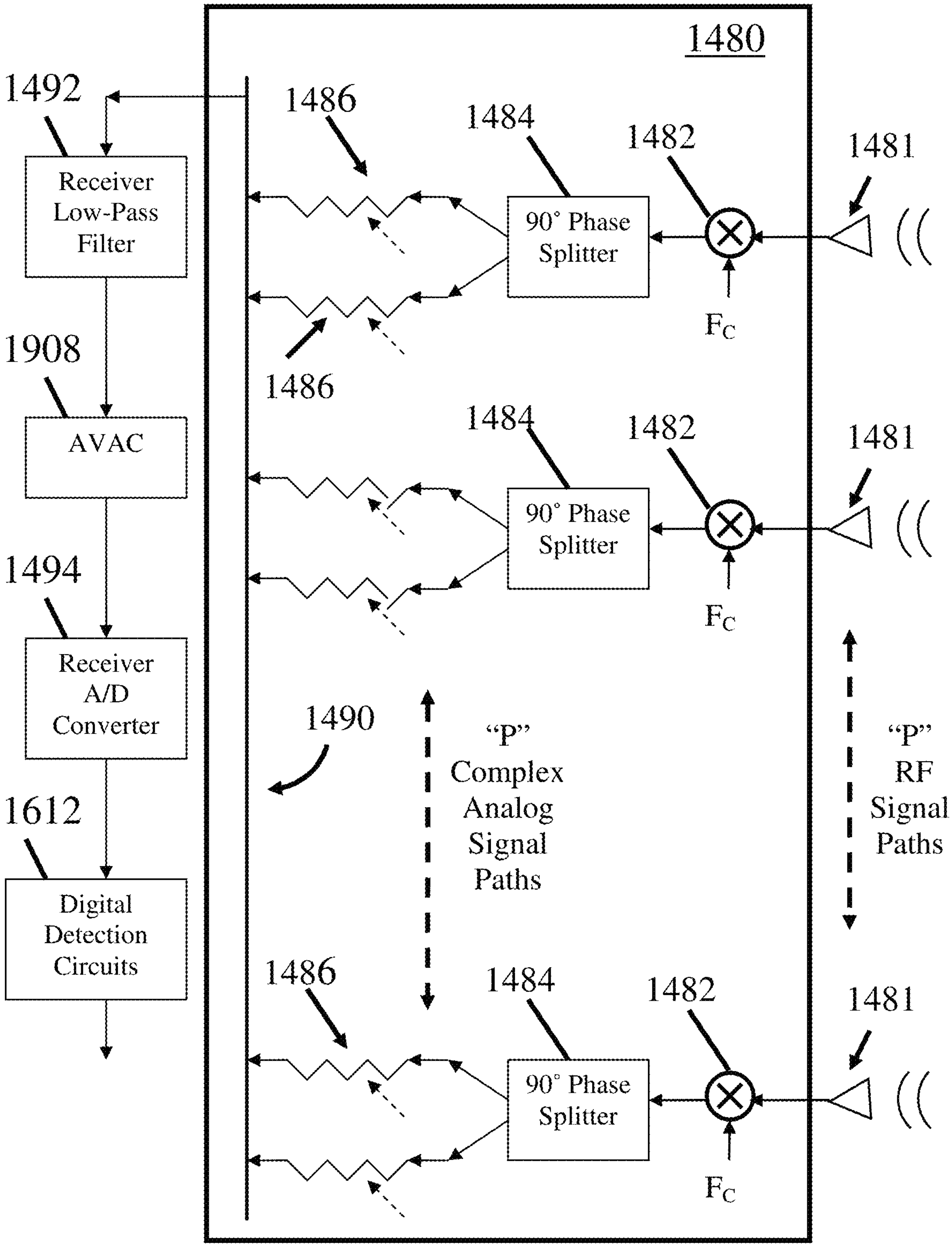
FIG. 22 depicts the Analog Vector Arithmetic Circuit integrated with a Receiver Beamformer.

The example embodiment of FIG. 22 shows an integration of certain analog and digital circuits of which the AVAC 1908 is a member. The AVAC may be used in both Sending and Receiving modes of User operation. FIG. 22 depicts the AVAC 1908 as interfaced to the Receiver Beamformer 1480. In this configuration, the AVAC may perform pulse demodulation computations (e.g. DFT) in analog form.

In FIG. 22 Low-Pass Filter 1492 receives an analog baseband signal. The output of Filter 1492 is sent to the input of the AVAC 1908, where it may undergo DFT and/or other processes. The output of the AVAC goes to the input of the Receiver A/D Converter 1494 of FIG. 22.

The output of Receiver A/D Converter 1494 is sent to the DDC 1612 in FIG. 22, where various operations may be performed with specialized digital circuitry. These may include detection of the I/Q magnitudes of subcarriers within the Low-Gain Pulse. The DDC may also apply phase corrections to individual subcarriers in a pulse for channel equalization purposes, or as part of a "hopping" or "sliding" DFT calculation.

The VAU of the AVAC may acquire overlapping analog data vectors for execution of hopping or sliding DFTs. The Cell Matrix may perform classic DFT operations on the overlapped vectors. The symmetry of numeric weighting matrix 2040 of FIG. 20 allows this procedure without discontinuity in the DFT basis functions. However there may exist phase shifts in the basis functions, due to different starting points of the overlapping input vectors. But it is known from DSP and DFT theory that such phase shifts are deterministic, and may be corrected in the DDC 1612 of FIG. 22 by digital "phase rotation" operations.

5.6 Extended Pulse Demodulation

The AVAC may also be used in the modulation and demodulation of Extended Pulses. An example below applies to demodulation of Extended Pulses having dispersed patterns of subcarriers, as in Distributed Frequency Domain Multiple Access (DFDMA). For this example the Extended Pulse has 1024 subcarriers of which 32 might be used. The subject subcarriers may correspond to a row of matrix 436 of FIG. 4.

Figure 23:
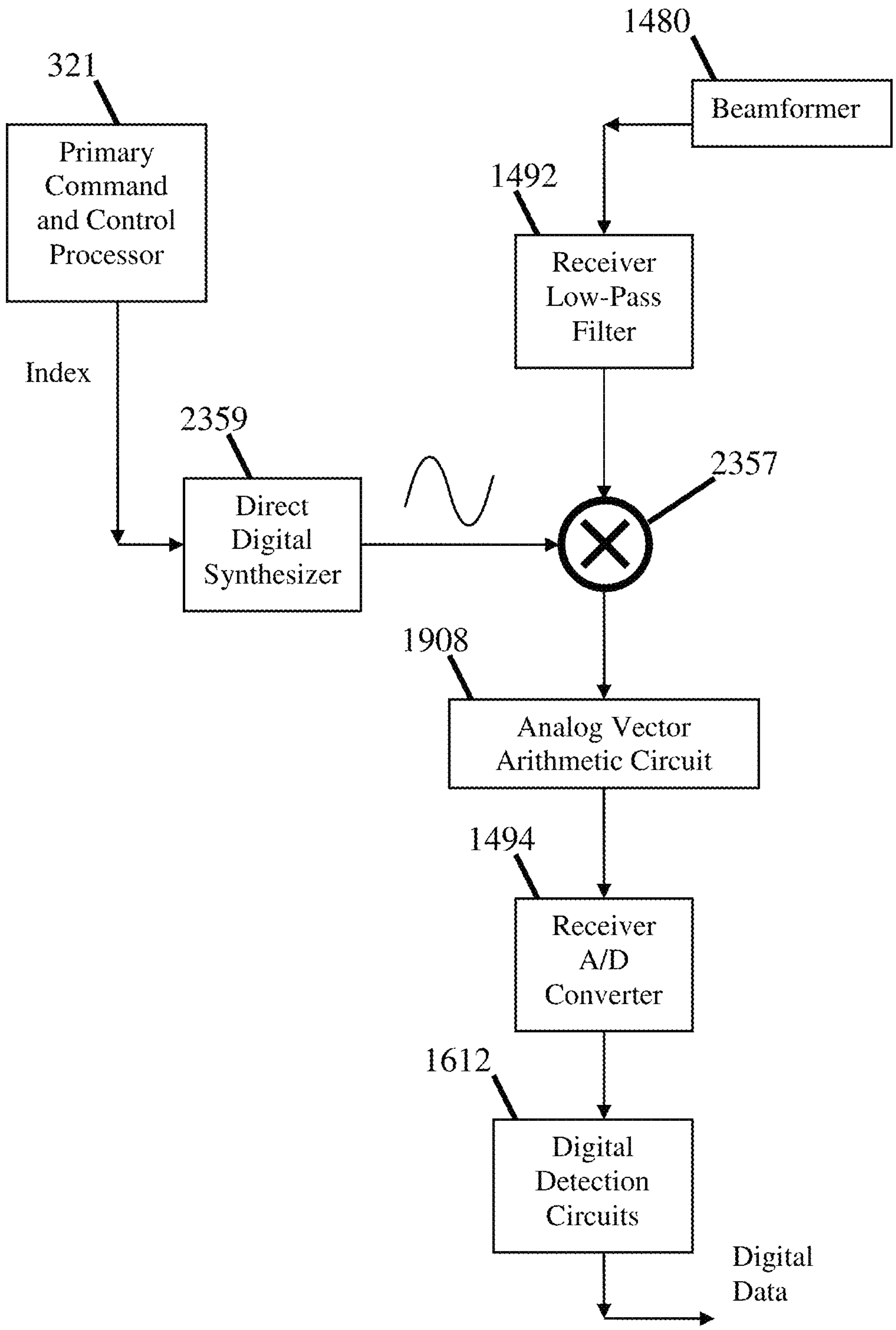
FIG. 23 exemplifies devices and signal flow for processing of an Extended Pulse.

Referring to FIG. 23, a Mixer 2357 is added to the signal flow described for FIG. 22. In FIG. 23 Low-Pass Filter 1492 receives an analog baseband signal from Beamformer 1480. The output of 1492 is connected to Mixer 2357, which may incrementally shift the spectrum of the Extended Pulse with a frequency offset supplied by a Direct Digital Synthesizer (DDS) 2359. In this example the rows of matrix 436 of FIG. 4 are shifted such that subcarriers of interest may occupy the first matrix row. (The integer frequency index "j" is offset by the number of rows to be shifted).

Direct Digital Synthesis is a well known approach to creating precise sinusoidal waveforms, the frequency of which may be controlled by some digital index. For this example said index might originate from the Primary Command and Control Processor 321 of FIG. 3. Also, the DDS 2359 of this example may produce both sine and cosine waveforms, as might be required for complex (e.g. real and imaginary) signal mixing.

The output signal of Mixer 2357 is sent to AVAC 1908 which performs DFTs on contiguous 32-point time domain signal segments. Therefore 32 DFTs are performed to accommodate an Extended Pulse of 1024 time domain points. The analog output of the AVAC is digitized by Receiver A/D Converter 1494 and sent to DDC 1612.

The DDC may form the final 32 Fourier coefficients by coherent vector summation of the 32 DFT output vectors. The approach described here is a type of "sparse DFT" where the Fourier coefficients of only one row of matrix 436 of FIG. 4 are calculated. The DDC may then recover I and Q data from these Fourier coefficients.

Figure 24:
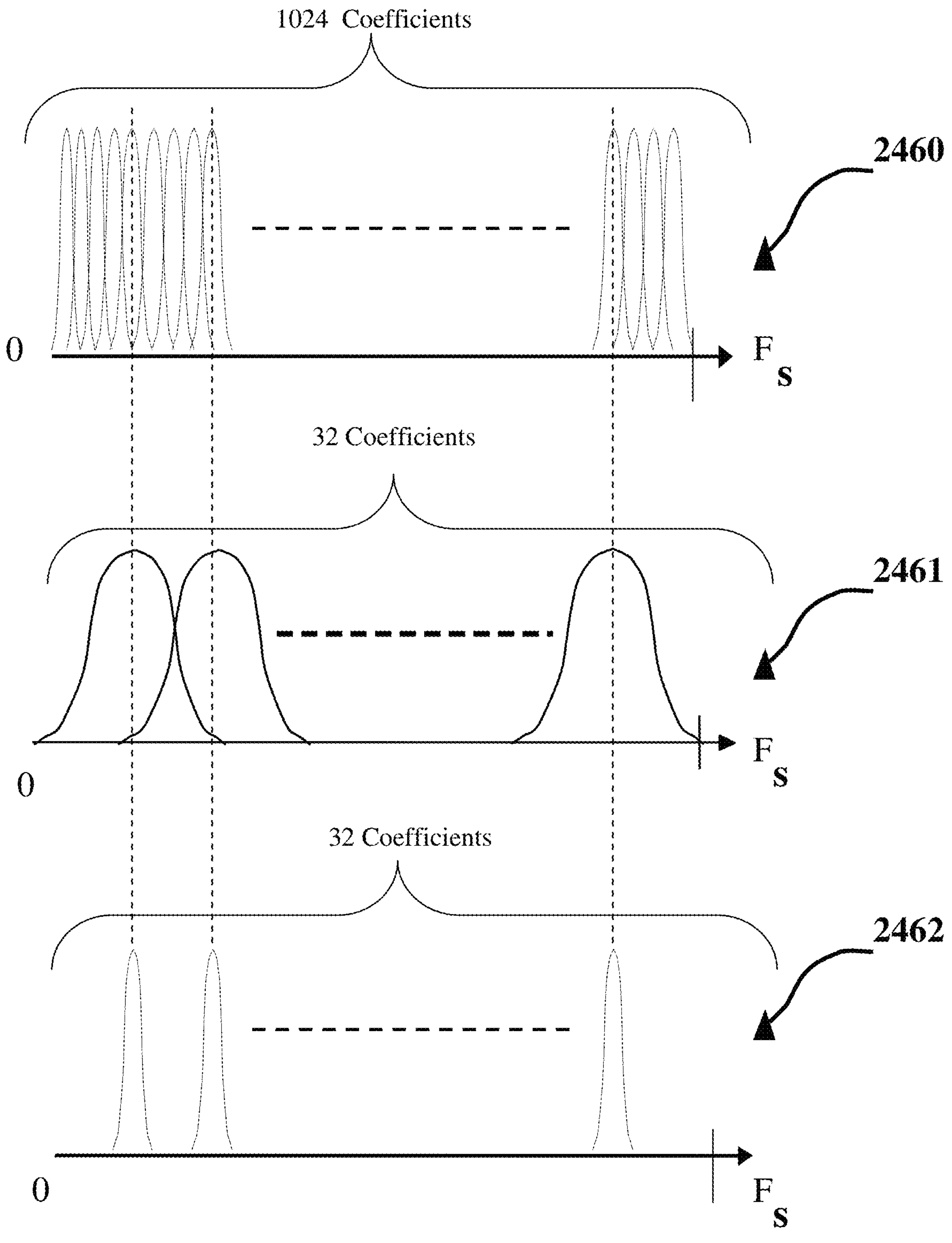
FIG. 24 is a perspective contrasting frequency domain resolution of the Narrow Pulses versus Extended Pulse.

FIG. 24 provides a frequency domain perspective of the above description. In the Figure, $F_S$ represents the sampling rate of the pulse signal. Graph 2460 of the Figure indicates the "bandwidths" of 1024 possible Fourier coefficients of the Extended Pulse. Graph 2461 of the Figure shows the wider bandwidths obtained from DFTs of 32-point segments of the Extended Pulse. These wider frequency-domain bandwidths reflect the transform of a more narrow time-domain segment. Graph 2462 depicts the bandwidths of the final 32 Fourier coefficients obtained from coherent integration of 32 separate DFTs of narrow time-domain segments. The bandwidths have narrowed due to the effective analysis of a wider (1024 point) time-domain window.

The present disclosure extends to the above processes and variations thereof, wherein transform sizes might be larger or smaller than those given in the example.

5.7 Pulse Detection with Cross-Correlation Methods

Variations of the AVAC 1908 might perform multiple types of vector arithmetic operations. An example is cross-correlation, whereby an input vector operand in VAU 1910 is convolved with some pattern or "Search Template" vector which may be pre-programmed into the memristors of Cell Matrix 1920. Cross-correlation may be of particular utility in signal acquisition relative to the SAS 1605 as disclosed above in Subsection 4.2.

As with the DFT, the basic arithmetic process of cross-correlation is dot product formation. However for cross-correlation the Cell Matrix 1920 may be programmed with Search Templates instead of the basis functions of a Transform operation. Additionally, the input vector in the VAU may overlap the actual time interval of a pulse. Also as has been described, various embodiments of the VAU might acquire and hold vectors in either discrete analog or digital signal format.

In a cross-correlation configuration the VAU 1910 may hold one vector operand (the input), while the Cell Matrix 1920 may represent another vector operand (the Search Template) as defined by memristor conductance values. The Search Template might be duplicated with successive displacements over several rows of the Cell Matrix 1920. This may occur for example in the form of a Toeplitz matrix. In algebraic and signal processing theory, such a matrix form is common in convolution and correlation arithmetic. Cross-correlation may be performed by multiple dot product formations between the VAU input vector and the rows of the Cell Matrix. Each dot product then represents a cross-correlation output of the AVAC in analog form. Such a cross-correlation may enhance the performance of the SAS of Section 4.0.

As applied to the SAS of FIG. 16, an AVAC programmed for cross-correlation may augment Crystal Video Detectors (CVDs) or other circuits of the Power Detectors 1608. In particular, use of cross-correlation may improve the SNR of the Power Detector outputs by producing a more pronounced (and narrower) pulse detection "spike". This may be described as complementary processes, whereby CVDs (for example) perform pulse detection of limited resolution while the AVAC refines the detection by cross-correlation arithmetic. This leads to the method described below.

A CVD pulse-detection event might cue (or "trigger") the VAU of the AVAC to acquire a time segment which overlaps an Acquisition Pulse (referenced in Section 4.0). This sampled time segment is then an input vector held in the VAU. The AVAC may then perform cross-correlation between the VAU input vector and a Search Template programmed in the Cell Matrix 1920 as described above. In this example the Search Template may conform to the structure of the Acquisition Pulse (AP). The strongest cross-correlation output then represents a pulse detection of refined accuracy. This pulse detection might then be used by DDC 1612 to derive more accurate TOA and DOA measurements. The methodology might be used to detect a signal to within an interval of T seconds (the sampling period).

For this cross-correlation process it may be preferred that the VAU hold digital (as opposed to analog) samples. In this case the cross-hatched elements of the example embodiment of FIG. 19 are relevant, as described in Subsection 5.2 above. These include the Input A/D Converter 1915 and D/A Converter Bank 1916 circuitry. Digital sampling may have certain advantages of flexibility in acquiring a time segment overlapping the incident pulse. For example, with digital sampling the VAU might effectively create first-in-first out (FIFO) buffers to acquire the most recent time segment. Such FIFO buffers might be implemented in the form of digital delay lines or shift registers. Such implementations via CMOS circuitry might be sufficient to support desired clock speeds. Flip Flops made of CMOS circuitry may attain clock speeds of 1 Ghz or greater, and may be used to construct digital delay lines and shift registers.

It is noted that a potential deficiency of the above methods may lie in the mathematical nature of random signals. In particular, the autocorrelation function of a truly random pulse signal might correspond to a Dirac function (i.e., an extremely narrow detection spike). This may cause a sampled (discrete time) cross-correlation process to essentially be "blind" to the location of the AP, except when said Pulse is closely aligned with the Search Template (e.g. with uncertainty much less than the sampling period T).

Approaches for resolving this issue can include; increasing the signal sampling rate (thereby creating a narrower sampling period T), and/or band-limiting the spectrum of the Acquisition Pulse (AP) signal. The former approach can impose a more costly and complex A/D converter. The latter approach may degrade some of the advantage of using a spread-spectrum pulse (e.g. noise resistance and enhanced SNR of the Power Detector 1608 output).

A third alternative is to search for the AP with finer resolution in the time domain. In this approach the rows of Cell Matrix 1920 might be programmed with smaller displacements of the Search Pattern. That is, the spacing between rows might be set at a value (T/R), with R as an integer defining the temporal granularity of the cross-correlation process. Accordingly the Cell Matrix may have dimensions of approximately 2 (M*R), where M is the width of the AP. However this approach might only be effective over a search window of T seconds (the sampling period).

Therefore to widen the search window, the following method might be employed. A CVD pulse-detection event might cue (or "trigger") the VAU of the AVAC to capture a time segment which overlaps an incident Acquisition Pulse. The sampled time segment is held in the VAU. The AVAC might then effect a cross-correlation between the time segment and the Search Template with a resolution of T/R seconds. If a sufficiently strong detection spike does not appear, then the VAU shifts the captured time segment by T seconds and this process repeats itself. With a digitized representation of the time segment, the VAU may efficiently and rapidly perform such shifting with compact and low power circuitry, such as CMOS. The contents of the Cell Matrix are not altered during the procedure.

The spirit of the present disclosure therefore extends to any and all embodiments for transforms, convolutions and cross-correlations using the above structures and methods. Instantiations of the AVAC may have static or changeable Cell Matrices. One or more AVAC type apparatus may be employed in various embodiments to address various User requirements.

Given the present disclosure one skilled in the arts might perceive various embodiments in which the AVAC or its constituent parts may be used. The scope of the disclosure therefore extends to all such alternative embodiments.

6.0 Pulse Train Tracker Embodiments and Methods

The DDC 1612 may perform final demodulation and detection of pulse signals as has been disclosed above. After pulse detection, the DDC 1612 may provide pulse parameters to the Pulse Train Tracker 324. The Pulse Train Tracker 324 may perform multiple functions. These include refining the pulse parameter measurements, and initiating and maintaining "Track Files" on one or more pulse trains.

Figure 25:
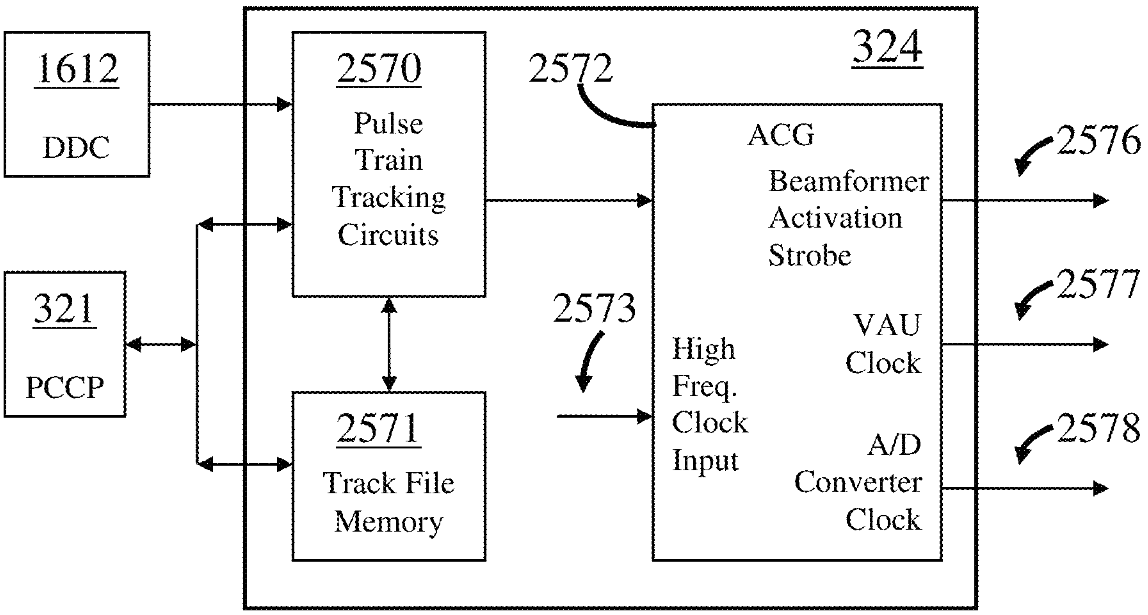
FIG. 25 depicts an example embodiment and interfaces of a Pulse Train Tracker.

FIG. 25 presents an example embodiment of the Pulse Train Tracker structure and interfaces. A plurality of Pulse Train Tracking Circuits 2570 of FIG. 25 constructs Track Files base on raw parametric data received from DDC 1612. Track File information may then be sent to the Track File Memory 2571 as indicated in FIG. 25.

The Pulse Train Tracking Circuits 2570 may also send precise tracking information to an Acquisition Clock Generator (ACG) 2572 as shown in FIG. 25. The Acquisition Clock Generator (ACG) circuit generates and distributes synchronization signals to other circuits. This facilitates acquisition of a received (incident) pulse, demodulation of the pulse, and selective activation of circuitry to conserve power and preserve memristor viability and lifetime.

Synchronization of signal reception can be a challenging process, and may be aided by embedding dedicated spread spectrum (e.g. High-Gain) pulses into a Pulse Train. These are termed herein as "Synch Pulses" (S-Pulses) and may possess some known pattern of occurrence, CDID, and other properties. The processing gain and strong detection peak associated with the S-Pulses may enhance Pulse Train Tracker accuracy.

6.1 Acquisition Clock Generator

Referring to FIG. 25, the Pulse Train Tracker 324 may include an Acquisition Clock Generator (ACG) 2572. As shown, the ACG receives pulse parameters from the Pulse Train Tracking Circuits 2570. Parameters sent to ACG 2572 may include a high-precision TOA estimate. This estimate might be accurate to within some fractional value of "T", where T is the baseband sampling period of the pulse signal. The precision may be dependent upon multi-parameter averaging over a plurality of pulses, as might be achieved with a type of Kalman filter or similar process.

In FIG. 25 there is a high frequency clock designated as 2573 having a period (T/R) where R is some integer value. The clock 2573 might originate directly from the Receiver Local Oscillator (LO) or through some clock "dividing" or reduction mechanism. The clock 2573 is sent to the ACG.

With a clock rate higher than the sampling rate, the ACG is capable of resolving time intervals shorter than "T", as commensurate with the high resolution parameters available from the Pulse Train Tracking Circuits 2570. The ACG may align (i.e. synchronize) operation of various circuits to match the TOA of incident pulses to within a time resolution T/R. To this end, clocks and pulses produced by the ACG are distributed to other circuits and subsystems. Referring again to FIG. 25, these include a Beamformer Activation Strobe 2576, a VAU Clock 2577, and an A/D Converter Clock 2578.

Figure 26:
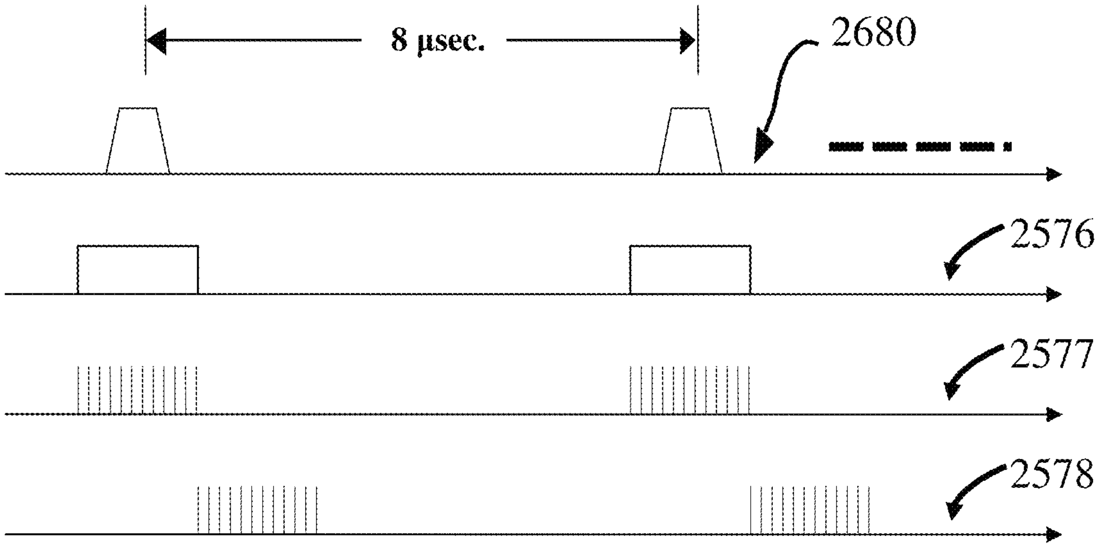
FIG. 26 shows the output waveforms of an Acquisition Clock Generator.

Referring to FIG. 26 is Pulse Train 2680. As illustrated in FIG. 26 the Beamformer Activation Strobe 2576 is generated so as to overlap (bracket) the pulses of 2680 in time. The Beamformer (or portions thereof) might be "activated" only during the Strobe 2576. This serves to optimize the lifetime of the memristor elements of the Beamformer, and also minimize power consumption.

The ACG may also synchronize activation of the Beamformer during Sending Mode. As in the Receiving Mode, this is instrumental in optimizing Beamformer lifetime and performance levels.

6.2 Pulse Train Tracker Interfaces

Figure 27:
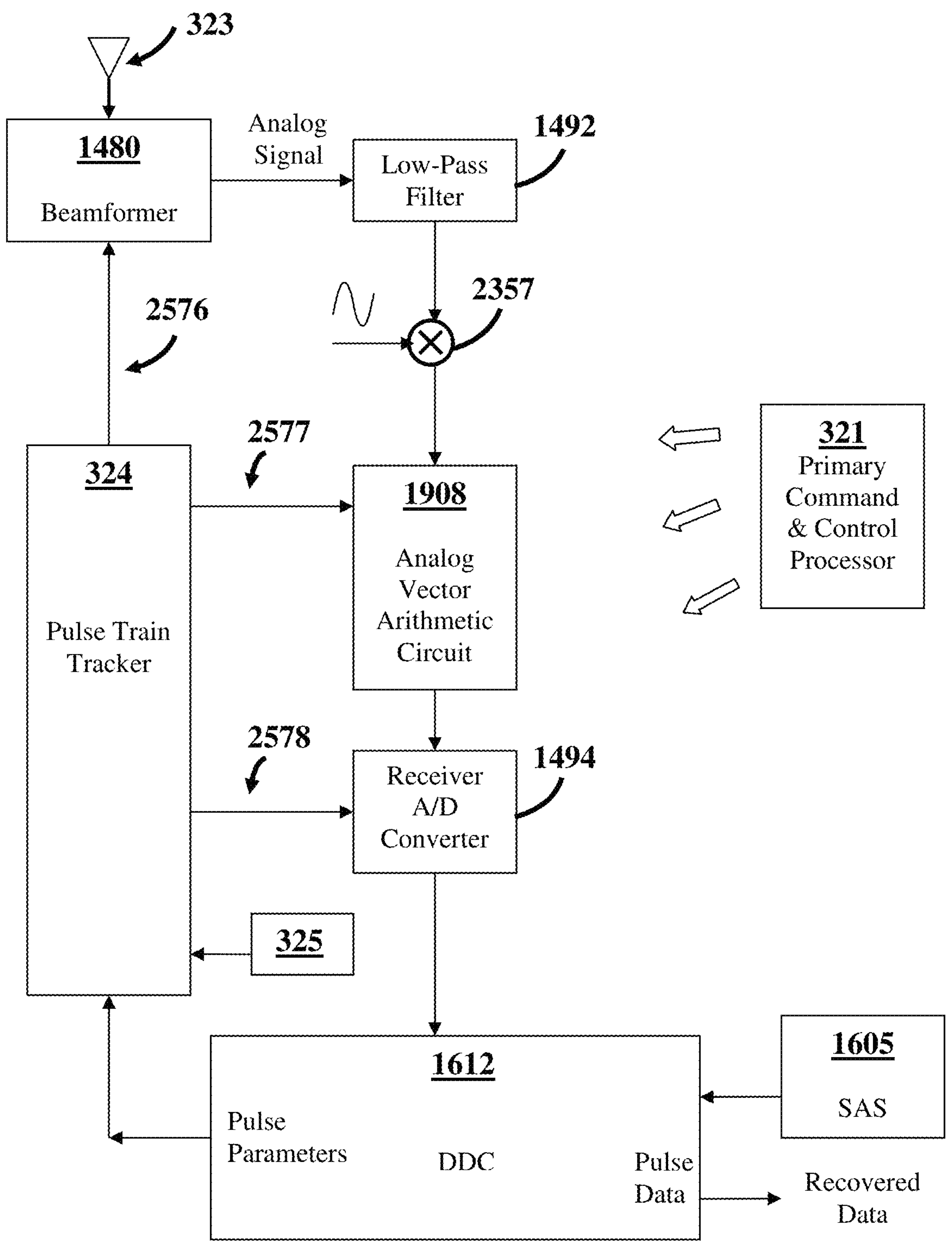
FIG. 27 exemplifies the Pulse Train Tracker integrated into an example Receiver architecture of the invention.

FIG. 27 depicts an example of the Pulse Train Tracker 324 integrated with other circuits disclosed herein to support a Receiver. Depicted is the signal flow from antenna array 323, to beamformer 1480, to Low-Pass Filter 1492, to AVAC 1908 and to the Receiver A/D Converter 1494. After manipulation by these circuits as has been described, the signal may be sent to the DDC 1612.

The DDC may perform final detection and measurements of pulse signals. Illustrated in FIG. 27 are separate outputs from the DDC for pulse parameters and data. Parameters (e.g., TOA, AOA, amplitude) may be extracted from various pulse types and provided to the Pulse Train Tracker 324 as shown. However the S-Pulses may provide finer resolution parameters to the Pulse Train Tracker for higher TOA tracking accuracy, especially in the presence of noise. Data output from the DDC might be derived (for example) from High-Gain, Low-Gain and Extended Pulses.

Referring to FIG. 27, the Pulse Train Tracker 324 sends the Beamformer Acquisition Strobe 2576 to the Receiver Beamformer 1480. The Strobe activates the Beamformer during the expected arrival of an incident pulse as determined by the Pulse Train Tracker. As seen in FIG. 27, the VAU Clock 2577 and A/D Converter Clock 2578 are also outputs from the Pulse Train Tracker. The VAU Clock 2577 overlaps in time with Strobe 2576, such that the AVAC may acquire a sampled analog signal representing the received pulse. The A/D Converter Clock 2578 is supplied to Receiver A/D Converter 1494, allowing digitized results of the AVAC calculations to be passed to the DDC 1612.

The Pulse Train Tracker might primarily use the parametric history of S-Pulses to track and predict pulse occurrences. Multiple pulse trains may be tracked simultaneously. In the example embodiment of FIG. 25 the Pulse Train Tracking Circuits 2570 may provide predicted (i.e. future) pulse TOAs to the ACG 2572. The ACG then generates synchronization signals based on this input. In this embodiment the Pulse Train Tracker may then track and separate multiple incident pulse trains.

6.3 Separation and Identification of Pulse Trains

To track multiple pulse trains simultaneously, some embodiments might employ multiple Pulse Train Tracking Circuits. A separate "Tracking Process" might be instantiated for each pulse train being tracked. The Tracking Processes may interact to effect mutual "pulse screening" or "pulse blocking" procedures, wherein each process accepts only those incident pulses belonging to its own pulse train.

Pulse tracking may be based upon some type of Kalman Filter or similar algorithm which may create a pulse train model and predict the occurrence of the next pulse. The inputs to the Filter may include TOA, AOA, width and amplitude of a pulse. An additional input might be physical orientation data from the Navigation Unit 325. This is shown as providing input to the Pulse Train Tracker 324 in FIG. 27. Such data may be used to correct for angular motion of antenna components in calculation of the AOA.

A Track File may be created for each pulse train being tracked. The Track File may contain parameters (e.g., PRI, AOA) of that pulse train. The Track Files allow separation and identification of multiple incident pulse trains. Additionally, a "figure of merit" (FOM) may be embedded into a track file. The FOM might indicate for example the tracking accuracy, and the absence or corruption of individual expected pulses.

The Pulse Train Tracker may store Track Files locally in Track File Memory 2571, and also provide them to the PCCP 321 via an interface as depicted in FIG. 25. The PCCP in turn may take actions based on the track file information, and also incorporate said information into the Operational Picture.

The PCCP might take a variety of corrective actions in response to an excessive number of degraded or missing pulses. If track can be maintained, this might only require adjustment of basic detection thresholds in various parts of the Receiver. Adjustments might also be made to the Beamformer to alter the shape of the Receiver antenna pattern. Adaptations might also be made to the real-time tracking algorithms (e.g. Kalman Filter). The present disclosure extends to such methods and combinations thereof, including to the extent that they might be exercised by "expert rules" or artificial intelligence (AI) within the PCCP.

The S-Pulses might occupy only a portion of the pulse train, and may be interlaced with Low-Gain Pulses. The expected position of S-Pulses within a pulse train might be known to both Sender and Receiver. If some percentage of the S-Pulses are corrupted or missing, this may reflect a poor connection and be noted in the Operational Picture. When down-converted to baseband, S-Pulses might exist as either real-valued or complex pulse signals.

The Pulse Train Tracking Circuits 2570 might include one or more processors augmented by specialized fixed logic and/or programmable logic circuitry. A processor of 2570 may be a microcontroller, microprocessor, RISC processor or other programmable device; wherein the processor has access to storage media containing computer program products comprising instructions, which when executed by the processor may perform various functions of the Pulse Train Tracker as have been described in the Subsections above. Storage media for the computer program product(s) may include volatile and non-volatile solid-state digital storage devices, including RAM, PROM, EEPROM and like devices.

6.4 Methods of Pulse Collision Correction

The Pulse Train Tracker may also be of utility in correcting pulse collisions, especially (for example) the Low-Gain Pulse. This utility may be derived by the following three-part method.

First, pulses might be grouped into "blocks" (i.e., sub-groupings of the pulse train). No alteration of the PRI would necessarily be incurred. Within each block there may be an extra dedicated "correction pulse". This pulse may be redundant information, such as the summation of the data in the other pulses of the block. For example, if the block is composed of three "data pulses" A, B, and C; then the correction pulse of (A+B+C) might be appended to the block.

Second, a collision may be detected when a pulse of a tracked pulse train has one or more corrupted parameters, as might be determined by the DDC 1612. Said parameters might include AOA, TOA, amplitude or even pulse width. A collision might also be determined by the inability to recover User identification data from the pulse.

Third, the corrupted pulse might be restored by arithmetic processes. For example if pulse "A" is corrupted, then a corrected pulse is derived as;

$$A=(A+B+C)-B-C,$$

where the correction pulse and pulses B and C are all assumed to be correctly received. Likewise, pulses B or C may be recovered if the other three pulses of the block are correctly received.

The example method above will fail if two or more pulses of the block are corrupted. However the probability of two corrupted pulses in the same block may be much lower than that of a single corrupted pulse. For instance, if the probability of a pulse collision is 1%, then for the example above the probability of two pulse collisions within the same block is;

$$((4!)/((4-2)!*(2!)))*(0.01)^2*(1-0.01)^2=0.00059$$

or, approximately 1 in 1700.

The method disclosed herein in Subsection 6.4 provides another level of resilience to pulse collision, which is already inhibited by the use of time domain and spatial domain separation of pulse trains as has been disclosed. Also, the method may provide resistance to various RF noise interference sources.

Under the disclosure, variations of the method are possible including the number of pulses in a block, the number of correction pulses in a block, and different encoding schemes for correction pulses.

7.0 Phase-Controlled Extended Beamformers

Now disclosed are unique beamformer circuits and methods based in part on memristor technologies as disclosed in Section 3.0. Beamforming may be a dynamic process, especially in a mobile User network. Conventional memristor design schemes may be non-viable under such circumstances. This is due to intensive reprogramming (write cycles) which rapidly degrades memristor performance and durability.

The disclosure describes novel architectures to resolve this issue. These include massive Memristor Memories pre-programmed with beamforming information for dynamic access and re-use. Hundreds of pre-defined beam shapes may be stored in a 2-D or 3-D physical memristor circuit structure. Such a structure may exhibit an "in-memory computing" capability, and therefore be referenced below as a "Computational Memory".

Also described are specialized memristor circuit cells which allow steering of the beam shapes (patterns) without imposing write cycles upon the memristor elements. This is further described in Section 7.5 below. In this description a memristor cell may be comprised of multiple memristors and transistors.

Parts of the disclosure below relate to either an "Extended Sender Beamformer" or an "Extended Receiver Beamformer". However some embodiments may also have elements and methods common to both. As a result, the term "beamformer" herein may sometimes be used in reference to both Senders and Receivers. Also, the following descriptions may use the same reference number(s) to identify like elements or components across several of the accompanying drawings.

It is noted that in some embodiments, major portions of the Extended Sender Beamformer and Extended Receiver Beamformer might be combined to reduce circuit complexity. Such embodiments are intended to fall within the spirit and scope of the present disclosure. Also, some embodiments may duplicate the beamformer circuitry for the sake of redundancy, as a way of enhancing lifetime and reliability.

7.1 Large Scale Pre-Programming Methods

Within the Computational Memory small groups of memristors may be aggregated into "memristor cells" (or simply "cells"). A cell may perform complex multiplication to adjust the phase and amplitude of an analog input signal. The cells may be organized into matrices, wherein a given matrix column is pre-programmed to perform multiplications associated with a specific beam shape. Such a column is termed below as a "Beam Array".

A specific Beam Array might be selected to compensate for a User's operating or environmental condition. As examples, some beam shapes may compensate for variations in "squint". Other beam shapes may adapt to changing channel state information (CSI) as detected by the User. The PCCP might dynamically select different Beam Array(s) to compensate for such conditions. In the case of squint, a selection might be based on antenna configuration, carrier frequency, and deflection (steering) angle of a spatial beam. For CSI conditions, a Beam Array might be selected on the basis of channel noise or signal fading. Unique advantages and utility of the pre-programmed Computational Memory include the ability to rapidly select and switch among a multiplicity of pre-programmed beam shapes.

Figure 28:
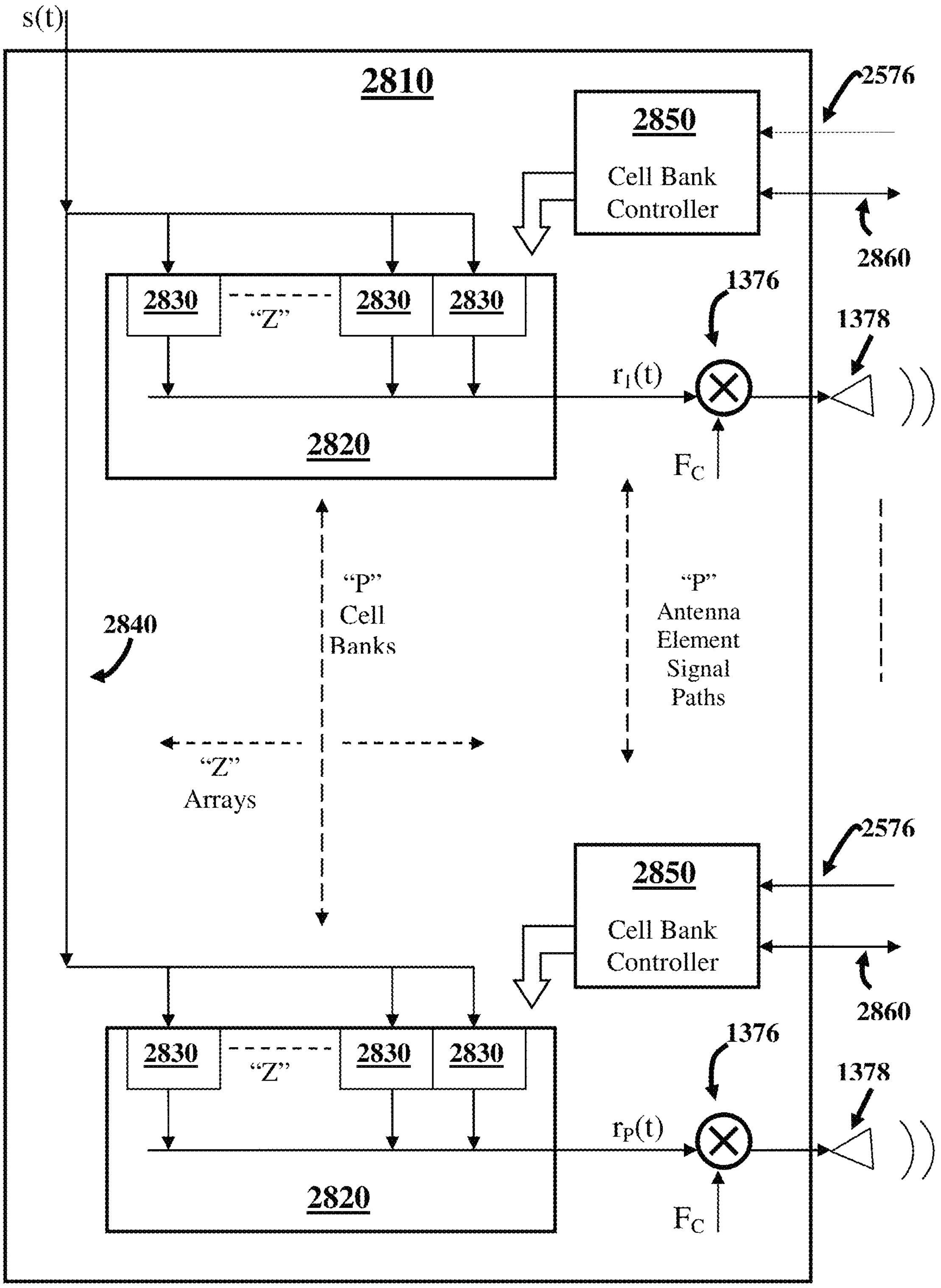
FIG. 28 is an example of an Extended Sender Beamformer containing a memristor Computational Memory comprising multiple Beam Arrays.

Shown in FIG. 28 is an example embodiment which extends the Sender Beamformer architecture of FIG. 13. In FIG. 28 an "Extended Sender Beamformer" 2810 employs a Computational Memory organized as a matrix of cells, with columns (Beam Arrays) pre-programmed for specific beam shapes.

Referring to FIG. 28, the Extended Sender Beamformer 2810 has a plurality of Cell Banks 2820. As shown, each Cell Bank comprises a plurality of memristor cells 2830. There is a separate Cell Bank for each signal path of "P" antenna elements. As shown, there exist "Z" cells within each Cell Bank, where Z is related to the number of individual pre-programmed Beam Arrays. Consequently, the Extended Sender Beamformer 2810 may comprise a total number of cells proportional to (P)*(Z).

As in FIG. 13, the Extended Sender Beamformer of FIG. 28 has "P" signal paths 1378 comprising antenna elements, power amplification and filtering circuitry. Also shown are "P" Up Converters 1376 which translate signals to transmission frequencies (e.g. mmw) for the antenna elements. Each up-converter has an analog input In from a Cell Bank 2820. A Signal Distribution Crossbar 2840 provides the Cell Banks with a common, continuous analog input s(t) as shown.

In FIG. 28 a Cell Bank Controller 2850 has a "PCCP Interface" 2860, and also receives the Beamformer Activation Strobe 2576 from the ACG 2572. As shown, a separate Cell Bank Controller (CBC) may exist for each of P antenna element signal paths (although alternative embodiments are possible). The PCCP and ACG Interfaces are shown as common to all CBCs (with other configurations possible). The CBC 2850 may control the flow of information and commands from the PCCP 321 to various portions of the Extended Sender Beamformer circuit. Libraries of beam shape information might be downloaded from the PCCP to the beamformers via the CBCs. Also, the PCCP might command the CBCs to effect various beamformer modes of operation.

Modes of beamformer operation which might be effected by the CBC include (but are not limited to) the four modes described in Subsection 7.2.

7.2 CBC Modes of Operation

First is the CBC Inactive Mode, during which cells may be kept in a quiescent state in the interval between Pulses. In this Mode a CBC may disable inputs (thereby restricting current flow) to a Cell Bank in order to extend memristor lifetime.

Second is the CBC Active Mode, during which a cell may be selected from each Cell Bank 2820 for a desired beam shape (as pre-programmed into a Beam Array column). The CBC may use the Beamformer Activation Strobe 2576 to synchronize this action to a PRI. A CBC may then activate the selected cells from the Cell Banks for beamforming for the duration of a transmitted pulse. The CBC may also provide certain stimuli to the selected cells to effect beam steering. (The latter process being described more fully in the Subsection 7.5 below).

Third is the CBC "Tuning" Mode. Tuning compensates for drift of memristor conductance which occurs as a result of electric fields applied during normal operation. Numerous tuning mechanisms have been modeled or implemented for neural network applications of memristors. Similar strategies may be performed on selected beamformer memristors during the interval between Pulses. Tuning may restore memristor conductances back to known reference values. The CBC may provide voltages and waveforms to selected cells according to tuning requirements. The CBC may also contain a database of reference values for beam patterns (Beam Arrays).

Fourth is the CBC Programming Mode. In this Mode, initialization and updated beam shape information may be programmed into the memristor cells. A large Computational Memory might undergo a "one-time", "start-up" or "boot-up" programming procedure, such that a library of beam shapes are made available for dynamic re-use as necessary. The Programming Mode may also allow updates to the library of beam shapes (which might require reprogramming of selected Cell Banks).

The CBC may store beam shape information for programming into a Computational Memory. Such information might be stored in either volatile or non-volatile digital memory media. Non-volatile analog semiconductor storage as "floating gate transistors" might be employed in some CBC embodiments. Such storage may be used as reference for programming and tuning the Computational Memory.

Some embodiments of the CBC might also comprise specialized digital logic circuitry, as well as some type of nominal programmable processor or microcontroller. Some embodiments might contain a RISC processor or a "state-machine". The CBC may also incorporate analog circuitry as necessary to generate memristor programming and tuning waveforms to the Cell Banks.

7.3 Beamformer Signal Flow

As per Subsections 7.1 and 7.2 above, a Beamformer might contain a massive Computational Memory comprising a plurality of Beam Arrays. One physical organization of the Computational Memory is that of a two dimensional matrix of cells, wherein the matrix has dimensions (P)×(Z), where;

Z is the number of Beam Arrays, and

P is the number of antenna signal paths of the Beamformer.

Figure 29:
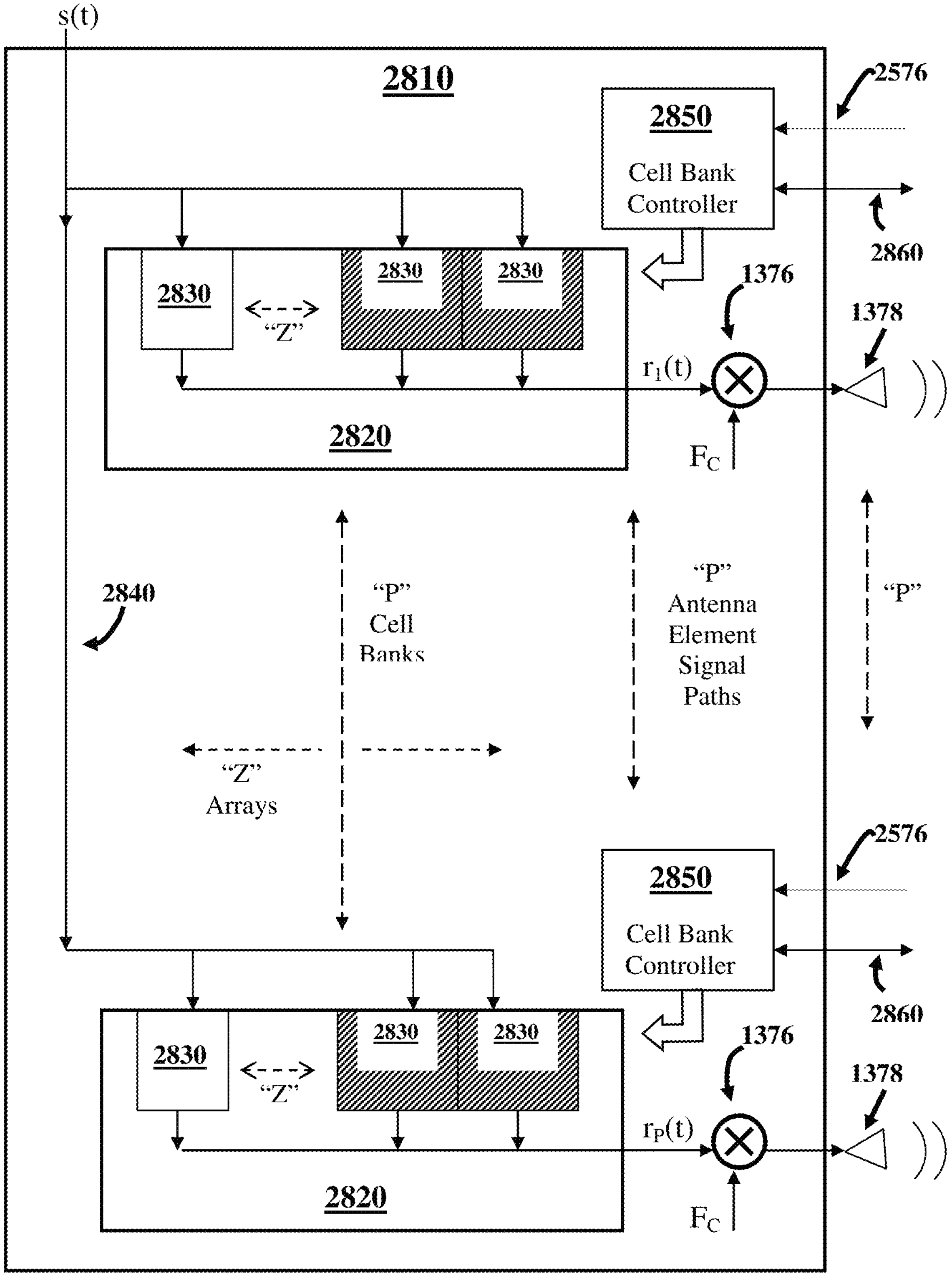
FIG. 29 depicts the example Extended Sender Beamformer with a single activated Beam Array of the memristor Computational Memory.

Referring to the Extended Sender Beamformer 2810 in FIG. 29, a Cell Bank 2020 may be a row of a 2-D organization of memristor cells. Cell Banks of width "Z" might accommodate "Z" Beam Arrays. In FIG. 29, only those cells associated with a given Beam Array might be activated (enabled) during a given pulse. That is, a specific pulse may be associated with a specific Beam Array, which in turn is comprised of a column of cells. (Other cells of the Cell Banks 2820 of FIG. 29 are marked with a diagonal "hatch texture" and are considered "inactive" having no current flow). This effectively allows a selected Beam Array to be connected into the antenna signal paths of the Beamformer. A selected Beam Array is indicated by the "non-textured" column in FIG. 29.

7.3.1 Extended Sender Beamformer Circuit Signal Flow

The cells of FIGS. 28 and 29 might be interconnected by a physical grid of horizontal and vertical electrical conductors, referenced below as "crossbars".

In the Extended Sender Beamformer of FIG. 28, a common analog input s(t) may propagate down vertical conductors of a crossbar grid. These vertical conductors may intersect "P" rows of cells, with each row constituting a Cell Bank 2820. The electrical current outputs of the constituent "Z" cells 2830 of any given Cell Bank may be summed on a horizontal conductor dedicated to that Bank. Suitable peripheral circuits of the grid may convert the current outputs of rows into voltages. (Such conversion is a frequent part of memristor circuit designs). The resulting voltages might then be applied to the Up Converters 1376, with "P" separate signals available for the antenna signal paths.

7.3.2 Extended Receiver Beamformer Circuit Signal Flow

Figure 30:
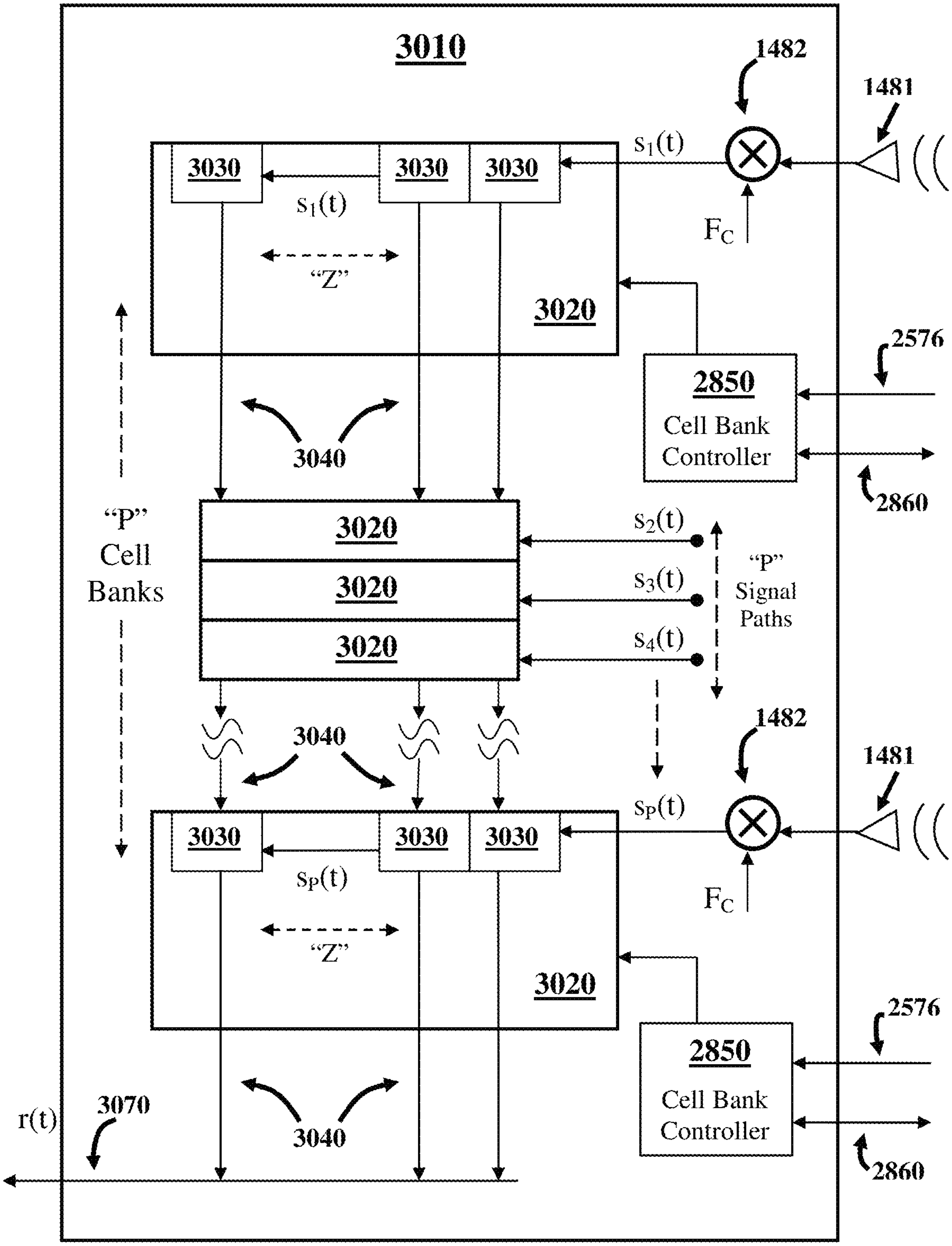
FIG. 30 is an example of an Extended Receiver Beamformer containing a memristor Computational Memory comprising multiple Beam Arrays.

FIG. 30 is an example embodiment of an Extended Receiver Beamformer 3010 with a multiplicity of Cell Banks 3020, wherein each Cell Bank comprises a plurality of cells 3030. Each Cell Bank receives a separate analog input $s_x(t)$. There are "P" such inputs originating from the Down Converters 1482 and propagating across the horizontal conductors of a crossbar grid as shown. All cells of any given Cell Bank "p" receive the same input signal $s_p(t)$ over a horizontal conductor line dedicated to that Cell Bank.

In the Extended Receiver Beamformer 3010 there is a plurality of vertical conductor crossbars 3040. A vertical conductor 3040 connects the cells of an activated Beam Array to a horizontal crossbar 3070. Summation of the electrical current outputs of the cells 3030 of the activated Beam Array may take place on the vertical crossbar 3040 dedicated to that Beam Array. The composite current of the crossbar 3040 may then be directed to the horizontal crossbar 3070.

Figure 31:
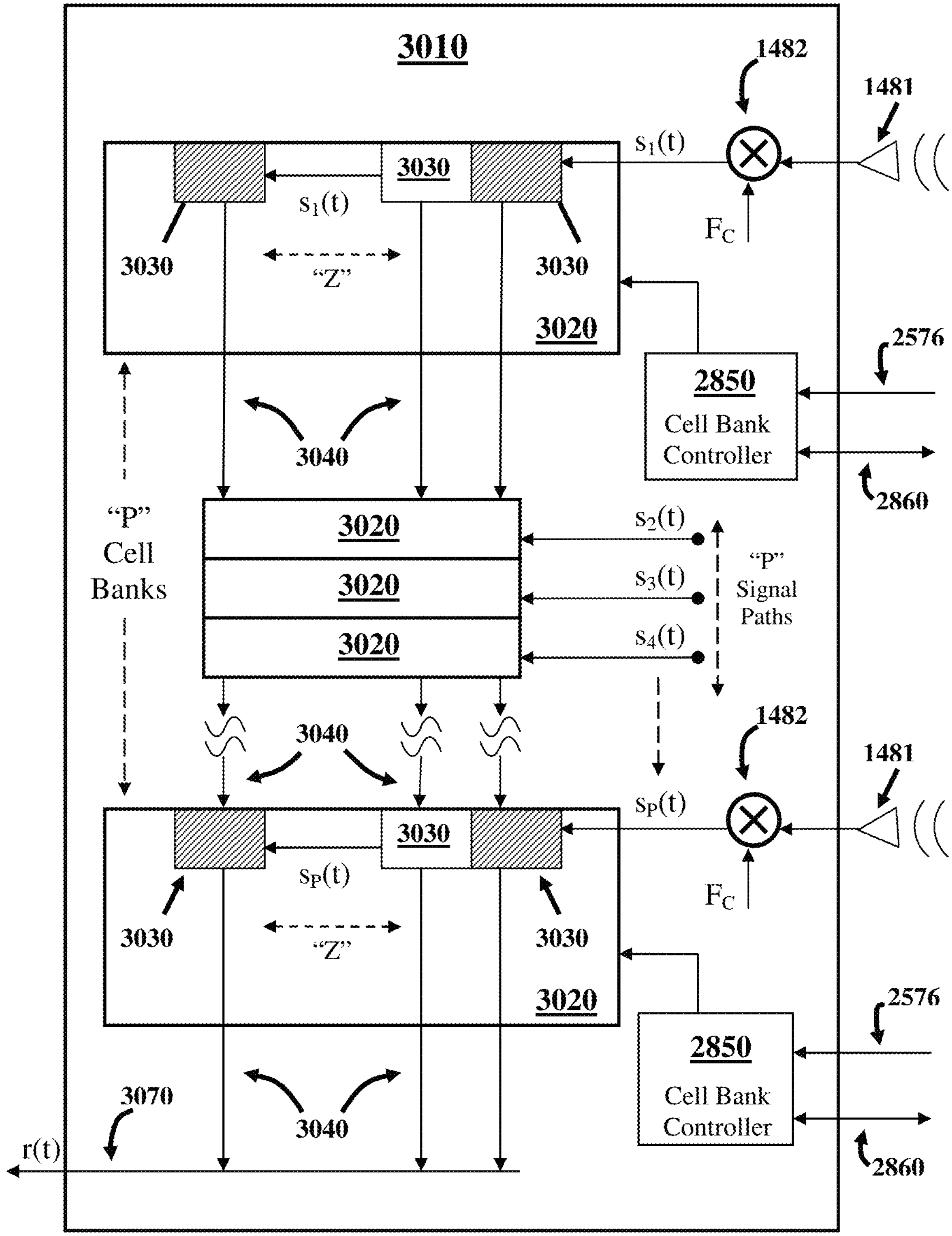
FIG. 31 depicts the example Extended Receiver Beamformer circuit with a single activated Beam Array of the memristor Computational Memory.

FIG. 31 depicts the Extended Receiver Beamformer 3010 wherein only one column (Beam Array) of the Extended Receiver Beamformer is activated. In this condition only one vertical conductor 3040 might conduct current to the horizontal crossbar 3070. Alternatively, if more than one Beam Array is active then the electrical currents from a plurality of the vertical conductors 3040 might be summed on the horizontal electrical conductor 3070. The current in crossbar 3070 may then be converted to a voltage signal for subsequent processing.

The CBC operational Modes in the Extended Receiver Beamformer 3010 are similar to those of the Extended Sender Beamformer 2810 already described. Also, as with the Extended Sender Beamformer only those cells associated with a given beam might be activated (enabled) during a given pulse. That is, a specific pulse may be associated with a specific spatial beam (Beam Array) which is comprised of a column of cells. (Other cells of the Cell Banks are marked with a diagonal "hatch texture" as illustrated in FIG. 31 may be considered "inactive").

7.4 Computational Memory Geometry

The Computational Memories in the Beamformers of FIGS. 28-31 may exhibit characteristics of "in-memory computing". This is enabled by both storage and processing of information in the same physical devices (e.g., memristors). Such computing has been widely postulated as a mechanism for neural net processors. But for this disclosure "in-memory computing" may be use for novel beamforming approaches.

Although the Computational Memories may be depicted as two dimensional in the examples of FIGS. 28-31, some embodiments may have different physical and logical organization. Therefore variations of the Computational Memory geometry are intended to fall within the scope and spirit of the present disclosure.

Also in the examples of FIGS. 28-31, a Computational Memory column (Beam Array) may be pre-programmed for a specific beam shape. However the linear nature of such a column does not imply a constraint on the physical arrangement of the antenna array. That is, the P cells of a column of the Computational Memory may provide beam shaping for antenna arrays having linear, rectangular, or arbitrary physical arrangements.

Some embodiments of the present invention might utilize different types of memristor technology for the Computational Memory. Notably, some memristor technologies are more favorable to CMOS type manufacturing processes than others. An example may be Resistive Ram (RRAM) memristor technology. Accordingly, a Beamformer embodiment based on this type of technology might be more amenable to monolithic integration with other CMOS circuitry of either analog or digital nature.

7.5 DAPS Cell Structures and Methods

The disclosure now describes a Discrete Analog Phase Shifting (DAPS) Cell which may be instantiated for cells 2830 and 3030 described above. The DAPS Cell may allow discrete (incremental) phase shifting of analog signals using memristor circuitry. The DAPS Cell may be comprised of one or more "Composite Multiplier" circuits described herein.

7.5.1 Composite Multiplier Structures

The DAPS Cell may include one or more memristor-based Composite Multipliers, wherein the Composite Multiplier has one binary multiplier input and an analog multiplicand input. The analog multiplicand may also be multiplied by some coefficient which is pre-programmed into the Composite Multiplier for beam shaping. Therefore the Composite Multiplier may form the product of three operands which are;

- a binary input,
- an analog signal input "s", and
- beam shaping coefficient "a" (pre-programmed as memristor conductances).

Figure 32:
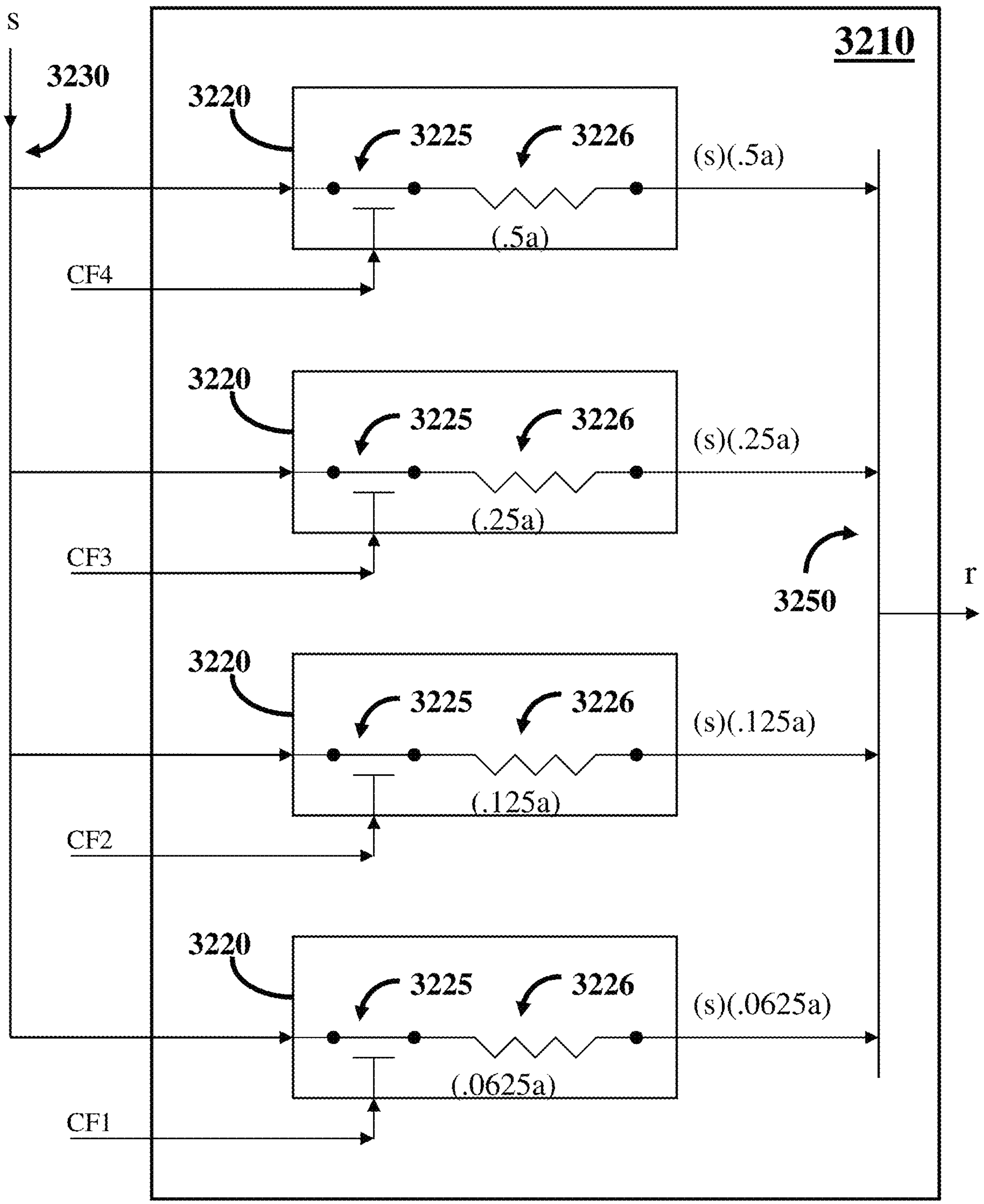
FIG. 32 shows a memristor-based multiplier cell capable of the generation of the product of three operands.

FIG. 32 depicts an example structure of the Composite Multiplier 3210. As shown, the Composite Multiplier may have a plurality of smaller pre-programmed memristor Base Cells 3220. The Base Cells have a typical "1T1R" design, which has been widely studied and fabricated in various memristor technologies. In the 1T1R design of FIG. 32 a single transistor 3225 serves as a switch to enable or disable current flow through a single memristor device 3226, examples of which may be a PCM, RRAM, MRAM, or CeRAM device. Therefore each Base Cell 3220 has a separate "enable" control, typically connected to the "gate" input of a field effect transistor (FET). (However some other embodiments may have different designs or mechanisms for enabling a Base Cell). A common analog input signal "s" in FIG. 32 may be provided to the Base Cells 3220 by a crossbar (or some segment thereof) 3230.

Each Base Cell 3220 might be programmed with a common beam shaping coefficient "a" modified by a different scaling factor. In FIG. 32 the scaling factors are related by integral powers of 2. The resulting weights of the Base Cells are then 0.5a, 0.25a, 0.125a and 0.0625a.

The CBC may send a group of enable control lines CF1, CF2, CF3, and CF4 to the Base Cells as shown in FIG. 32. Currents flowing through the "enabled" Base Cells" are added at a summation crossbar 3250 of FIG. 32. By Kirchoff's Laws and the Distributive Property of Multiplication, the composite current at crossbar 3250 is then the product of "s" and the sum of the individual conductances of the enabled Cells.

Table IV shows products which may be generated by the structure of FIG. 32. The four Base Cells of FIG. 32 allow 24=16 distinct products, (only six of which are shown to limit table size). In the first table column is the Composite Multiplier "Control Field" (CF), representing the control lines CF1-CF4 as a fractional binary field.

TABLE IV

| Multiplier Control Field (CF) | Calculated Products | Number of "Enabled" Base Cells |
|---|---|---|
| .0000 | (s)(a)(0 + 0 + 0 + 0) = 0 | 0 |
| .0001 | (s)(a)(0 + 0 + 0 + .0625) = (s)(a)(.0625) | 1 |
| .0101 | (s)(a)(0 + .25 + 0 + .0625) = (s)(a)(.3125) | 2 |
| .1000 | (s)(a)(.5 + 0 + 0 + 0) = (s)(a)(.5) | 1 |
| .1100 | (s)(a)(.5 + .25 + 0 + 0) = (s)(a)(.75) | 2 |
| .1111 | (s)(a)(.5 + .25 + .125 + .0625) = (s)(a)(.9375) | 4 |

The second column of Table IV lists calculated products for the given Control Field, with four Base Cells constituting a fractional base-2 multiplier value. The third column of Table IV gives the number of Base cells which are enabled for each multiply.

7.5.2 Beam Steering with DAPS

Under the present disclosure, beamforming may include two processes. These are the "shaping" of the beam and the "steering" of the beam. This may entail arrays of "P" antenna elements and "P" antenna signal paths as described above in the beamformer structures. The DAPS Cells may apply phase and amplitude adjustments to the "P" antenna signal paths, so as to effect shaping and steering of one or more beams.

For example, in a linear array of antenna elements where it is desired to steer a beam in one spatial dimension (i.e., azimuth or elevation), the output of a DAPS Cell from row (Cell Bank) "p" of a column of "P" antenna signal paths might be expressed as $r_p(t)$, where;

$$r_p(t)=s(t)a_p(w^{kp})$$

and where;

$$W=e^{-(2\pi i)/P}$$

- s(t) may be a complex input to the DAPS Cell,
- $a_p$ may be a complex beam shaping coefficient programmed into the DAPS Cell,
- k is a constant determining the steering angle, where k<P,
- $W^{kp}$ defines a phase shift to be applied at DAPS Cell "p".

In this example the complex exponential $W^{kp}$ defines the phase shift applied at DAPS Cell "p". This might be applied by two or more Composite Multipliers within the DAPS Cell. The real and imaginary components of the exponential may be represented by the "Control Fields" (CF) of two Composite Multipliers. As seen in FIG. 32 and described in Subsection 7.5.1 the CF might be a four bit fractional binary field applied by the CBC.

The complex exponential $W^{kp}$ can also be stated as;

$$w^{kp}=v(p,k)=e^{-(2\pi ikp)/P}=\cos(2\pi kp)/P-i[\sin(2\pi kp)/P]$$

The function v(p,k) can be interpreted as a "steering vector" over the "P" cells (and "P" signal paths) of the subject column. As such, a single beam may be steered at an arbitrary angle determined by the value "k" (which may remain constant for at least the duration of the pulse signal).

With both "k" and a columnar set of beamshaping coefficients 'A' constant for the duration of a pulse signal, the Computational Memory may be treated as a Linear Time Invariant (LTI) circuit for the duration of the pulse. Under these conditions a plurality of complex exponentials may be superimposed to create a composite beam steering vector which is a function of only the single variable "p" for the pulse duration. For example, a summation of three complex exponentials is shown below to form an expression for a steering vector v(p);

$$v(p)=(W^{k1p}+W^{k2p}+W^{k3p})$$

In this example the steering vector v(p) enables formation of three spatial beams, where the beam shape of a specific column is steered in three directions simultaneously. This may allow a simultaneous connection among several Users as shown in FIG. 10.

It is noted here that other expressions of the steering vector are possible for other configurations (e.g., non-linear) of the antenna array and also for two-dimensional steering of beam(s), and that the embodiments and methods described herein are examples. The scope and objectives of the present disclosure are understood to include any variations of the disclosure relating to non-linear antenna array configurations and two-dimensional beam steering methods.

A more "generalized" expression for a composite steering vector V(p) is given below;

$$V(p)=(v_1)W^{k1p}+(v_2)W^{k2p}+(v_3)W^{k3p}$$

where $(v_1)$, $(v_2)$, and $(v_3)$ are scaling values for the respective complex exponentials and are constant for the duration of a pulse.

A formalized statement of V(p) may be given for all whole numbers "k" less than P, and some sequence of scaling values v(k) having index "k". In this case the form of V(p) is a summation of weighted, orthogonal complex exponentials expressed as;

$$V(p)=\sum_{k=0}^{k=(P-1)} v(k)W^{kp}$$

and where the steering vector V(p) can therefore be calculated by the Discrete Fourier Transform (DFT).

Accordingly, for this generalized method the output of a DAPS Cell in row "p" of a column of "P" antenna signal paths may be expressed as $r_p(t)$, where;

$$r_p(t)=s(t)(a_p)V(p)$$

where;

s(t) is a complex input to the DAPS Cell;

V(p) defines a phase shift to be applied at DAPS Cell "p"; and $a_p$ is a complex beam shaping coefficient programmed into the DAPS Cell.

Figure 33:
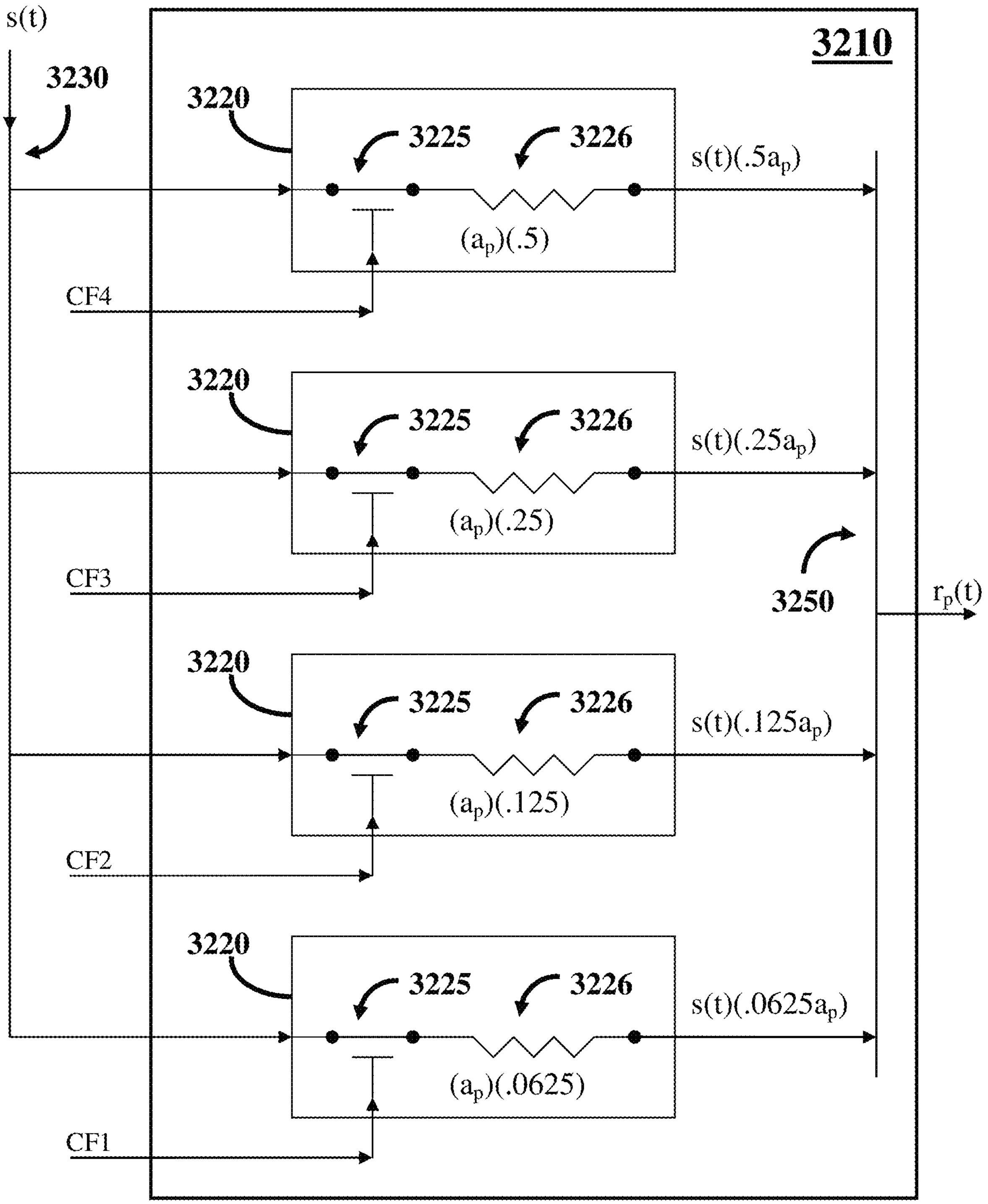
FIG. 33 shows a memristor-based multiplier cell designed for simultaneous beam shaping and beam steering.

In this method V(p) is a phase shift (and scaling) to be applied at DAPS Cell "p". The V(p) may be applied by the Composite Multipliers of the DAPS Cell, with binary Control Fields ($CF_S$) representing V(p). This is reflected in FIG. 33, where the weights of memristors 3226 are scaled by relative factors of "2", and the signals CF1-CF4 are a binary field representing one part (real or imaginary) of V(p).

It is noted again that the example structures, embodiments and methods disclosed above may enable one-dimensional beaming. But it is understood that the scope of the present disclosure also extends to any alternative embodiment comprising non-linear antenna array configurations and two-dimensional beam steering.

Also, analysis and examples above pertaining to only one active Beam Array (column) represent only one mode of operation of the beamformers. By another mode, two or more columns might be simultaneously active. In such a scenario the resulting antenna gain pattern might be estimated with the aid of the known "additive property" of the Fourier transform.

Additionally, the analysis and examples above do not preclude the use of arbitrary steering vectors. That is, steering vectors which are not complex exponentials.

7.5.3 Composite Multiplier Duplication

In the general case, the DAPS Cell may have a complex signal input as expressed above, and apply an arbitrary phase shift. This can require two signal channels (referred to as "in-phase and quadrature" or "real and imaginary") which might be addressed by two Composite Multipliers 3210 within the DAPS Cell.

Additionally, the beam shaping coefficients $a_n$ and beam steering factors may be bipolar (i.e. positive or negative). The signal input $s_n$ might also be bipolar. This presents a well documented problem in the use of memristors. That is, many memristor technologies are unipolar facilitating current flow in only one direction. (For the 1T1R cell configuration this is naturally the case, as the enabling transistor and memristor element are connected in series).

Various memristor structures have been proposed to address the above issues by a plurality of unipolar real-valued multiplier circuits such as 3210. Therefore given the knowledge of the present disclosure, it will be apparent to those skilled in the art that various alternative embodiments of the DAPS Cell may employ duplication of the circuit 3210 to address issues of complex, bipolar multiplication.

7.6 Beamformer Control Interface

The PCCP 321 may be communicatively coupled to the example Beamformer embodiments of FIGS. 28-31. This allows the PCCP to download information from some library or "codebook" database to the Beamformer. Such information may be used to initialize and update the Computational Memories of the Beamformers. The PCCP might direct such information to the Cell Bank Controllers 2850 for distribution to the Computational Memories of the Beamformers. As described above in Subsection 7.2 above, the Cell Bank Controllers (CBCs) may enter their "Programming Mode" during such an operation.

The PCCP might also command one or more CBCs to activate specific Beam Arrays (columns) of the Computational Memory for the beamforming process.

The PCCP might monitor the operational efficiency of the Computational Memories. As a consequence of such monitoring, the PCCP might command one or more CBCs to enter their "Tuning Mode" to correct and/or optimize the performance of a Computational Memory.

7.7 Methods of Beamformer Current Flow Control

Writing or re-programming (reset) cycles may degrade memristor lifetime due to limited "cycling endurance". Prolonged use in a "read-only" mode may also change memristor operating characteristics. Methods of the present invention disclosed herein may diminish these effects by reducing current flow as follows:

selecting for operation, one of a multiplicity of pre-programmed Beam Arrays from a Computational Memory;

activating said Beam Array only during the transmitting or receiving of a pulse signal (with other sections of the Computational Memory remaining inactive); and steering the RF beam by read-only access (i.e., without reset or re-writing) of the memristors constituting the pre-programmed and activated Beam Array.

Thus the invention may exploit the simplicity and efficiency of memristor circuitry, while at the same time resolving basic impediments to their use.

7.8 RF Circuit Calibration

The amplitude and phase responses of the RF circuit paths of the antenna arrays may be extremely difficult to match during manufacturing. That is, there will inevitably be variations from the ideal. Such variations can be detrimental to beamforming accuracy. Another advantage of the structures and methods of the disclosure is the potential to compensate for such variations.

If the RF path variations can be characterized during manufacturing, then the beamformer memristor cells may be able to compensate for said variations. This might be achieved by incorporating compensation factors into the programming of the memristor cells. Consequently, instead of three factors as described above, a Composite Multiplier 3210 might form the product of the four operands below (with "c" being a compensation factor);

a binary input, an analog signal input "s", and the pre-programmed conductance scaling value (c*a), where "a" is a beam shaping coefficient and "c" is the compensation factor.

Figure 34:
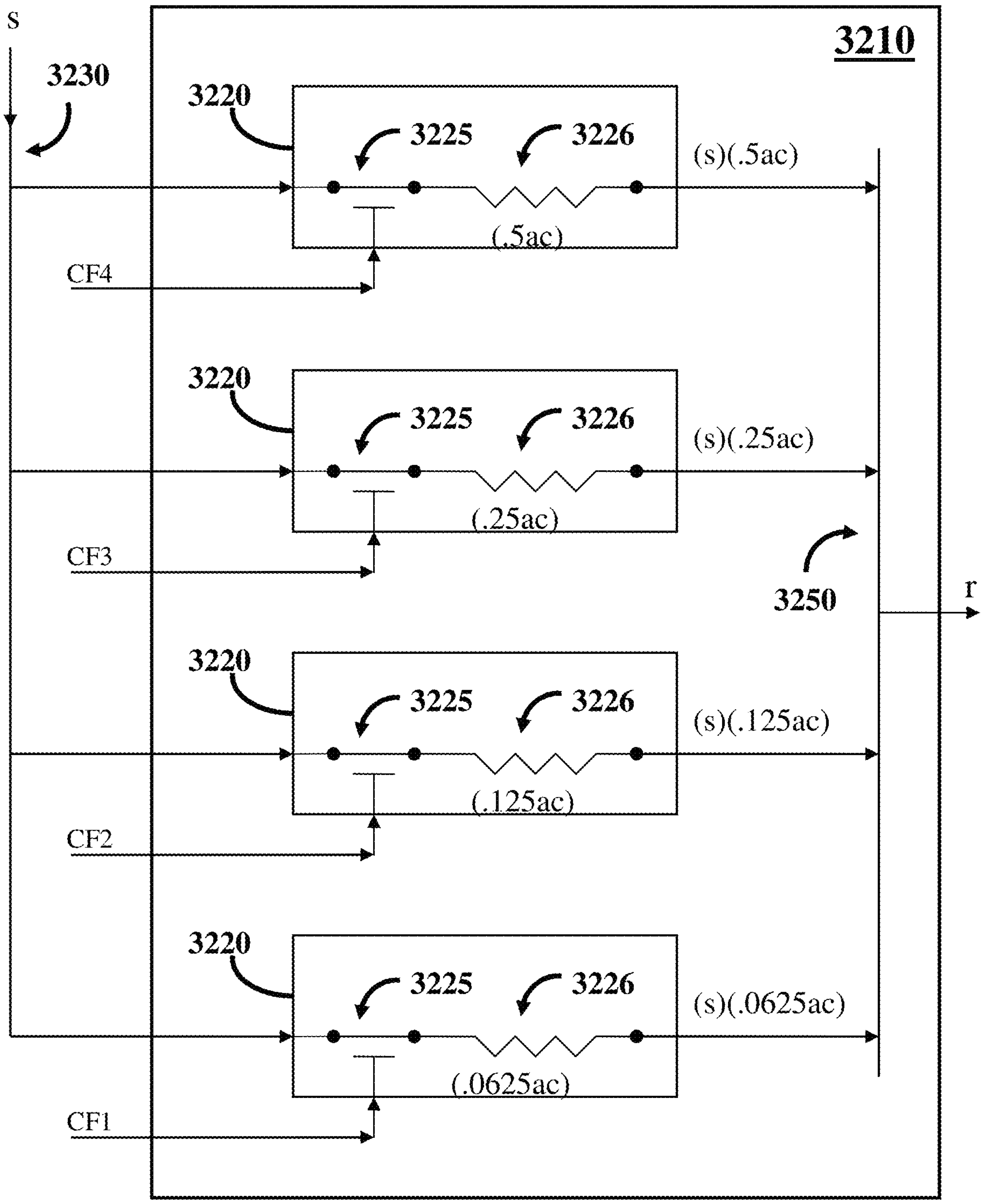
FIG. 34 shows a memristor-based multiplier cell capable of the generation of the product of four operands.

This approach is reflected in the example of a Composite Multiplier 3210 in FIG. 34. As shown in the Figure, the weights of the Base Cells 3226 are now 0.5(a*c), 0.25(a*c), 0.125(a*c) and 0.0625(a*c).

To the extent that test signals might be injected into the RF paths after User manufacturing and assembly, then it may also be possible to compensate for path variations due to aging or environmental conditions. Such signals might be generated either internally or externally to the User. The scope of the disclosure is intended to encompass RF circuit calibration as described herein.

8.0 System-on-a-Chip (SOC)

A plurality of circuits disclosed herein might be physically integrated onto a common substrate to allow their fabrication as a single monolithic entity. Functional, logical and electrical integration of several circuits has been illustrated by several exemplary embodiments including (but not limited to) those of FIGS. 7, 22, 23 and 27. Said embodiments depict processing chains involving multiple analog and digital circuits.

Capturing the processing chains within a single monolithic physical structure offers several potential advantages. These include reduction of cost, power consumption and size of circuit assemblies. The resulting physical entity might be referenced as a "System-on-a-Chip" or SOC. The SOC might also incorporate portions of the UE to further reduce cost and size. A key to the physical integration is compatibility of analog and digital circuit manufacturing processes. This suggests the need for fabrication compatibility between memristors and some digital circuit technology.

Complementary metal oxide semiconductor (CMOS) technology might be used to fabricate many of the digital circuits disclosed herein. Advantages of CMOS include circuit density and low power. Also, switching speeds of the technology may be compatible with desired signal bandwidths of various exemplary embodiments disclosed herein. Additionally, enormous investment has been made in optimizing tools for CMOS circuit design and fabrication.

At the same time, research has been performed in the design and fabrication of "hybrid" monolithic CMOS/memristor circuits for application to neural networks. As a result, some memristive technologies have been identified as superior candidates for integration with CMOS. One example is the general class of binary oxides.

Therefore the present disclosure extends to SOCs which are physical integrations of various digital and analog circuits described herein. The circuit technologies might include digital CMOS and RRAMs based on memristive materials such as binary oxides. Substantial sections of signal processing chains of the disclosure might be physically embodied in the SOC device. Major portions of beamformers, modulators, demodulators, encoders and other circuits of the disclosure might be captured in an implementation.

In such SOC configurations CMOS technology has additional utility for circuits outside the real-time signal processing chains. An example may be an "Image Memory" constructed of floating gate transistors based on CMOS fabrication techniques. The use of floating gate transistors as analog memory for reference sources in programming and tuning memristors is referenced above in Subsections 5.5.1 and 7.2. Floating gate transistors may behave as non-volatile, long-term, analog storage devices.

Floating gate transistors are also amenable to very high density fabrication. Therefore the Image Memory may provide a duplicate copy of the information which is programmed into one or more memristor circuits. Even a relatively small Image Memory might easily support many thousands of individual memristor elements. According to the present disclosure, the Image Memory may be used as a reference for programming, reprogramming, testing and tuning large memristor circuits.

Also outside of the main flow of the signal processing chain(s) may be various controllers as have been disclosed herein. Again, an advantage of CMOS is a high level of maturity. This provides for highly optimized "cores" which might be instantiated into the SOC to fulfill the controller functions.

To further support the objective of a highly integrated SOC, reference is made to the Composite Multiplier Circuit 3210 of FIG. 32. This circuit may be adapted to perform Digital to Analog (D/A) conversion. In this capacity, the input "s" may serve as a reference level for the conversion process, with the 4 bit Control Field input as the data to be converted to analog form. In this adaptation, the output "r" is then the analog representation of the 4 bit digital input to the circuit. This may be a highly efficient means of synthesizing a multiplicity of low resolution D/A devices within the SOC, and might be applied to some embodiments such as those including D/A Converter Bank 1916 referenced in Subsection 5.2 above. It is also noted that in some embodiments the input "s" might be a variable reference level, which may have utility in non-linear conversion schemes involving a variable dynamic range.

It is noted that some circuit elements may not be amenable to inclusion within the SOC, due to speed requirements or specialized technology. An example may be devices for high speed, moderate resolution Analog to Digital (A/D) conversion.

In the description and appended claims, references to "pulse signals" and "pulse trains" may be in the context of some tangible signal containing information. The signal may be continuous analog, discrete analog or digital depending upon the context of the reference. That is, in the present disclosure a "pulse" (or "pulse signal") might exist in the form of charges or currents, stored in or flowing through analog or digital circuits. The pulse signal might change logical or physical form in transitioning between circuits.

Although the present invention has been described with respect to specific methods and embodiments, it may be apparent to those skilled in the art and having the benefit of the present disclosure that numerous variations thereof are possible. Therefore it is intended that all such variations fall within the scope of the appended claims.

What is claimed is:

1. An analog vector arithmetic circuit (AVAC), in an integrated system of analog circuits and digital circuits adapted for user operation in an RF pulse communications network, the analog vector arithmetic circuit comprising:

a vector acquisition unit (VAU) adapted to acquire and hold an analog vector comprising a set of M baseband analog samples of a pulse signal, wherein the pulse signal comprises a plurality of modulated subcarriers;

a memristor cell matrix operatively connected to the output of the vector acquisition unit, wherein the memristor cell matrix comprises a multiplicity of memristor elements pre-programmed to perform a DFT upon the vector contents of the vector acquisition unit;

a matrix calibrator and controller (MCC) adapted to program, tune and activate elements of the memristor cell matrix; and a control interface, wherein a primary command and control processor (PCCP) is communicatively coupled to the matrix calibrator and controller.

2. The analog vector arithmetic circuit of claim 1, further comprising a calibration memory (CM) containing calibration references for test, tuning and re-programming of elements of the memristor cell matrix, wherein the calibration memory is communicatively coupled to the matrix calibrator and controller.

3. The analog vector arithmetic circuit of claim 1, further comprising a cell matrix input buffer operatively coupled to the input of the memristor cell matrix, wherein the cell matrix input buffer is adapted to provide the sum and difference of signal samples of the analog vector to the cell matrix.

4. A method, in the analog vector arithmetic circuit of claim 3, comprising:

acquiring and holding the analog vector during DFT analysis;

generating the sum and difference of the left and right halves of the analog vector prior to DFT analysis, wherein two analog sequences of M/2 points each are formed;

applying the two analog sequences of M/2 point to separate sets of rows of the memristor cell matrix for computing of even and odd DFT coefficients; and computing DFT coefficients in the memristor cell matrix, wherein rows for computation of one or more coefficients are selectively activated by the matrix calibrator and controller.

5. A method, in the analog vector arithmetic circuit of claim 3, comprising:

acquiring and holding the analog vector during DFT analysis;

segregating the accumulation of products of the DFT calculations on the basis of even and odd products, wherein an even product summation and an odd product summation are separately generated within the memristor cell matrix;

forming the sum and difference of the even and odd product summations, wherein the DFT coefficients F(j) and F(M/2−j) are derived; and performing DFT sum of products calculations within the memristor cell matrix, wherein elements of the memristor cell matrix are selectively activated by the matrix calibrator and controller.

6. The analog vector arithmetic circuit of claim 1, wherein the vector acquisition unit comprises solid-state analog storage mechanisms selected from the group consisting of sample and hold (S/H) devices, track and hold (T/H) devices, switched capacitors, floating gate transistors, ferroelectric field effect transistors (FeFETs), charge-coupled-devices (CCDs), and multi-tap analog delay line(s).

7. The analog vector arithmetic circuit of claim 1, wherein the vector acquisition unit comprises digital storage circuits operatively connected to digital-to-analog (D/A) conversion devices.

8. The analog vector arithmetic circuit of claim 1, wherein the memristor cell matrix further comprises a multiplicity of memristor elements programmed to perform a cross-correlation operation between the vector contents of the vector acquisition unit and a search template.

* * * * *